US007794629B2

(12) United States Patent
Youngs

(10) Patent No.: US 7,794,629 B2
(45) Date of Patent: Sep. 14, 2010

(54) COMPOSITE MATERIALS

(75) Inventor: Ian John Youngs, Salisbury (GB)

(73) Assignee: Qinetiq Limited (GB)

( * ) Notice: Subject to any disclaimer, the term of this patent is extended or adjusted under 35 U.S.C. 154(b) by 541 days.

(21) Appl. No.: 10/995,303

(22) Filed: Nov. 24, 2004

(65) Prior Publication Data

US 2006/0003152 A1 Jan. 5, 2006

(30) Foreign Application Priority Data

| | | | |
|---|---|---|---|
| Nov. 25, 2003 | (GB) | ................................ | 0327412.3 |
| Jun. 7, 2004 | (GB) | ................................ | 0412665.2 |
| Jun. 8, 2004 | (GB) | ................................ | 0412771.8 |

(51) Int. Cl.
*H01B 1/20* (2006.01)
*C08K 7/16* (2006.01)
*C08K 3/08* (2006.01)

(52) U.S. Cl. .................... 252/512; 252/514; 252/518.1; 524/495

(58) Field of Classification Search ................. 252/500, 252/512, 514; 524/495, 496
See application file for complete search history.

(56) References Cited

U.S. PATENT DOCUMENTS

| | | | | |
|---|---|---|---|---|
| 3,102,990 | A | 9/1963 | Miller et al. | |
| 3,678,145 | A | 7/1972 | Boes | |
| 4,997,708 | A * | 3/1991 | Kawachi et al. | 428/323 |
| 5,186,854 | A | 2/1993 | Edelstein | |
| 5,403,873 | A * | 4/1995 | Nakamura et al. | 523/201 |
| 5,476,612 | A | 12/1995 | Wessling et al. | |
| 5,498,644 | A | 3/1996 | Reo | |
| 5,574,471 | A | 11/1996 | Sureau | |
| 5,718,970 | A * | 2/1998 | Longo | 428/325 |
| 5,728,195 | A | 3/1998 | Eastman et al. | |
| 5,904,978 | A * | 5/1999 | Hanrahan et al. | 428/313.5 |
| 6,010,646 | A | 1/2000 | Schleifstein | |
| 6,337,031 | B1 | 1/2002 | Ida et al. | |
| 6,379,419 | B1 | 4/2002 | Celik et al. | |
| 6,451,903 | B1 * | 9/2002 | Asano et al. | 524/546 |
| 6,495,009 | B1 | 12/2002 | Gung | |
| 6,855,426 | B2 * | 2/2005 | Yadav | 428/403 |

(Continued)

FOREIGN PATENT DOCUMENTS

DE 3920110 A1 2/1991

(Continued)

OTHER PUBLICATIONS

Wang et al (Three-dimensional self-assembly of metal nanoparticles: possible photonic crystal with a complete gap below the plasma frequency, Physical Review B, 64(113108) 2001.*

(Continued)

*Primary Examiner*—Mark Kopec
(74) *Attorney, Agent, or Firm*—McDonell Boehnen Hulbert & Berghoff LLP

(57) ABSTRACT

A composite material having a plasma frequency comprising a random mixture of conductive and non-conductive particles. A material having smaller conductive than non-conductive particles and a concentration of conductive particles approximately at, close to or above the percolation threshold for mixtures of the conducting and non-conducting particles may show a plasma frequency well below plasma frequencies for conventional bulk materials.

22 Claims, 72 Drawing Sheets

U.S. PATENT DOCUMENTS

| | | | | |
|---|---|---|---|---|
| 2007/0199729 | A1 * | 8/2007 | Siegel et al. | 174/73.1 |

FOREIGN PATENT DOCUMENTS

| | | | |
|---|---|---|---|
| EP | 0 546 255 | A3 | 7/1992 |
| EP | 0 779 629 | A2 | 6/1997 |
| FR | 2765723 | A1 | 7/1997 |
| GB | 1224735 | A | 3/1971 |
| GB | 2 074 170 | A | 10/1981 |
| GB | 2 300 523 | A | 3/1984 |
| GB | 2211921 | A | 7/1989 |
| GB | 2232985 | A | 1/1991 |
| GB | 2 283 369 | A | 10/1994 |
| GB | 2294813 | A | 5/1996 |
| GB | 2 360 132 | A | 3/2000 |
| GB | 2 360 132 | A | 9/2001 |
| GB | 2378820 | A | 2/2003 |
| GB | 2 415 093 | A | 12/2005 |
| GB | 2433842 | * | 7/2007 |
| JP | 54029027 | A2 | 3/1979 |
| JP | 57202333 | A | 12/1982 |
| JP | 59193972 | A | 11/1984 |
| JP | 60137954 | A | 7/1985 |
| JP | 60189229 | A | 9/1985 |
| JP | 61287962 | A | 12/1986 |
| JP | 62257976 | A | 11/1987 |
| JP | 01167385 | A | 7/1989 |
| JP | 04081445 | A2 | 7/1990 |
| JP | 03122164 | A | 5/1991 |
| JP | 04078575 | A2 | 3/1992 |
| JP | 07238230 | A | 9/1995 |
| JP | 10072251 | A | 3/1998 |
| SU | 554930 | A | 5/1977 |
| WO | WO 96/29621 | A1 | 9/1996 |
| WO | WO 00/10756 | | 3/2000 |
| WO | WO 00/24816 | A1 | 5/2000 |
| WO | WO 00/41269 | A1 | 7/2000 |
| WO | WO 00/41270 | A1 | 7/2000 |
| WO | WO 00/41276 | | 7/2000 |
| WO | WO 02/03500 | A1 | 1/2002 |
| WO | WO 02/09884 | A2 | 2/2002 |
| WO | WO 02/071013 | A1 | 9/2002 |
| WO | WO 02/071544 | A1 | 9/2002 |
| WO | WO 02/086557 | A2 | 10/2002 |
| WO | WO 02/099162 | A2 | 12/2002 |
| WO | WO 02/099163 | A2 | 12/2002 |
| WO | WO 03/038147 | A2 | 5/2003 |
| WO | WO 03/075291 | A1 | 9/2003 |
| WO | WO 2005/024942 | A1 | 3/2005 |
| WO | WO 2007/129850 | * | 11/2007 |

OTHER PUBLICATIONS

Pendry et al "Low frequency plasmons in thin-wire structures", J. Phys.: Condens. Matter 10 (1998), 4785-4809.*

R. Rustum, "Synthesizing New Materials to Specification", Sep. 19, 1988.

Ian J. Youngs, Thesis, "Electrical Percolation and the Design of Functional Electromagnetic Materials", Dec. 2001.

Pendry J. et al.,"Magnetism from Conductors and Enhanced Non Linear Phenomena", IEEE Transactions on Microwave Theory and Techniques, vol. 47, pp. 2075-2084, Nov. 1999.

Smith DR et al., "Composite Medium with Simultaneously Negative Permeability and Permittivity", Phys. Rev. Lett., vol. 84(18), pp. 4184-4187, May 1, 2000.

Holloway et al., "A Double Negative (DNG) Composite Medium Composed of Magnetic Direction of Spherical Particles Embedded in a Matrix" IEEE Transactions on Antennas and Propagation, vol. 51, No. 10, pp. 2596-2603, Oct. 2003.

Ian J. Youngs "A Geometric Percolation Model for Non-Spherical Excluded Volumes"—Journal of Physics D: Applied Physics 36(2003) pp. 738-747.

Pendry J.B.. , "Negative Refraction Makes a Perfect Lens", Physical Review Letters, vol. 85, No. 18, pp. 3966-3969, Oct. 30, 2000.

G. Dewar, "Candidates for $\mu<0$, $\epsilon<0$ Nanostructures", International Journal of Modern Physics B. vol. 15, No. 24 & 25 , pp. 3258-3265, Work Scientific Publishing Company, (2001).

Sarychev et al. "Electrodynamics of Metal-Dielectric Composites and Electromagnetic Crystals", Physical Review B. vol. 62, No. 12, 15, pp. 8531-8540, The American Physical Society, Sep. 2000.

Chiu et al. "Theoretical Investigation on the Possibility of Preparing Left Handed Materials in Metallic Magnetic Granular Composites", Physical Review B, vol. 65, 144407-1-6, The American Physical Society, Mar. 22, 2002.

Pendry et al., Physical Review Letters, "Extremely Low Frequency Plasmons in Metallic Microstructures", vol. 76; pp. 4773-4776, 1996.

Kohlman R., Epstein A. Insulator-metal transition and inhomogeneous metallic state in conducting polymers. Chapter 3 (pp. 100-110 in particular) in Handbook of Conducting Polymers, 2$^{nd}$ Ed., Marcel Dekker, New York 1996.

Govorov, A.; Studenikin, S.; Frank ,W. , "Low Frequency Plasmons in Coupled Electronic Microstructures." Physics of the Solid State. 40 (3), pp. 499-502, Mar. 1998.

Kiesow et al, "Switching Behavior of Plasma Polymer Films Containing Silver Nanoparticles", Journal of Applied Physics, vol. 94, No. 10-15, pp. 6988-6990, Nov. 2003.

Schwartz & Luduena, "An Experimental Method for Studying Two-Dimensional Percolation". Am. J. Phys 72 (3), pp. 364-366, Mar. 2004.

Sheng & Gadenne "Effective Magnetic Permeability of Granular Ferromagnetic Materials"—J. Phys. Condens Matter 4, pp. 9735-9740, (1992).

Sheng "Phonon Absorption of Far-infra-red Radiation in Small-metal-particle Systems" Physical Review B. vol. 31, No. 8, 15, Apr. 1985.

Search Report dated Mar. 23, 2006 for Application No. GB 0425929.7, Claims searched 32-48, 52-67.

Search Report dated Apr. 5, 2006 for Application No. GB 0425929.7, Claims searched 90-92.

Search Report dated Apr. 5, 2006 for Application No. GB 0425929.7, Claims searched 68-70.

* cited by examiner

Figure 13a
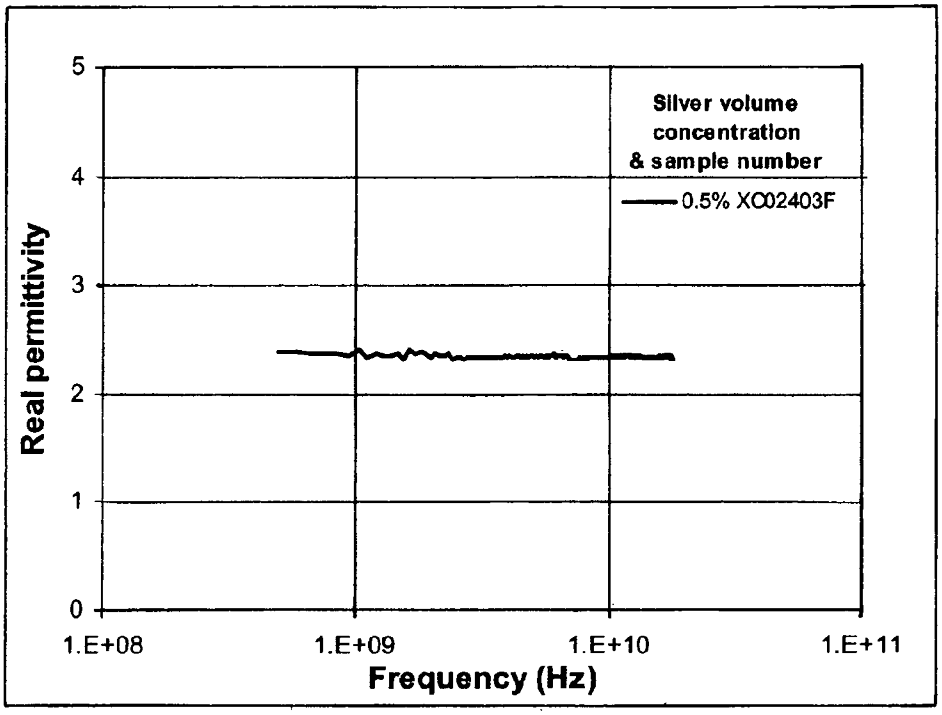
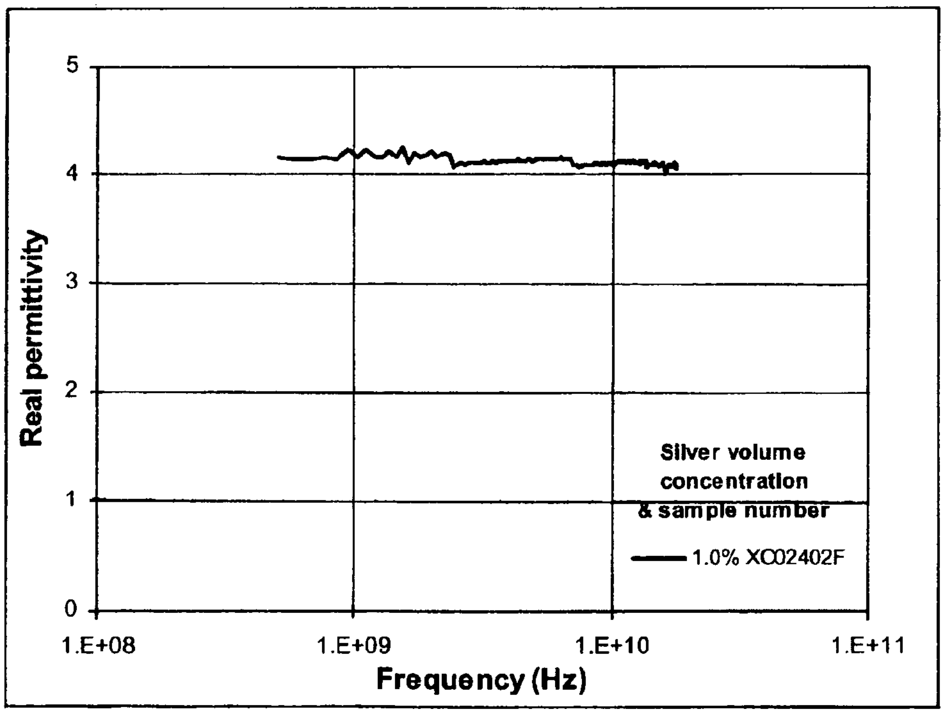
Figure 13b

Figure 13c
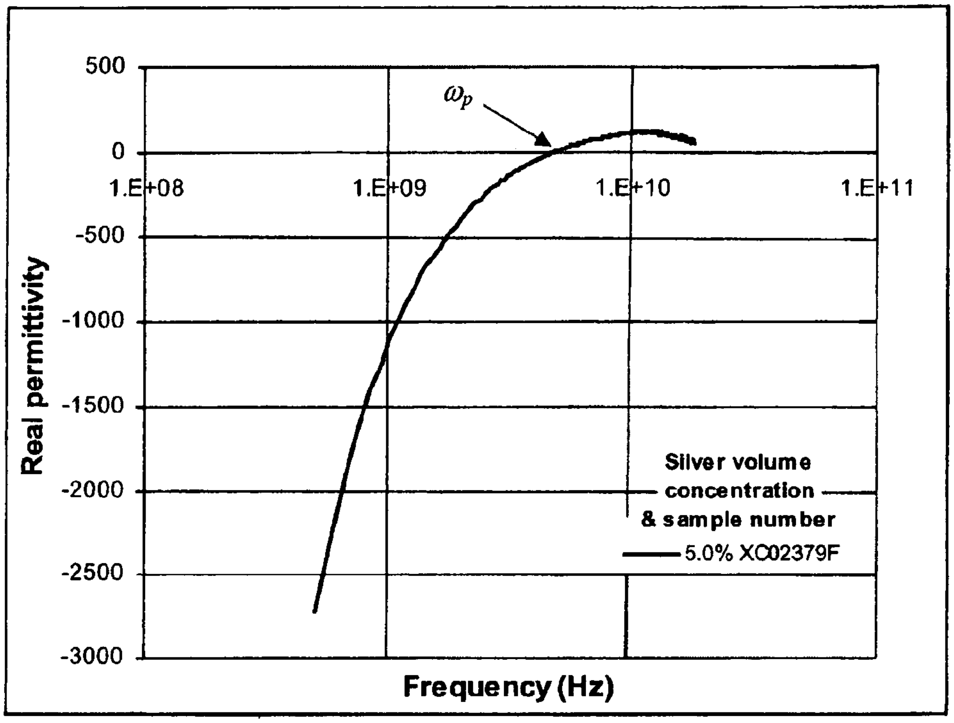
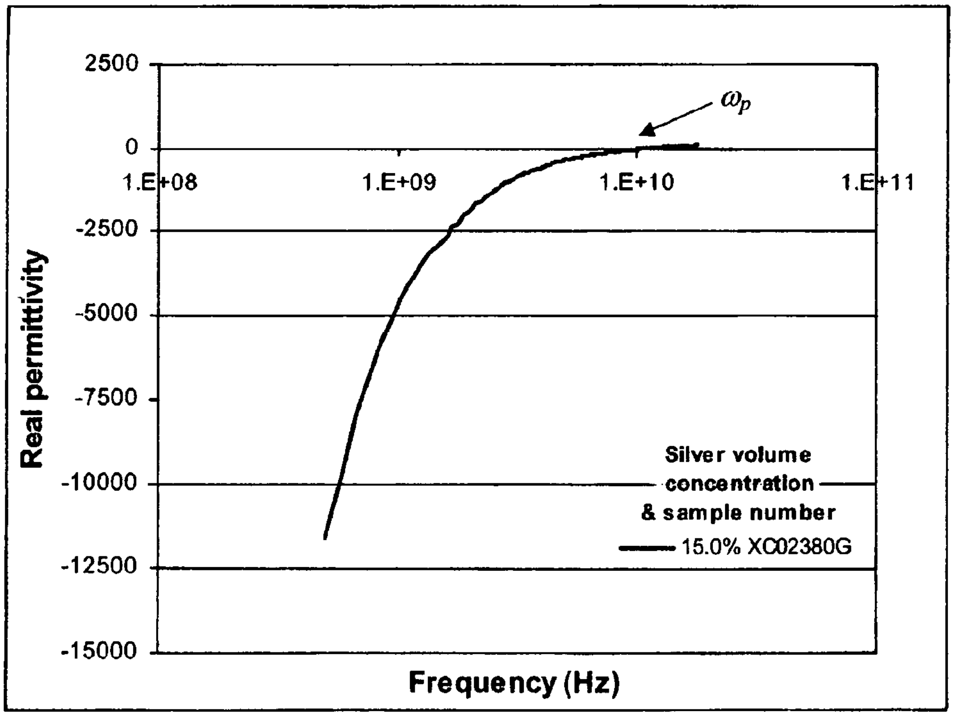
Figure 13d

Figure 14a
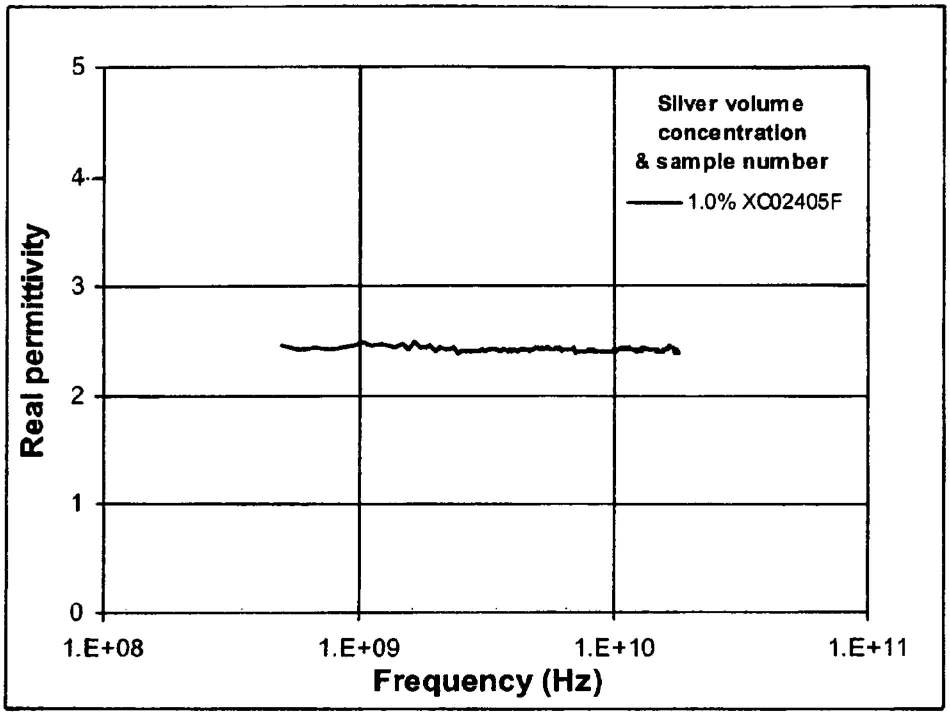
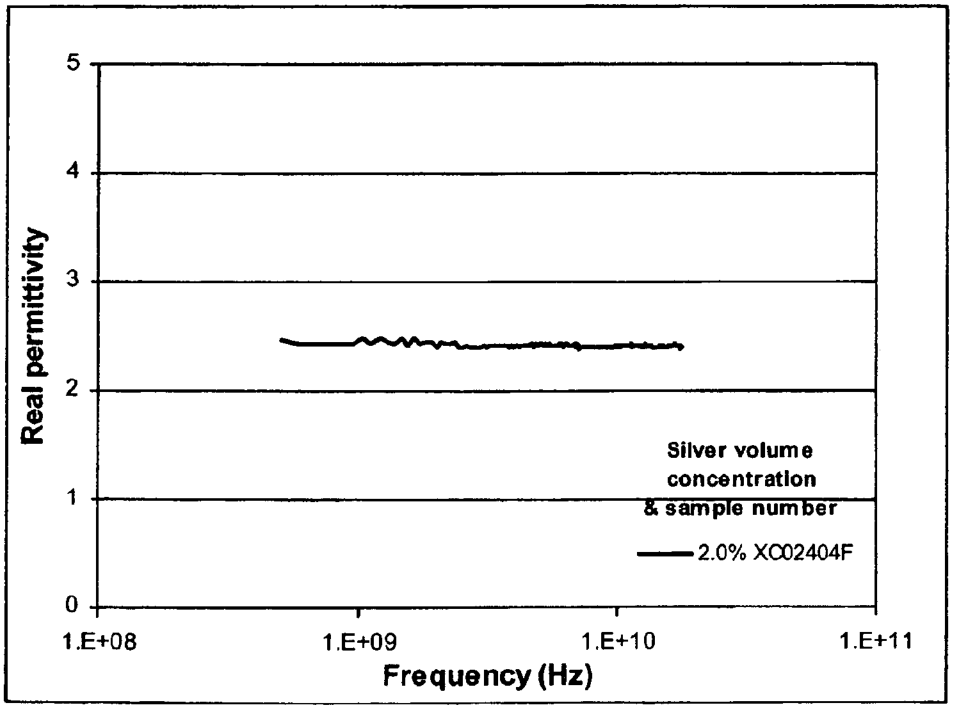
Figure14b

Figure 14c
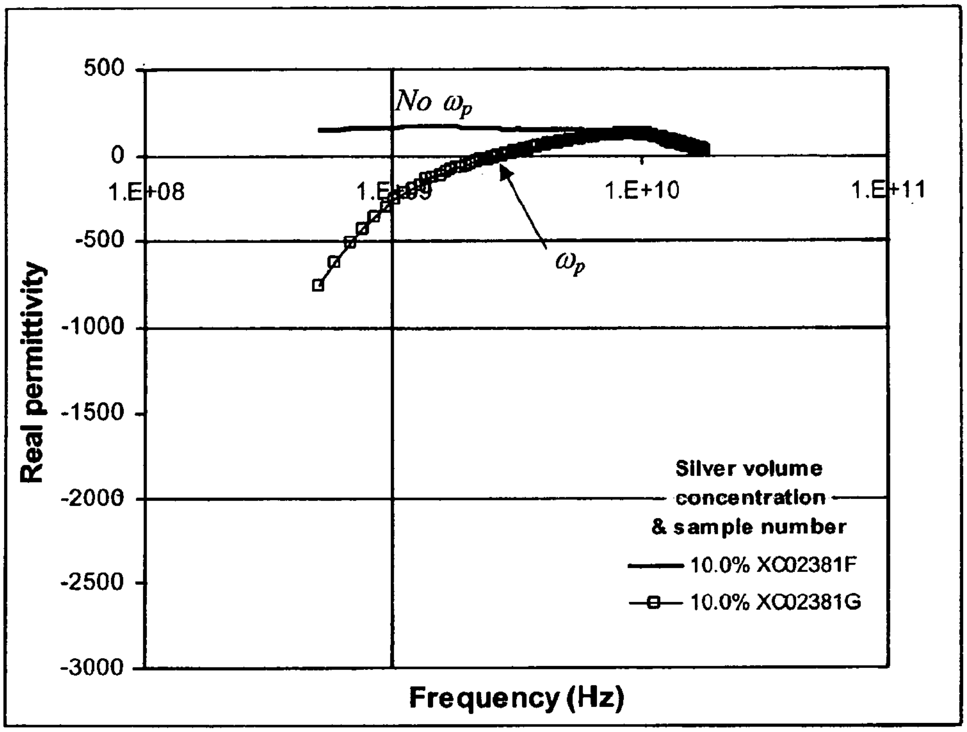
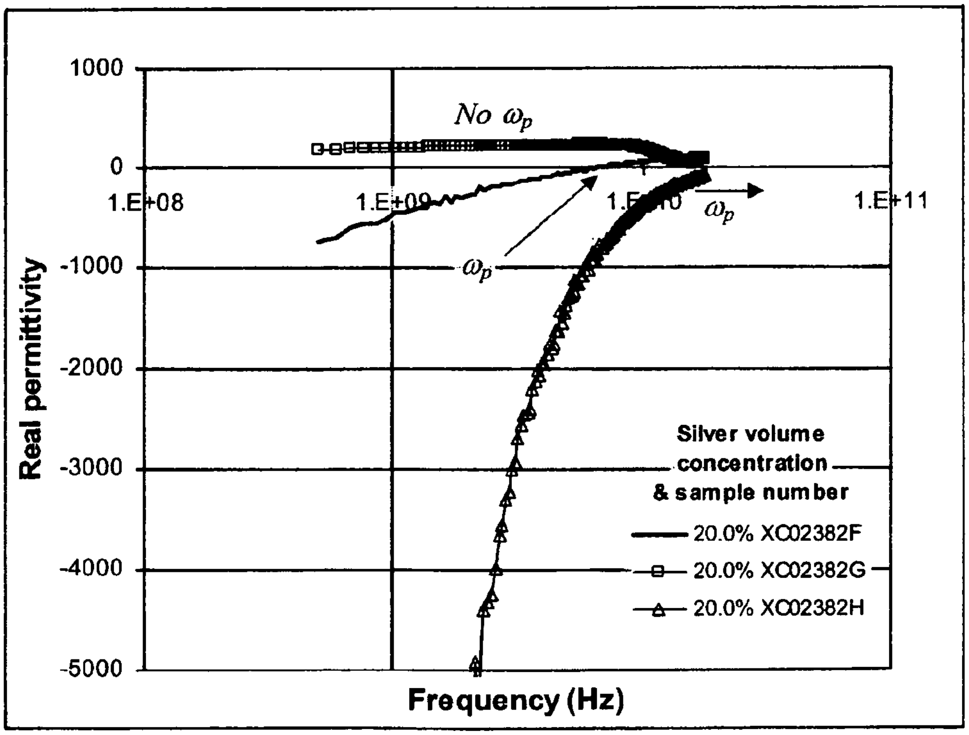
Figure 14d 100 x 100 array

50% loading

COMPOSITE MATERIALS

The present invention is concerned with composite materials. In particular, preferred embodiments are concerned with metal/insulator composites having plasma frequencies below the plasma frequencies of conventional bulk metals.

Many applications, devices and/or methods rely on the control of electromagnetic radiation. For example, enclosures (radomes) are necessary to provide environmental protection for antenna systems. In mobile communications and other similar applications, there is a need to separate electromagnetic signals of different frequency. There is also a need to dissipate electromagnetic energy at the walls of anechoic chambers used in radio and microwave measurements, and to confine, within specific bounds, unintentionally emitted electromagnetic energy to meet electromagnetic compliance regulations and prevent electromagnetic interference between electrical and electronic equipment.

Materials are used to provide the means of control, either in bulk form, as coatings or as components in devices. For example, radomes tend to be fabricated from bulk materials such as plastics and fibre-reinforced polymer composites; frequency separation can be achieved at a component level in guided wave communications or by using coatings (for example on radomes) for free-field propagation; dissipation tends to be achieved by coating an existing structure (e.g. the walls and floor of an anechoic chamber); and electromagnetic shielding can be achieved either through coating an equipment enclosure or by fabricating the enclosure from an appropriate material.

At the simplest level, the role of the material can be to modify the propagation characteristics of incident radiation. Modification could include transmitting, filtering, absorbing or reflecting incident electromagnetic radiation as in radomes, frequency separation, coatings for anechoic chambers and equipment enclosures for electromagnetic compatibility.

Advances have also led to materials and devices that amplify or change the frequency or polarisation of incident electromagnetic radiation (consider, for example, lasers, second harmonic generation using non-linear optical materials, or the use of Faraday rotation in ferromagnetic ceramics).

Materials and devices also exist whose influence on incident electromagnetic radiation can be changed as a function of an extrinsic (or external) stimulus. These are known as smart, dynamic or adaptive electromagnetic materials and include ferroelectrics, whose permittivity is a function of applied electric field strength, and chromogenic materials (photo-, thermo-, or electro-chromic) whose optical colour and often electrical conductivity varies with light intensity, temperature or electrical current.

The thesis, "Electrical Percolation and the Design of Functional Electromagnetic Materials" by Ian J, Youngs, published in December 2001, and available from the library of the University of London includes a comprehensive discussion of the background to and physics surrounding this invention.

The influence exerted by a material on an electromagnetic wave is determined by two intrinsic material properties. These are the permittivity ($\in$) and magnetic permeability ($\mu$). The permittivity ($\in$) characterizes the response of a material to an applied electric field, and is a measure of the extent to which a material can resist the flow of charge in an electric field. The magnetic permeability ($\mu$) characterises the response of a material to a magnetic field, and is equal to the ratio of the magnetic flux density to the magnetic field strength measured in the material.

It is usual to relate (or normalise) the absolute properties of permittivity and magnetic permeability to those of a vacuum ($\in_o=8.854\times10^{-12}$ Fm$^{-1}$; $\mu_o=1.257\times10^{-6}$ Hm$^{-1}$) so that one then discusses the relative permittivity ($\in_r=\in/\in_0$) and relative permeability ($\mu_r=\mu/\mu_0$) of a material. For example, the relative permittivity and relative permeability of a vacuum equal unity.

The present invention is primarily concerned with responses to an applied electric field (i.e. permittivity) and the manner in which they govern the propagation of an electromagnetic wave through the bulk of a material. For the purposes of a general introduction, only the behaviour of non-magnetic materials is considered below. This is a reasonable assumption to make, since materials exhibiting diamagnetic or paramagnetic behaviour have a relative magnetic susceptibility ($\chi_m$, a ratio of the magnetic moment per unit volume of material to the magnetic field strength) of $|\chi_m|>10^{-5}$ and so are treated as having a value of $\mu_r$ of 1.

In the case of ferromagnetic and ferromagnetic materials, where $|\chi_m|$ is significantly greater then 0, the analogous case to that outlined below will be apparent to those skilled in the art.

Materials can either support (or allow) the propagation of an electromagnetic wave through their bulk or they cannot. All materials contain electronic charges and so respond, to varying degrees, to the application of an electric field.

Metals contain significant numbers of electronic charges that are free to move through the bulk of the material (the conduction band electrons). An electric field applied to a metal therefore induces a macroscopic transport current in the material.

The frequency response of the permittivity of metals is determined by the weakly-bound ("free") electrons in the conduction band. At low frequencies, the electrons oscillate in phase with an applied electric field.

However, at a certain characteristic frequency, oscillation in phase with the applied field can no longer be supported, and resonance occurs.

The weakly bound electrons within the metal can be considered to act as a plasma—a gas consisting either wholly or partly of charged particles. A simple example is to consider such an electron gas as being in two dimensions and held between two opposing electrodes, one at the top of the plasma and one at the bottom. When an electric field is applied to this plasma, the electrons will receive enough momentum to move in the opposite direction to that in which the field is applied, and will continue to move after the field is turned off.

After time t, N electrons of charge e will have moved a distance, x, producing a sheet of unbalanced charge −Nex at the top of the plasma. Consequently, a region of opposite charge, Nex is left at the bottom of the plasma. This results in an electric field, E in the upward direction, of magnitude E=(Ne/$\in_0$)x acting within the plasma. This produces a restoring force on the electrons, creating an equation of motion $$\frac{d^2x}{dt^2}+\frac{Ne^2}{m_e\varepsilon_0}=0 \tag{1}$$

where $m_e$ is the mass of our electron.

The electrons therefore vibrate at the plasma frequency, $w_p$, where $$\omega_p^2=(e^2/m_e\in_0)N \tag{2}$$

For metals, this characteristic frequency is in the ultraviolet region of the electromagnetic spectrum. For frequencies above $\omega_p$, metals can be considered to act like dielectrics, i.e. they have a positive permittivity and support a propagating electromagnetic wave.

The oscillation of a plasma may be quantised: a plasmon is the unit of quantisation. Plasmons have a profound impact on the properties of the metal, especially on the effect of incident electromagnetic waves. The action of the plasmons produces a complex dielectric function (or permittivity) of the form $$\varepsilon(\omega) = 1 - \frac{\omega_p^2}{\omega(\omega + i\gamma)}$$

The imaginary component arises through the damping term $\gamma$, which represents the amount of plasmon energy dissipated into the system, generally as heat. The real permittivity is essentially negative below the plasma frequency, $\omega_p$, at least down to frequencies of the order of $\gamma$.

For frequencies below $\omega_p$, metals therefore exhibit a negative permittivity. In this case, an electromagnetic wave cannot propagate through the material, and decays exponentially within a characteristic distance determined by the attenuation coefficient, $\alpha = 2\omega n_i/c$. In a sense, the metal acts as a high-pass filter for the frequency range spanning the plasma frequency.

For metals, where the frequency of the electromagnetic radiation is below the ultraviolet end of the spectrum most of the radiation is reflected and the remainder is attenuated by the metal.

Dielectrics are classed as non-magnetic materials, and contain charges which are mostly bound and whose motion is therefore localised to distances much smaller than the wavelength of the incident electromagnetic radiation. The relative permittivity of a dielectric material will be positive and greater than that of a vacuum.

Bound electric charges can exist on many scales within a material, from electrons orbiting atomic nuclei to charges residing at interfaces between phases of dissimilar chemical composition within a material. At low frequencies, all charges will oscillate in phase with an applied electric field. This contributes to the maximum value of the permittivity exhibited by the material. This is shown in a dynamic permittivity resulting from an applied AC field, rather than the dielectric constant which is representative of an applied DC (or static) field. Under these conditions and in the absence of free electric charges, the material exhibits no significant loss. Again, at certain characteristic frequencies, the individual types of charge carriers no longer oscillate in phase with the applied field. Maxima in the loss (or absorption) spectrum occur at these frequencies.

When an E-field is applied to a dielectric material, polarisation of the charges within the material occurs. The force exerted on an electron by the electric field, E(t) of a harmonic wave of frequency w, gives an equation of motion for an electron of $$m_e \frac{d^2x}{dt^2} + m_e y \frac{dx}{dt} + m_e \omega_0^2 x - eE_0 \cos\omega t = 0 \tag{4}$$

where $m_e$ is the electron mass, $E_o$ is the magnitude of the applied electric field, $\omega_0$ is the characteristic (or resonance) frequency, w is the frequency of the applied electric field, e is the electronic charge and x is the distance moved by an electron under the influence of the applied electric field. $m_e\gamma dx/dt$ is a damping term representing the delay between the application of the external field and the time after which an equilibrium in the polarisation is established. The polarisation of the material in this field is caused by N contributing electrons and is given by P=exN, which is related to the permittivity of the material, e by $$\in = \in_0 + P(t)/E(t) \tag{5}$$

Hence the permittivity of the material is given by $$\varepsilon = \varepsilon_0 + \frac{e^2 N}{m_e} \frac{1}{(\omega_0^2 - \omega^2 - i\gamma\omega)} \tag{6}$$

Furthermore, there is a relationship between the real ($\in'$) and imaginary ($\in''$) parts of the permittivity of a material, given by the Kramers-Kronig relations:

$$\varepsilon'(\omega) = \varepsilon_0 + \frac{2}{\pi} \int_0^\infty \frac{\omega' \varepsilon''(\omega') d\omega'}{(\omega'^2 - \omega^2)} \tag{7a}$$

$$\varepsilon''(\omega) = -\frac{2\omega}{\pi} \int_0^\infty \frac{[\varepsilon'(\omega') - \varepsilon_0] d\omega'}{\omega'^2 - \omega^2} \tag{7b}$$

These characteristic frequencies ($\omega_0$) are found experimentally by a maximum in the imaginary permittivity component and represent a region of absorption over which incident electromagnetic energy is converted to heat through electron-phonon interactions within the material. A phonon is an elastic wave caused by harmonic vibrations within the crystal lattice.

Over the frequency range containing the absorption band, the real permittivity component will also be frequency dependent—through the Kramers-Kronig relationships. The nature of this frequency dependence is related to the level of damping. At high frequencies, generally well above the microwave region, the damping effects are greatly reduced and the polarisation mechanisms are related to the creation of dipoles at electronic and atomic scales. In this case the real polarisability component is of a resonant nature centred on the characteristic frequency as shown in FIG. 1. At lower frequencies, including the microwave region, the damping effects are larger and the polarisation mechanisms are related to molecular through to macroscopic scales.

The response about the characteristic frequencies tends to that of a critically damped system and the real polarisability component decays monotonically with increasing frequency, as shown in FIG. 2. This is known as dielectric relaxation. These effects can be used to absorb the energy of incident electromagnetic radiation in a frequency range centred on the characteristic frequency, rather than transmitting it or reflecting it back to its source.

The ratio of the imaginary to real components represents the phase lag of the electric component of an incident electromagnetic wave inside the material, compared to the electric field component of the incident electromagnetic wave outside the material.

At an interface, such as that shown in FIG. 3, it is the relative permittivity that determines the proportion of incident radiation that is reflected, shown as r, and the proportion which is transmitted, shown as t. This is given by the Fresnel equations, (where ⊥ and || indicate components when the incident electric field is perpendicular and parallel to the plane of incidence respectively)

$$r_{\perp}=[Z_2\cos(\theta_i)-Z_1\cos(\theta_t)]/[(Z_2\cos(\theta_i)+Z_1\cos(\theta_t)] \quad (8a)$$

$$r_{\parallel}=[Z_1\cos(\theta_i)-Z_2\cos(\theta_t)]/[(Z_1\cos(\theta i)+Z_2\cos(\theta_t)] \quad (8b)$$

$$t_{\perp}=2Z_2\cos(\theta_i)/[Z_2\cos(\theta_i)+Z_1\cos(\theta_t)] \quad (8c)$$

$$t_{\parallel}2Z_2\cos(\theta_i)/[Z_2\cos(\theta_i)+Z_1\cos(\theta_t)] \quad (8d)$$

where $Z_2=\mu_r/\in_r$ and the subscripts 1 and 2 refer to the materials either side of the interface, with material 1 containing the incident electromagnetic wave. Material 1 is often air in which case $Z_1=\mu_{r1}=\in_{r1}=1$. If material 2 is non-magnetic then $\mu_{r2}=1$, also.

For example, for metals in air, most of the incident radiation in the microwave and visible regions of the spectrum (frequencies in the region of approximately $10^8$ to $10^{15}$ Hz) is reflected. For example, the reflectivity of freshly deposited aluminium, in air, is around 94% to 99% for wavelengths between 10 and 30 μm.

The angles of incidence ($\theta_i$) and refraction ($\theta_t$) in these equations are given by Snell's law, $$n_1\sin\theta_i=n_2\sin\theta_t \quad (9)$$

where $n_2=\in_r\mu_r$ and the subscripts 1 and 2 are as defined for Z in the Fresnel equations.

It is clear then that identifying materials with different permittivities can enable the design of components and devices with different electromagnetic functionality (for example, different levels of reflection, transmission and absorption) operating over specific regions of the electromagnetic spectrum. However, the range of naturally occurring permittivities has become restrictive to the design engineer. For example, either because the desired real permittivity value is not available or absorption mechanisms do not exist at a required frequency, or in a material that has the required processibility, mechanical, environmental or visual properties. For these reasons, engineers have sought to form composite media with tailored complex permittivity. For example, and for many years, high permittivity materials and metals have been added, in powdered forms, to polymers and other low permittivity host materials (matrices) (e.g. ceramics and glasses) to raise the base permittivity of the host or to engineer absorption (e.g. through electrical resistance or the Maxwell-Wagner-Sillars effect). The permittivity of these composite media is now considered an 'effective' permittivity. For this to be valid, and the composite medium to be treated as a homogeneous material for design purposes, the size of the inclusions must be smaller (and ideally) much smaller than the wavelength of interest.

Work has also been done on trying to design solid materials that have a plasma frequency at lower frequencies than naturally occur in metals.

It has been known for some time [Bracewell R, Wireless Engineer, p. 320, 19541, that periodic arrays of metal elements can be used to form composite media with low plasma frequencies. More recently (Pendry J et al, Physical Review Letters, vol. 76, p. 4773, 1996] it was demonstrated that a periodic lattice of thin metallic wires could exhibit a plasma frequency given by;

$$\omega_p\approx 2\pi c^2/(d^2\ln(d/r)) \quad (10)$$

in the microwave region when the wire radius (r) is much smaller than the wire spacing (d), and c is the speed of light in vacuum. For example, when the wire radius is 20 μm and the wire spacing is 5 mm, the plasma frequency is approximately 10 GHz.

There have been no other experimental observations of plasma resonances at microwave frequencies in naturally occurring materials or artificial composites other than in the fine wire system discussed above. However, there is evidence of low frequency plasmons in the infrared region of the electromagnetic spectrum. For example, low frequency plasmons have been observed in intrinsically conducting polymers (Kohlman R et al, Chapter 3, *Handbook of Conducting Polymers*, Second Ed., Ed. Skotheim, Elsenbaumer and Reynolds, Marcel Dekker, New York 1998 ISBN 0-8247-0050-3), in coupled metallic island structures (Govorov et al, *Physics of the Solid State*, vol. 40, p 499, 1998) and in metallic photonic bandgap crystals (Zakhidov et al. *Synthetic Metals*, vol. 116, p 419, 2001).

It is also known how to create artificial dielectric structures, for example, for use as radar antennas (see Skolnik, *Introduction to Radar Systems*, McGraw-Hill, London, 1981, Martindale, *J. Brit. IRE*, vol. 13, p 243, 1953, Stuetzer, *Proc. IRE*, 38, p 1053, 1950, and Harvey, *Proc. IRE*, vol. 106 Part B, p 141, 1959). An artificial dielectric comprises discrete metallic particles of a macroscopic size. For example, these particles may be spheres, disks, strips or rods embedded within a material of low dielectric constant, such as polystyrene foam. These particles are arranged in a three dimensional lattice configuration, with the dimensions of the particles in the direction parallel to the applied electric field, as well as the spacing between the particles, being of an order comparable with the incident wavelength. For a small concentration of metallic spheres of radius r and spacing d, and assuming there is no interaction between the spheres, the dielectric constant of an artificial dielectric is approximately $$\kappa=l+4\pi r^3/d^3 \quad (11)$$

(The symbol κ has been used here to represent the dielectric constant to avoid confusion with the use of the symbol ∈ to represent permittivity.)

An artificial dielectric may also be constructed using a solid dielectric material that comprises a controlled arrangement of spherical or cylindrical voids.

Leaving behind the assumption of non-magnetic materials taken above, and following on from wire arrays, it is also possible to produce alternative periodic arrangements of metallic elements which exhibit negative magnetic permeability also at microwave frequencies (Pendry J et al., *IEEE Transactions on Microwave Theory and Techniques*, vol. 47, p 2075, 1999). A combination of these two techniques has also led to real materials exhibiting "left-handed" electromagnetic behaviour or a negative angle of refraction (Smith D R et al., *Phys. Rev. Lett.*, vol. 84(18), p 4184, 2000.).

Very recently a theoretical model has led to speculation [Holloway et al, IEEE Transactions on Antennas and Propagation, Vol 51, No. 10, October 2003] that it may be possible to produce double negative media (i.e. having effective permeability and permittivity simultaneously negative) by producing a composite material consisting of insulating magnetodielectric spherical particles embedded in an insulating background matrix.

The advantages of producing a material with a negative magnetic permeability are similar to those found on producing a negative permittivity. So far, we have only considered the electric component of an applied electromagnetic field, but any material which produces a loss when exposed to an applied electromagnetic field can do so via the electric or the magnetic component of that field, or both. The best materials which exhibit losses via the magnetic field component are ferrites. These materials show ferrimagnetism, where saturation magnetisation does not correspond to parallel alignment of the magnetic moments within the material. Such materials also tend to have a spinel crystal structure, comprising 8 occupied tetrahedral sites and 16 occupied octahedral sites within a unit cell. For example, magnetite, $Fe_3O_4$ or $FeO.Fe_2O_3$ comprises both ferric ($Fe^{3+}$) and ferrous ($Fe^{2+}$) ions. At saturation, the moments of all of the $Fe^{3+}$ ions on the tetrahedral sites and of the $Fe^{3+}$ ions filling 8 of the octahedral sites are aligned antiparallel, thus cancelling each other out. The residual magnetic moment is therefore only contributed to by the $Fe^{2+}$ ions on the remaining octahedral sites. Such a material has a complex permeability, $$\mu=\mu'+i\mu'' \quad (12)$$

where μ' is the real component and μ" the imaginary component.

Consequently, it is also desirable to find materials with a negative permeability, since in these the magnetic component of the electromagnetic wave will die away exponentially within the material.

Although a single period of a fine wire array of the type proposed by Pendry J. et al in Physical review letters, 76, 9773, 1996 is smaller than the incident wavelength (0.03 m at 10 GHz, with $\lambda/d\approx6$) it is not much smaller (an order of magnitude) than the wavelengths. In practice, more than one period of such a structure may be required in the direction of propagation of an electromagnetic wave for the effective permittivity of such a composite medium to be a valid representation of the electromagnetic response of that medium. Consequently, this could not be considered to be "thin" in comparison with the wavelength at the plasma frequency. This may be a limiting factor to the use of such media in practical applications. Media of the type proposed by Pendry J. et al would also be difficult and expensive to produce.

A further benefit to the design engineer would be realised if it were possible to produce composite media with a tailored plasma frequency. Particularly, if in a solid material, the plasma frequency could be tailored to exist at lower frequencies than naturally occur in metals. For example, work has recently been reported in the scientific literature where this has been achieved in the microwave or even radio frequency regions of the electromagnetic spectrum.

There is, therefore, a need to develop alternative composite media which exhibit metallic-like permittivity spectra with a plasma frequency well below that of conventional bulk metals, which do not depend on the use of components and spacings of the components with dimensions related to the wavelength of interest, whose effective permittivity is realisable on a scale much smaller than the wavelength of interest, and which may be more easily manufactured than the wire structures discussed above.

The present invention, in its various aspects, provides a composite material, use of a composite material product, device or apparatus, or a method as defined in one or more of the attached independent claims to which reference should now be made.

Further preferred features of the invention are set out in the dependent claims to which reference should also be made.

The invention in a first aspect provides a composite material according to claim 1.

It is known to make composites comprising mixtures of electrically conductive and non-electrically conductive particles (see, for example, EP 779,629 or U.S. Pat. No. 4,997,708). However, such known composites would not exhibit a plasma frequency. The known composites of this nature are mostly reflective to incident radiation below optical wavelengths. Composites embodying the present invention could be reflective, absorbing or exhibit filtering characteristics similar to electromagnetic bandgap structures.

In the claims and description, the term random is intended to mean without order. The electrically conductive material need not be uniformly dispersed and there could be portions of the material in which there is localized order of the electrically conductive material.

In a preferred embodiment, the electrically conductive material has no long range order within the composite material. By long range order, it is intended that there is no regularity of structure (crystal or otherwise) for the electrically conductive material. Consequently there is no regularity of crystal structure, or periodic lattice structure present of the conductive material within the composite material.

As discussed in more detail below an alternative definition of what is meant by no long range order is no order at or above the dimensions corresponding to the effective wavelength of electromagnetic radiation propagating in the material.

The invention in another aspect provides a composite material comprising an electrically conductive material and a non-electrically conducting material, wherein the concentration of electrically conductive material is approximately at, close to or above its percolation threshold.

A discussion of how to achieve percolation threshold is set out in a paper by the inventor (Ian J. Youngs) "A geometric percolation model for non-spherical excluded volumes"—Journal of Physics D: Applied Physics 36(2003) p. 738-747.

The inventor has appreciated that the existing theoretical models of the behaviour of composite material comprising mixtures of conductive and non-conductive or insulating materials are wrong. The inventor is the first to establish that such materials may have a plasma frequency below that of conventional bulk materials.

Preferably the composite material comprises particles of electrically conductive and non-electrically conductive materials. Such materials are easy to make.

Preferably, the particles are randomly distributed. The inventor is the first to appreciate that composite materials need not have a regular structure of the type previously thought necessary (see, for example, Physical Review Letters, vol. 76, p. 4773, 1996] Pendry et al,) to control or alter the plasma frequency.

Preferably, the particles are small, with the conductive particles being smaller than the non-electrically conductive particles. The reasons for the behaviour of the composites of the investigation are as yet not fully understood and investigations are ongoing. However, it appears that composites in which spaces of insulating material (e.g. a non-conductive particle or area) are surrounded by conductive particles: (e.g. a coating of conductive particles on an insulating or non-conductive particle) are particularly advantageous.

Preferably the conductive particles are resistant to oxidation and passivation. Small particles are more reactive than larger particles and it is therefore advantageous to have particles whose surface will not react so as to try and ensure that the conductive particles' behaviour (e.g. conductivity) is not altered or affected by surface effects such as oxidation.

Preferably the oxidation resistant particles are noble metals, conducting ceramics or metallic alloys.

Preferred embodiments of the present invention will be described, by way of example only, with reference to the attached figures. The figures are only for the purposes of illustrating one or more preferred embodiments of the invention and are not to be construed as unifying the invention or limiting the invention or limiting the appendent claims. The skilled man will readily and easily envisage alternative embodiments of the invention in its various aspects.

IN THE FIGURES

Figure 13E:
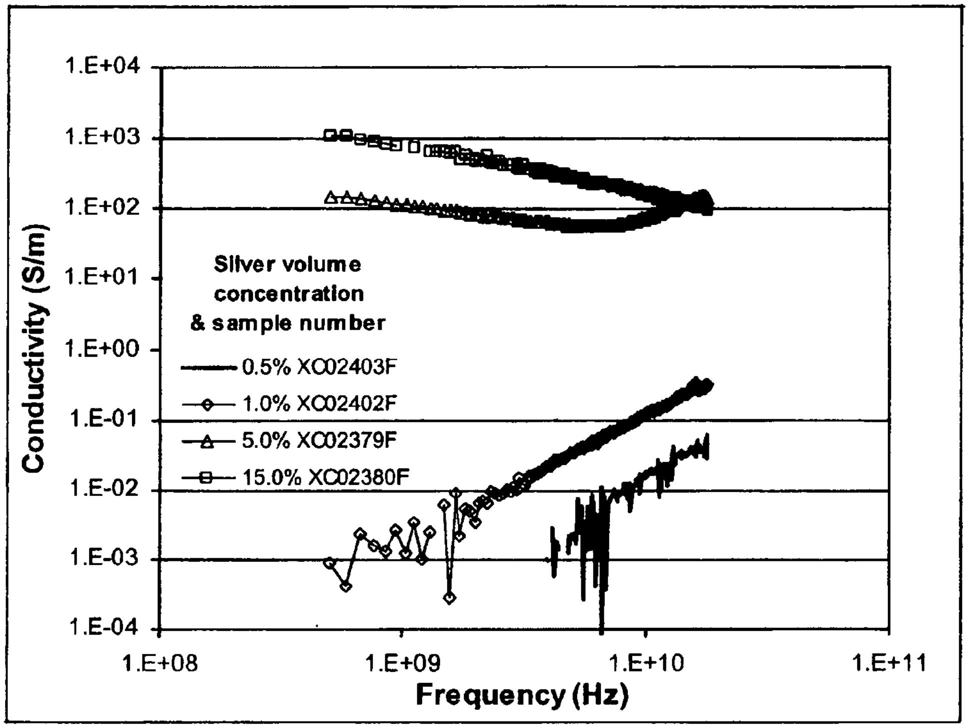
Figure 13F:
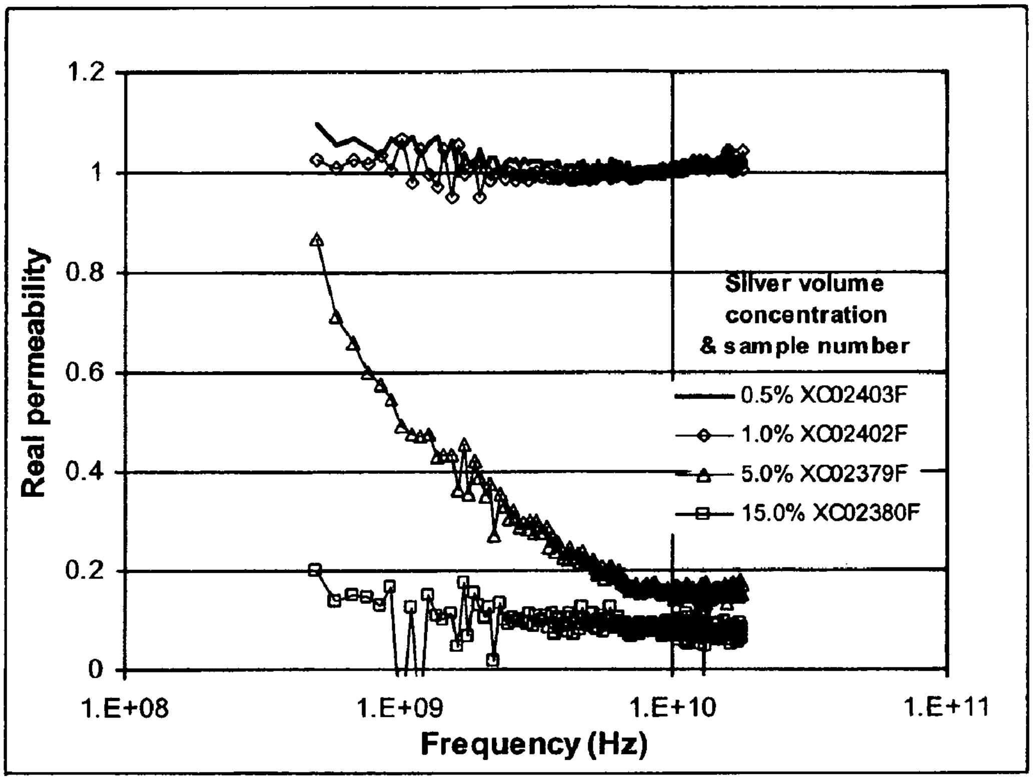
Figure 13G:
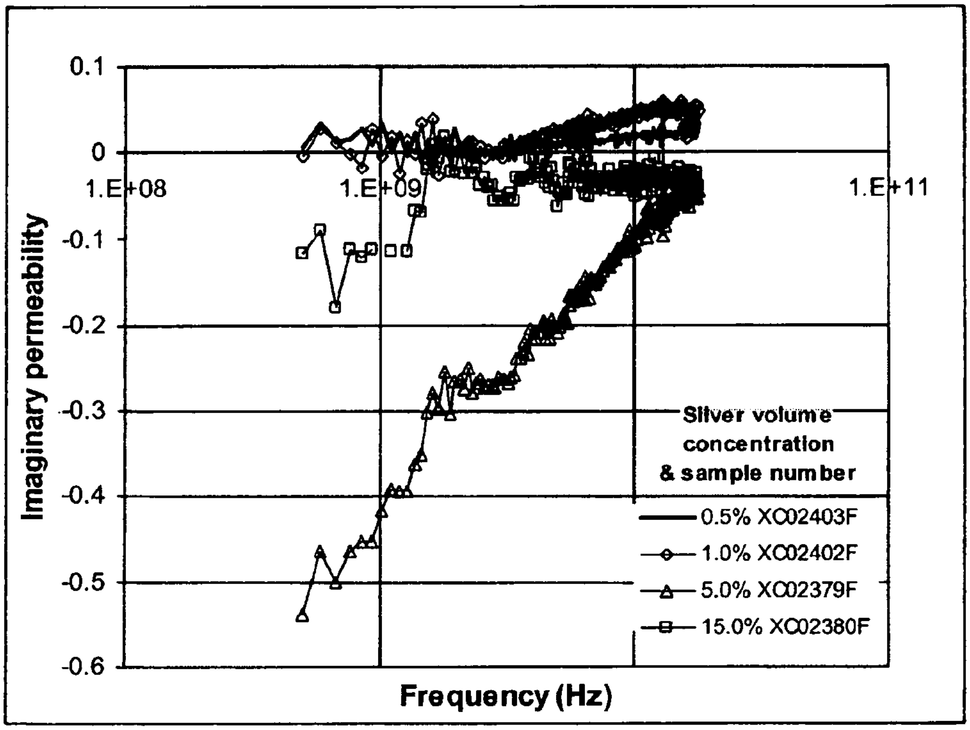
Figure 14E:
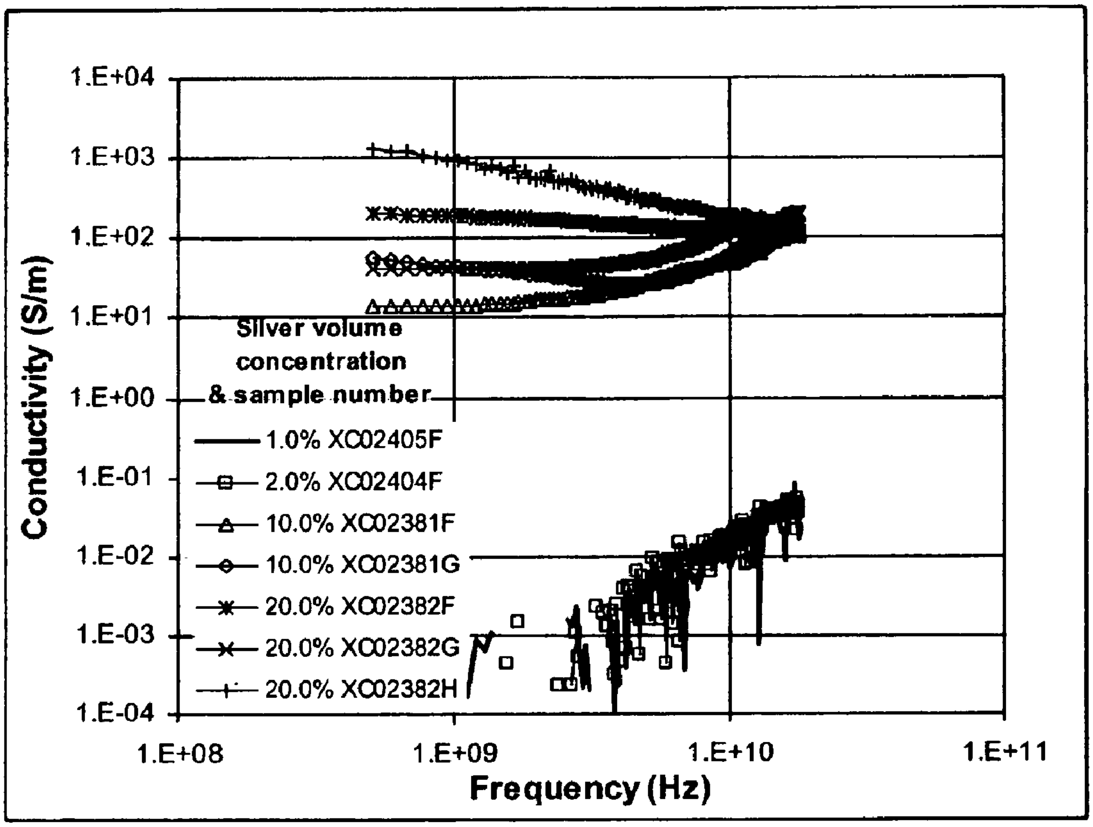
Figure 14F:
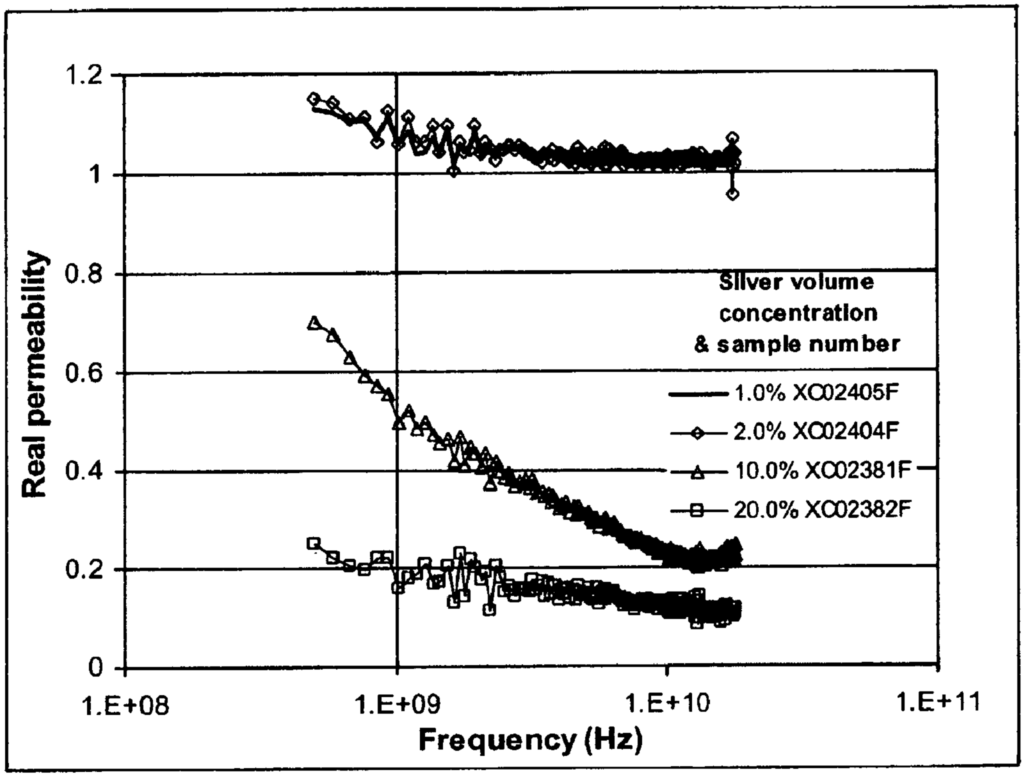
Figure 14G:
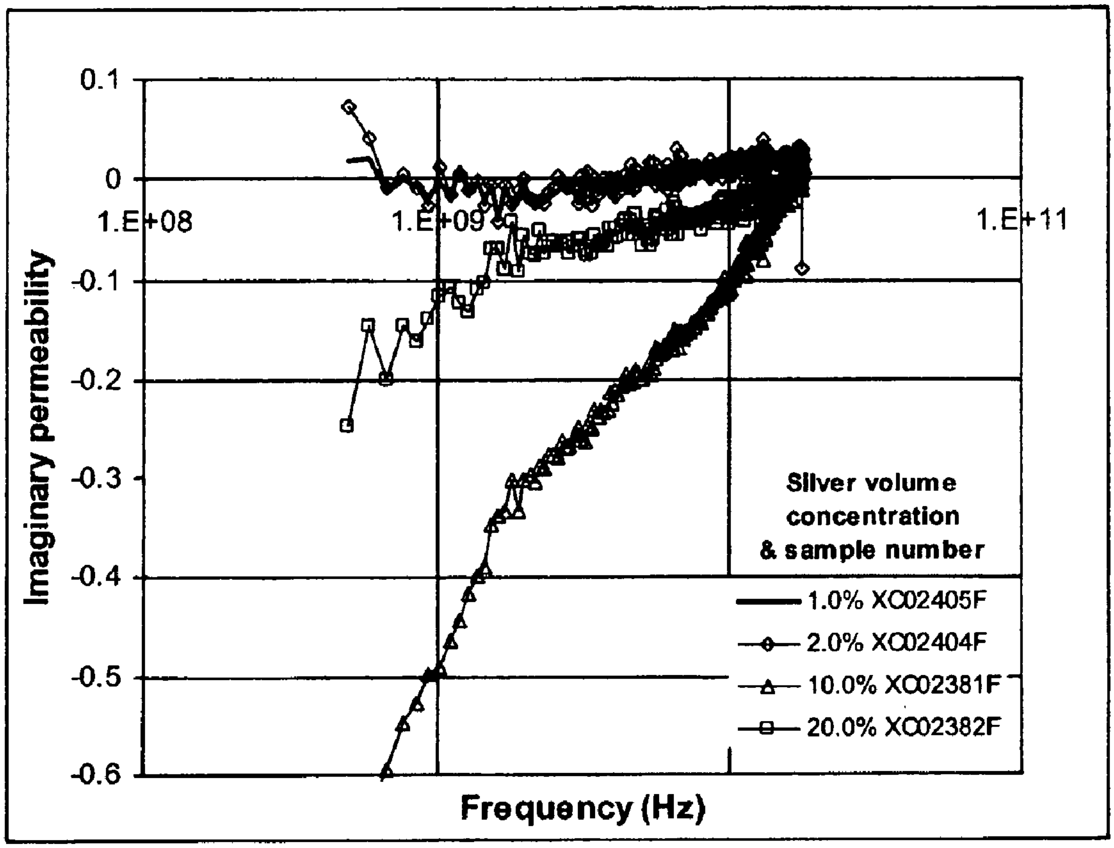
Figure 14H:
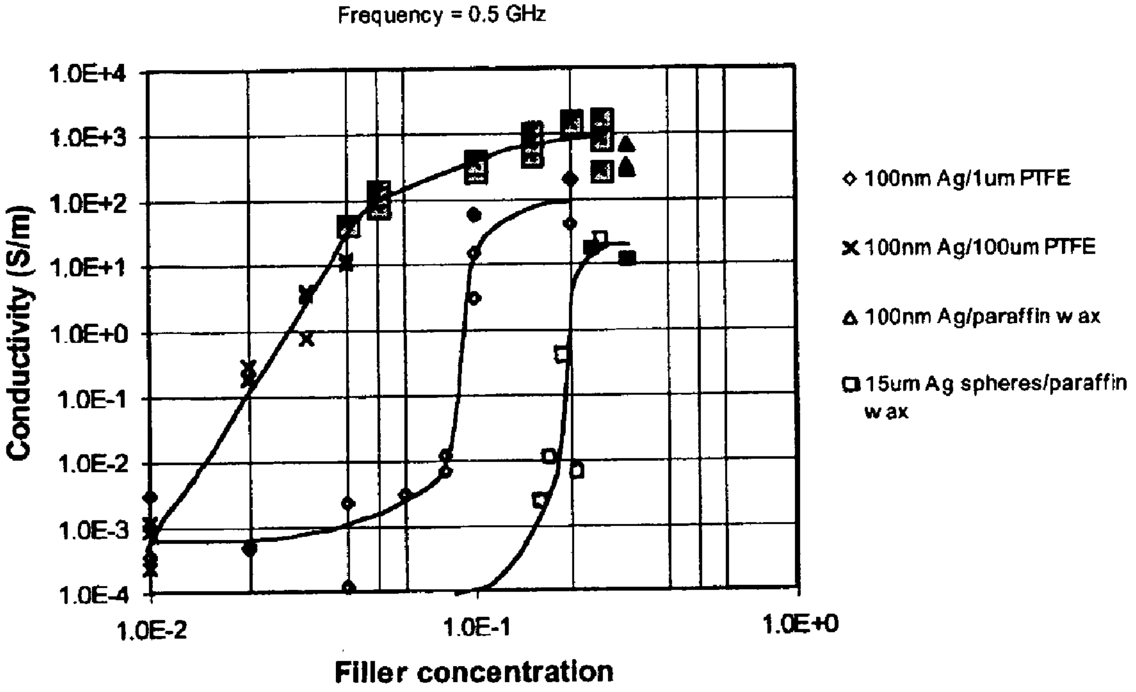

FIGS. 9*a* to 9*f* illustrate, respectively, the theoretical variations in the real permittivity, imaginary permittivity, conductivity, dielectric loss tangent, real electric modulus and imaginary electric modulus for composites with filler concentrations above and below the percolation threshold predicted using the Bruggeman model;

FIGS. 10*a*-10*d* illustrate, respectively, the experimentally determined variation in the real permittivity, conductivity, dielectric loss tangent and imaginary electric modulus respectively of nano-aluminium in PTFV composites;

FIGS. 11*a*-11*d* illustrate, respectively, the experimentally determined variation in the real permittivity, conductivity, dielectric loss tangent and imaginary electric modulus respectively of nano-silver in 100 μm PTFE composites FIGS. 12*a*-12*d* illustrate, respectively, the experimentally determined variation in the real permittivity, conductivity, dielectric loss tangent and imaginary electric modulus respectively of nano-silver in 100 μm PTFE composites FIGS. 13*a* to 13*d* illustrate the experimentally determined variation of the real permittivities in the microwave region for different nano-silver in 100 μm PTFE composites;

FIGS. 13*e*, 13*f* and 13*g* illustrate the experimentally determined variation in conductivity, real permeability and imaginary permeability, respectively, for different nano-silver in 100 μm PTFE;

FIGS. 14*a* to 14*d* illustrate the experimentally determined variation of permittivity in the microwave region for different nano-silver in 1 μm PTFE composites;

FIGS. 14*e*, 14*f* and 14*g* illustrate the experimentally determined variation in conductivity, real permeability and imaginary permeability, respectively, for different nano-silver in 1 μm PTFE composites;

FIG. 14*h* is a comparison of the filler concentration dependence of conductivity for different silver-filled composites, highlighting variations in the gradient of the percolation (insulator-conductor) transition (solid data points and data points with a background represent samples exhibiting a plasma-like response).

Figure 15A:
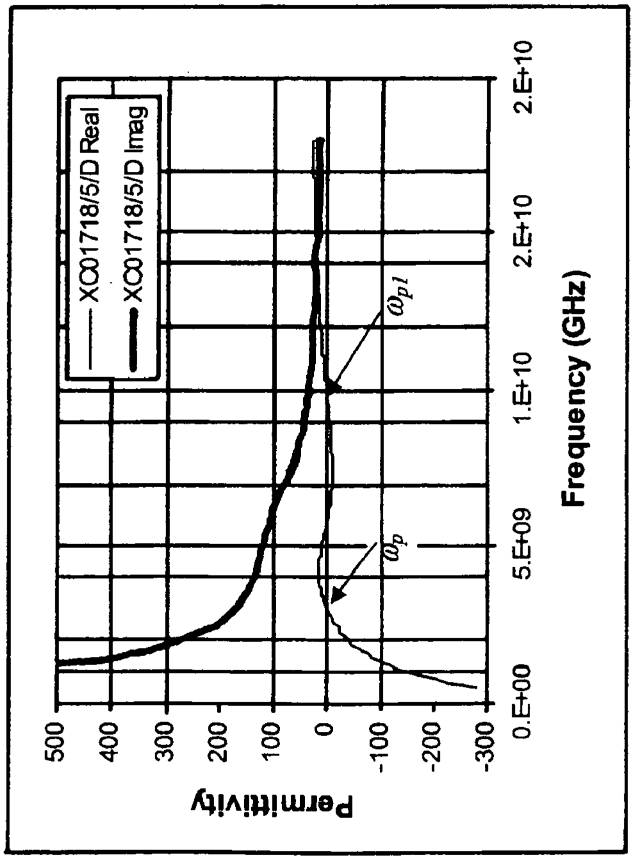
Figure 15B:
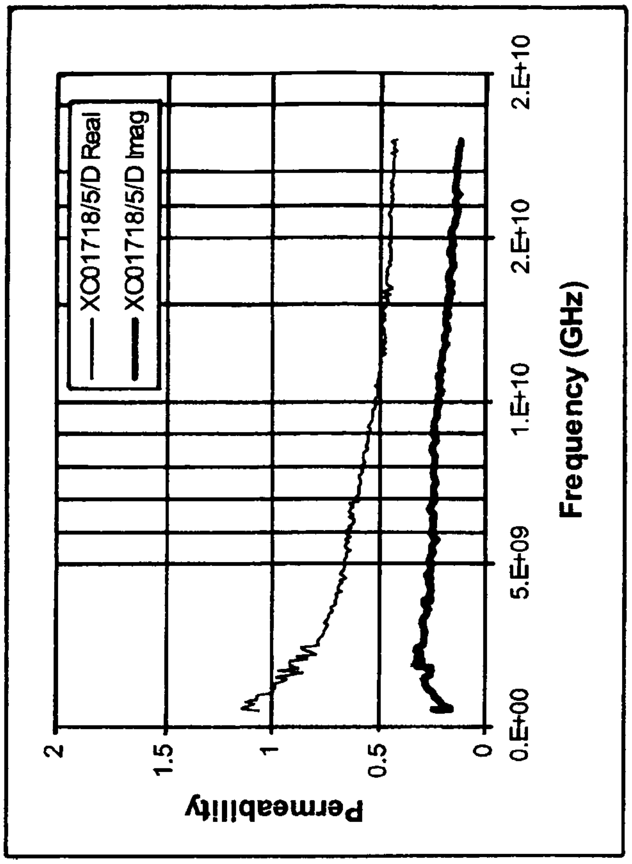
Figure 16A:
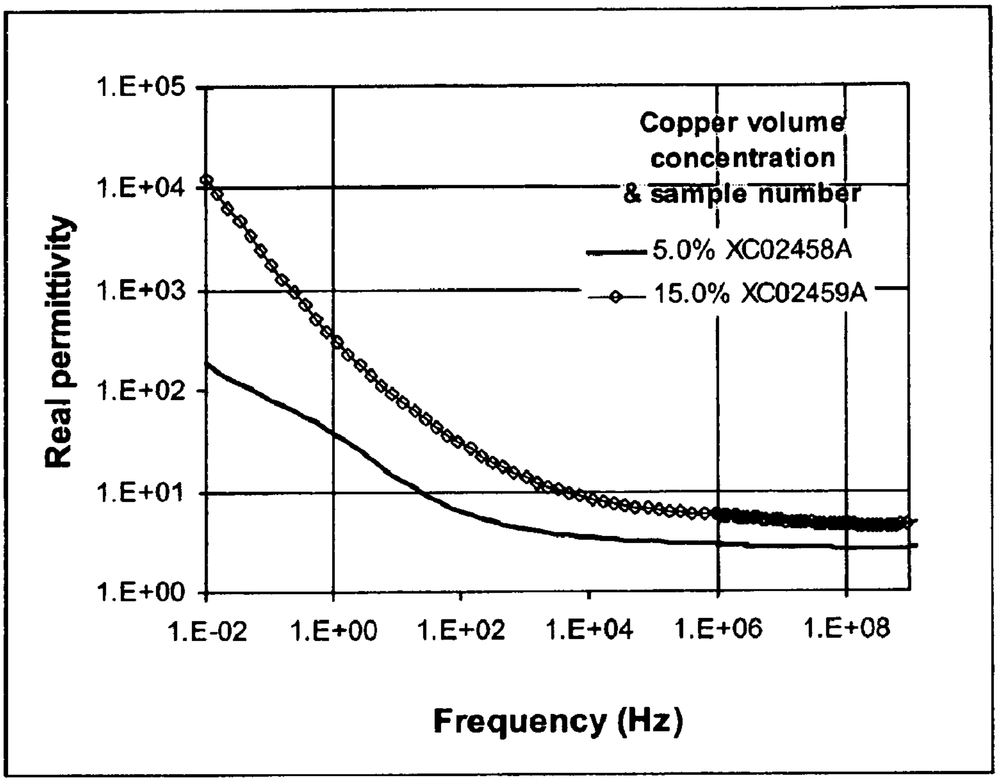
Figure 16B:
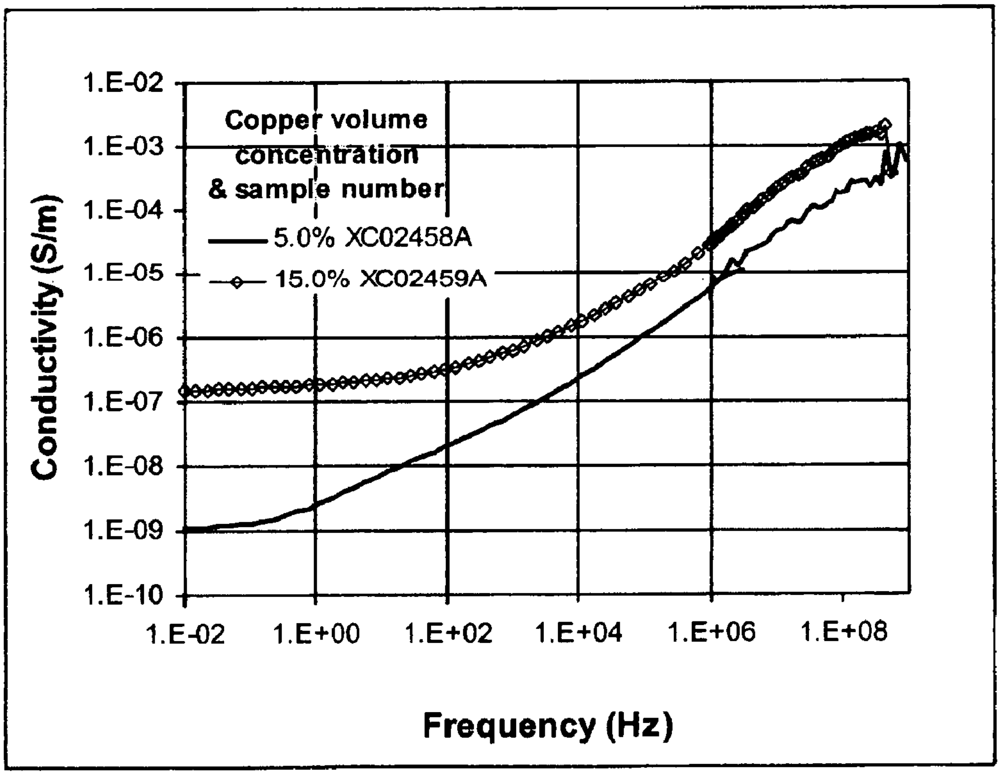
Figure 16C:
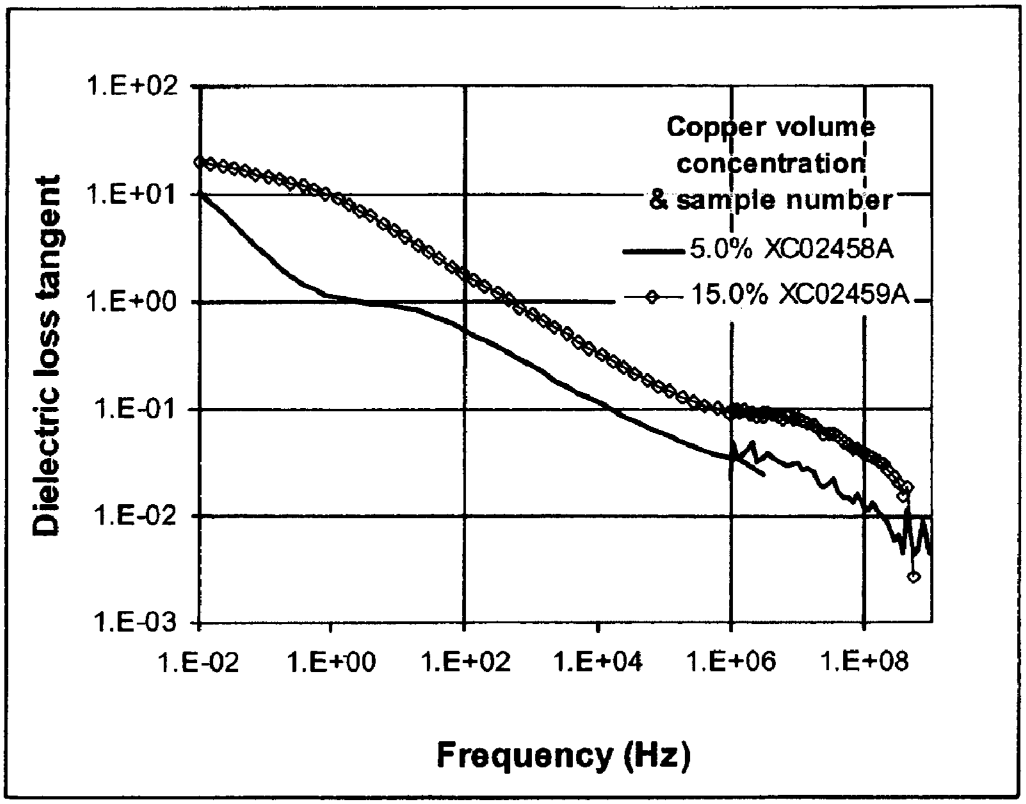
Figure 16D:
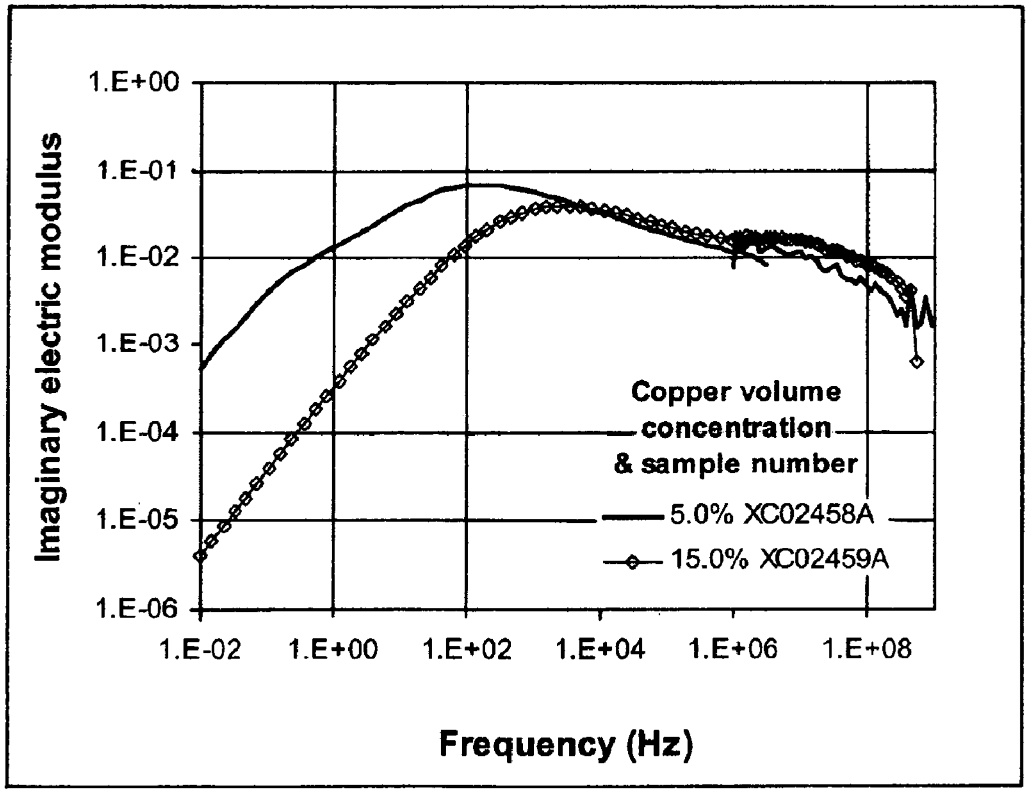
Figure 17A:
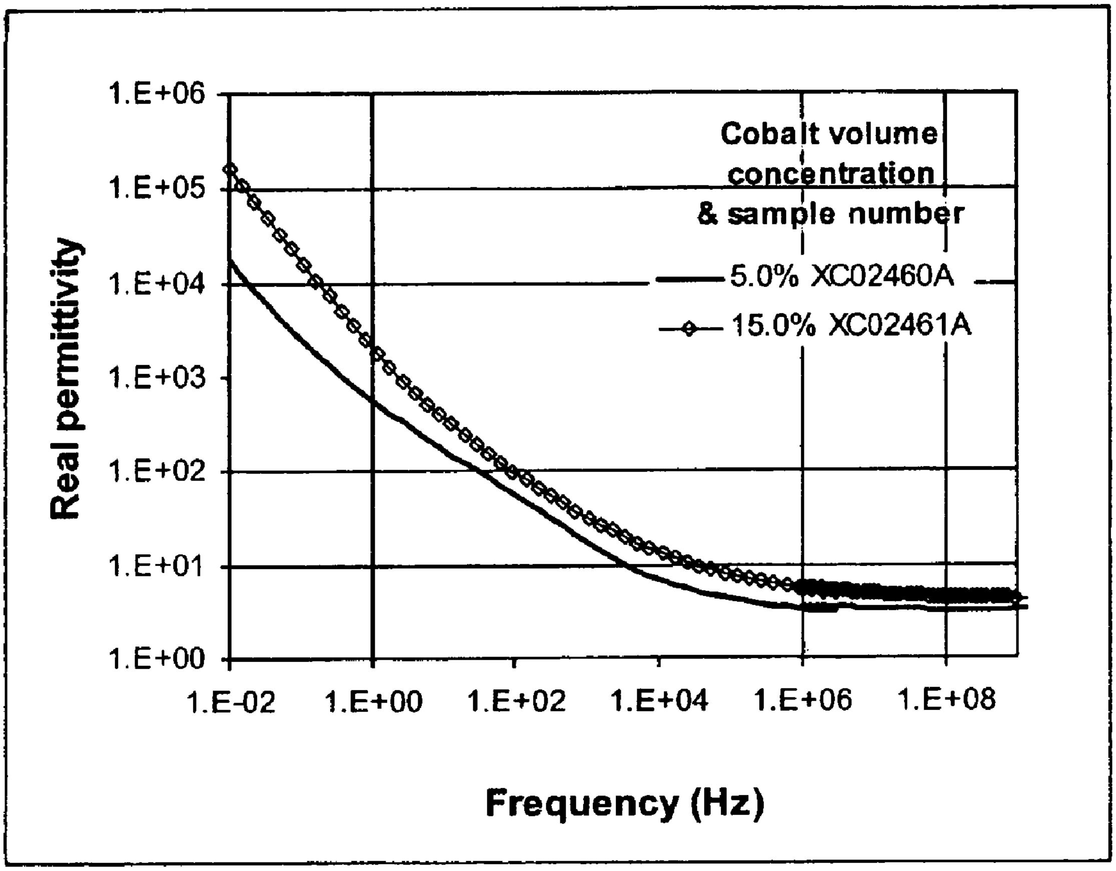
Figure 17B:
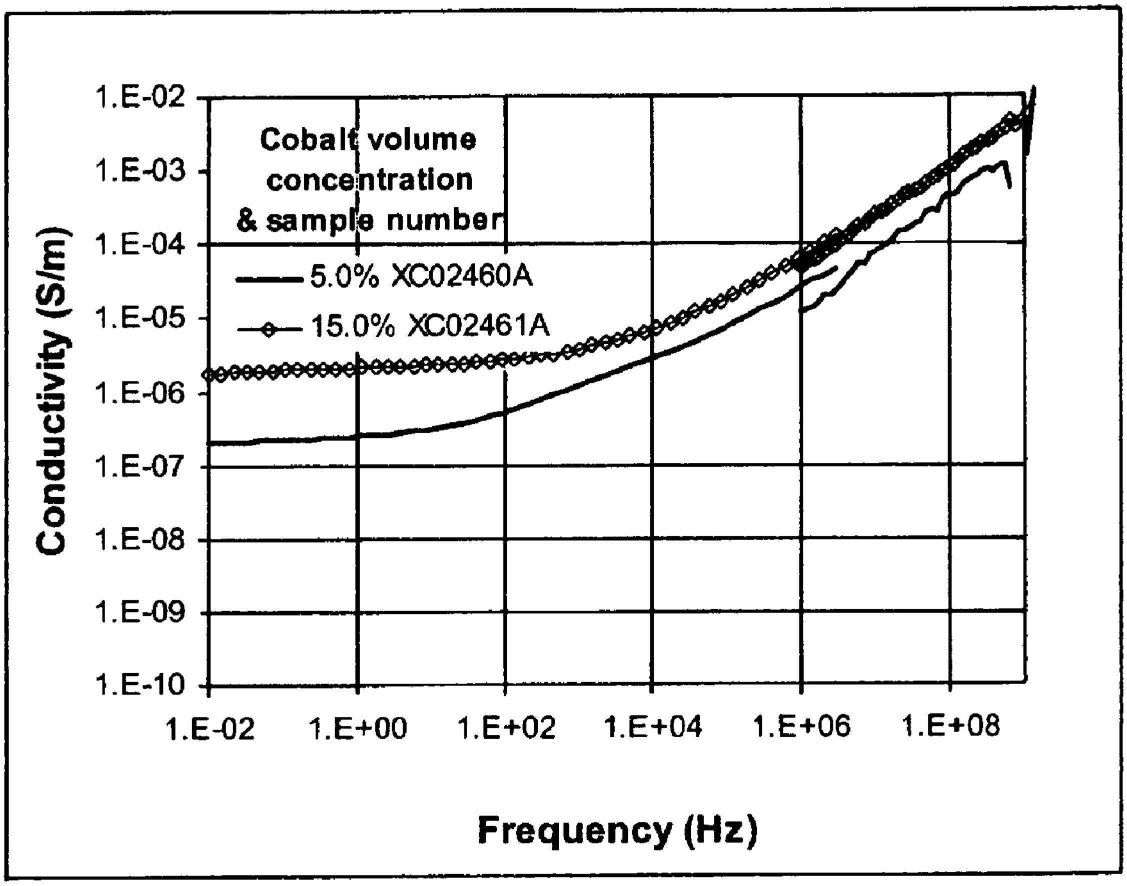
Figure 17C:
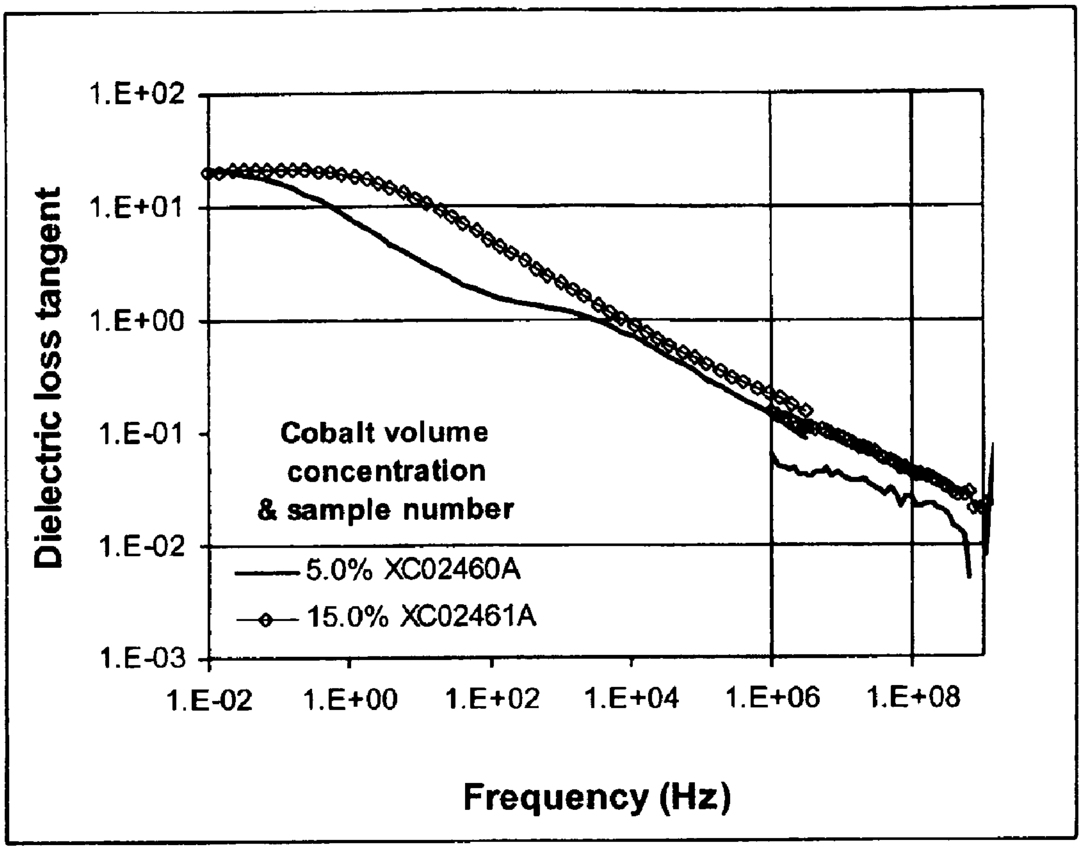
Figure 17D:
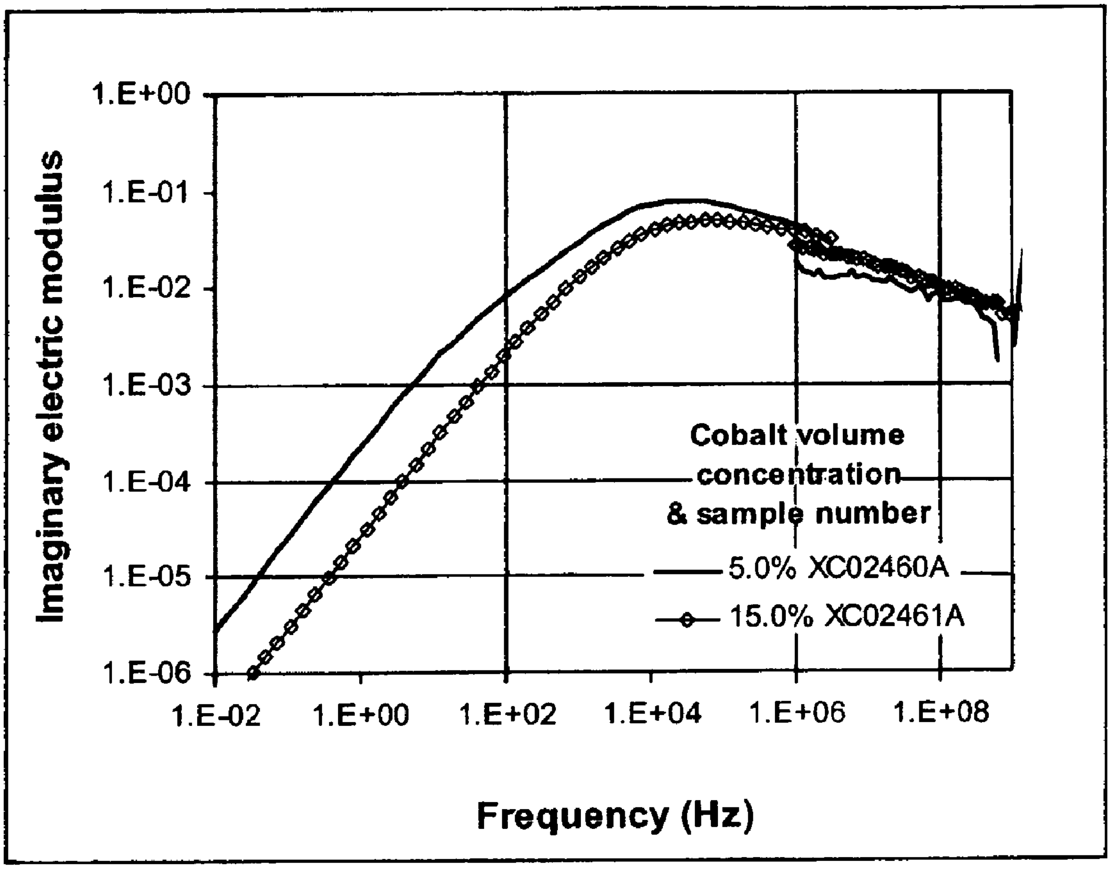
Figure 18A:
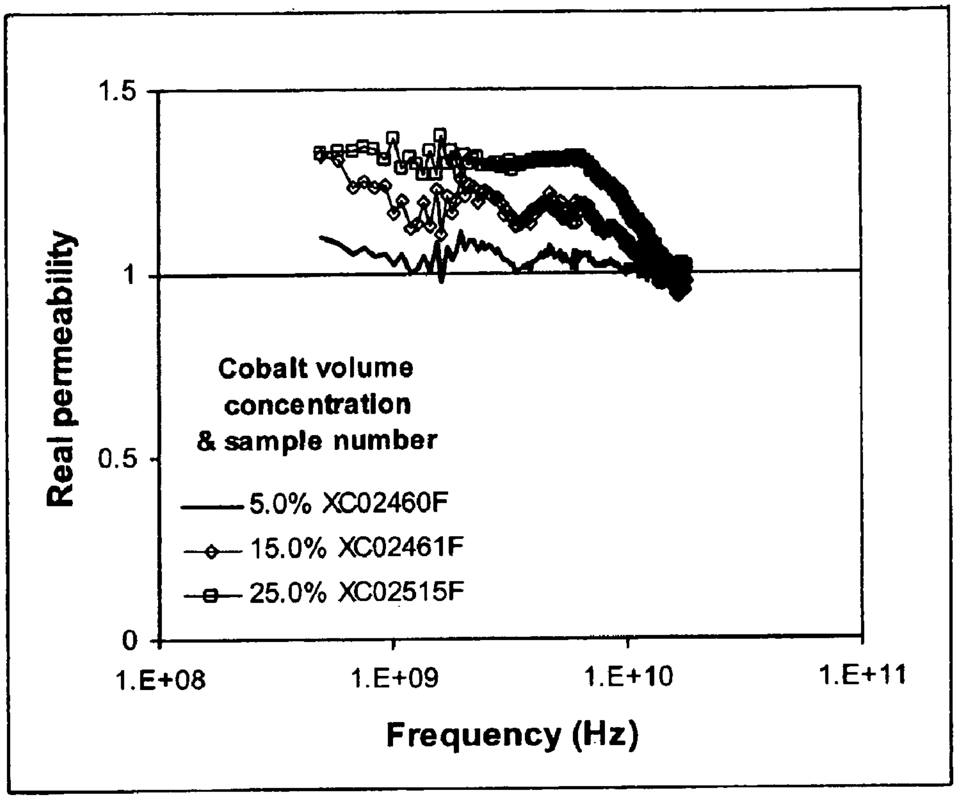
Figure 18B:
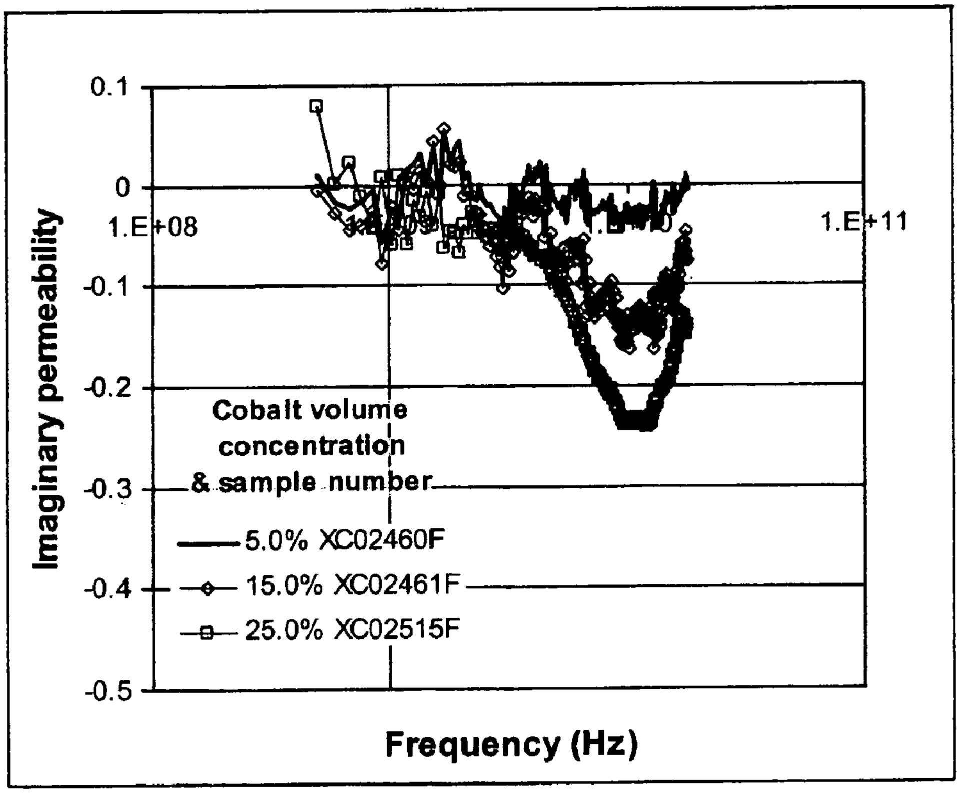
Figure 18C:
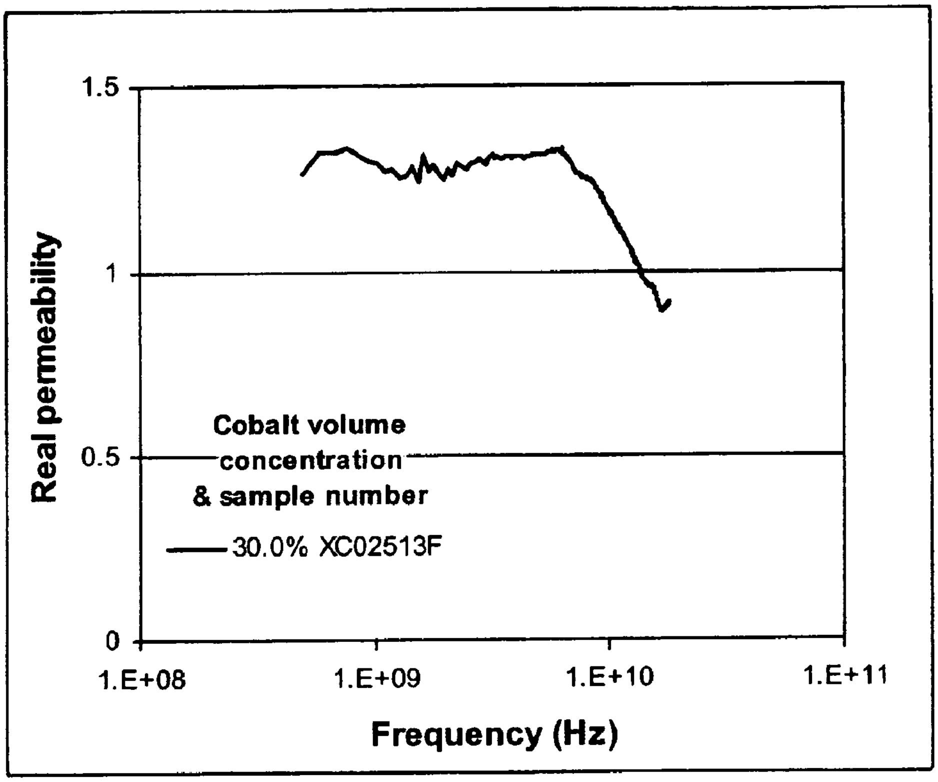
Figure 18D:
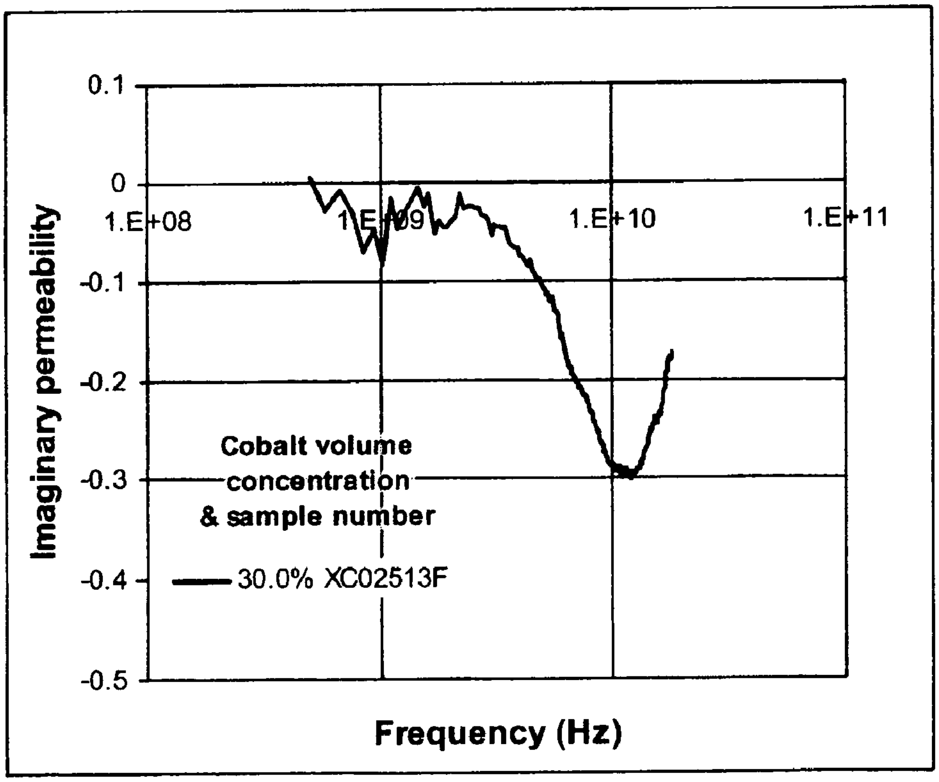
Figure 19B:
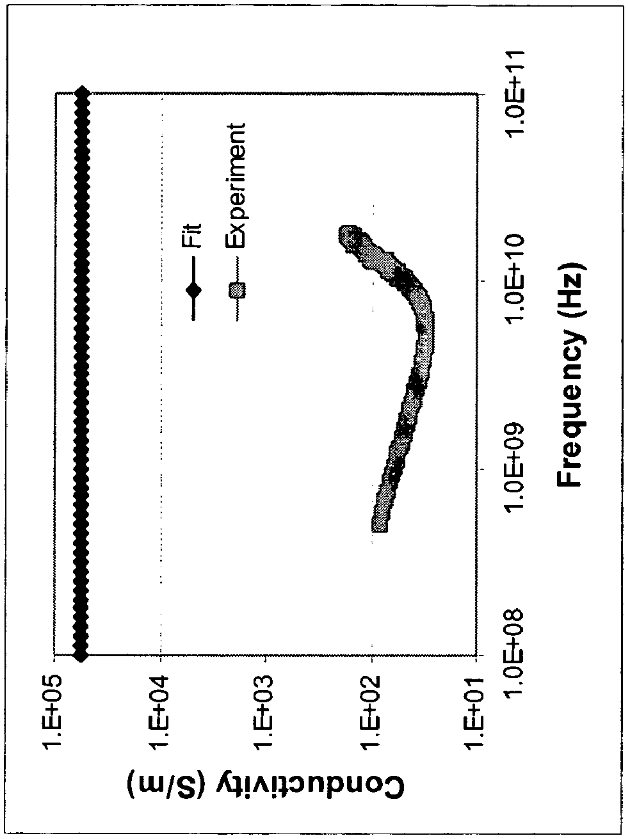
Figure 19A:
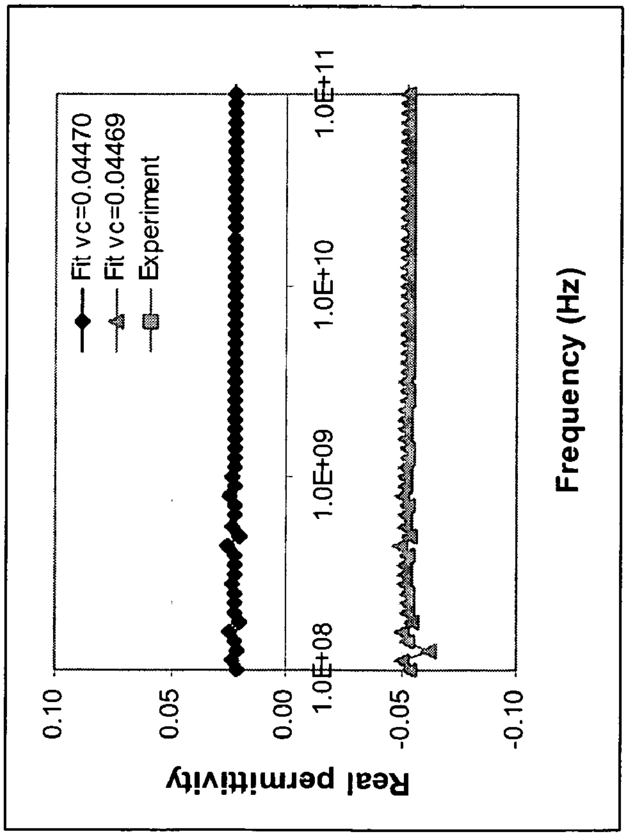
Figure 19D:
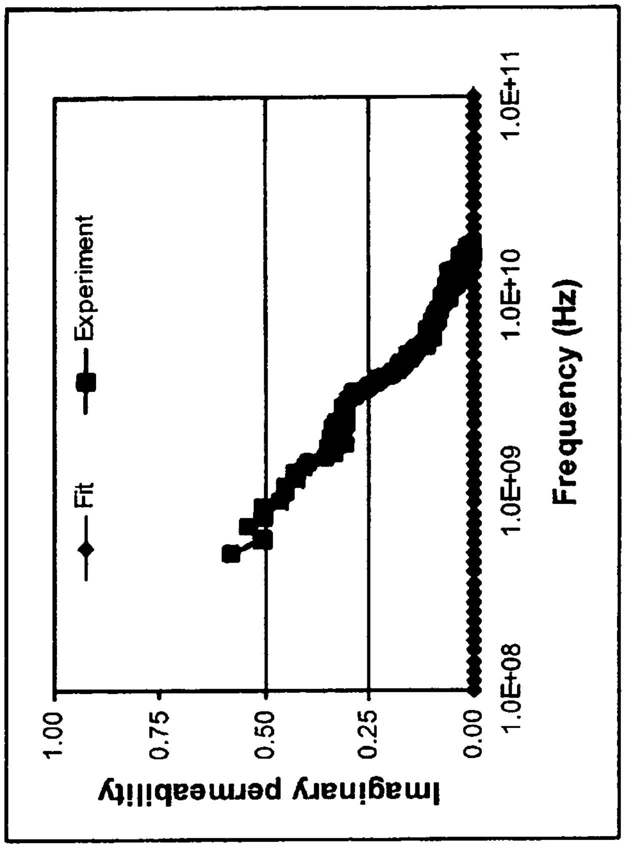
Figure 19C:
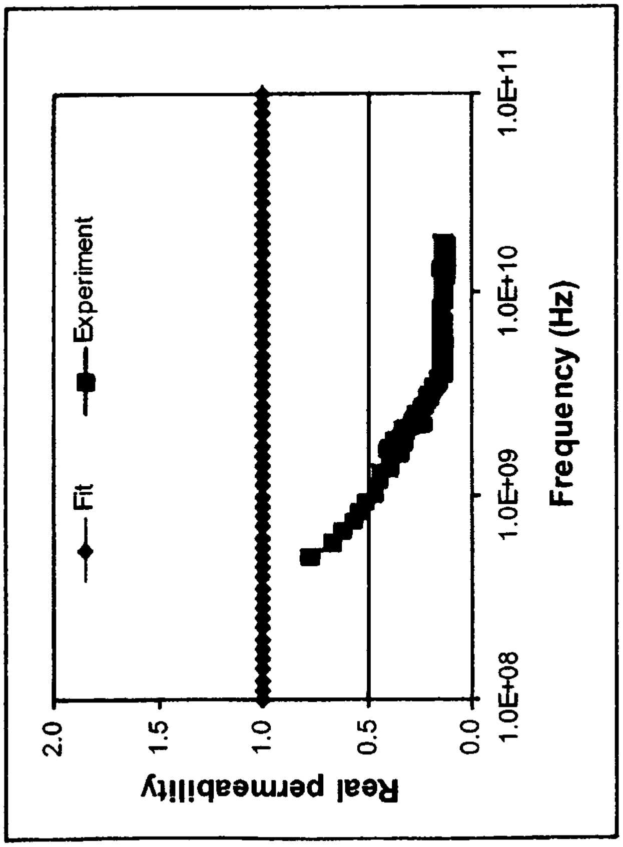
Figure 20A:
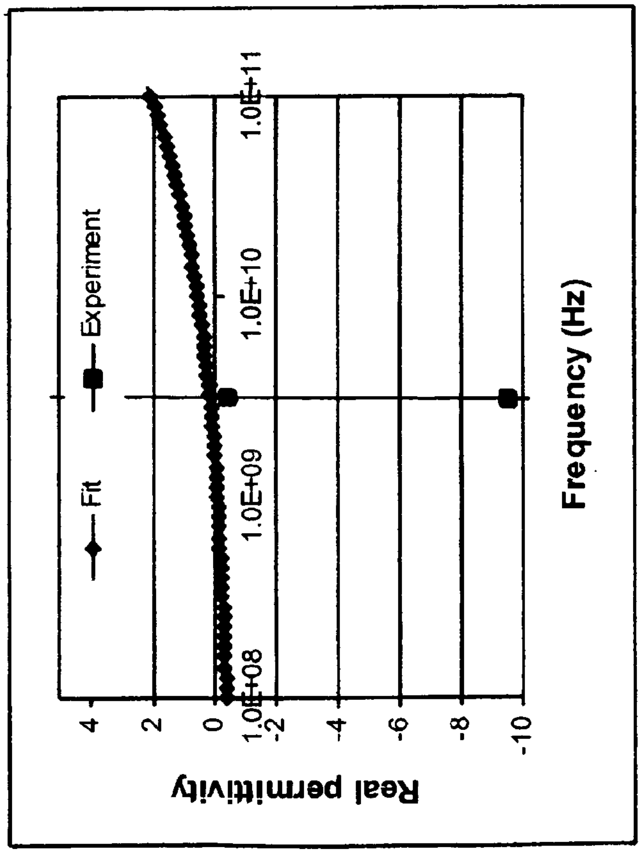
Figure 20B:
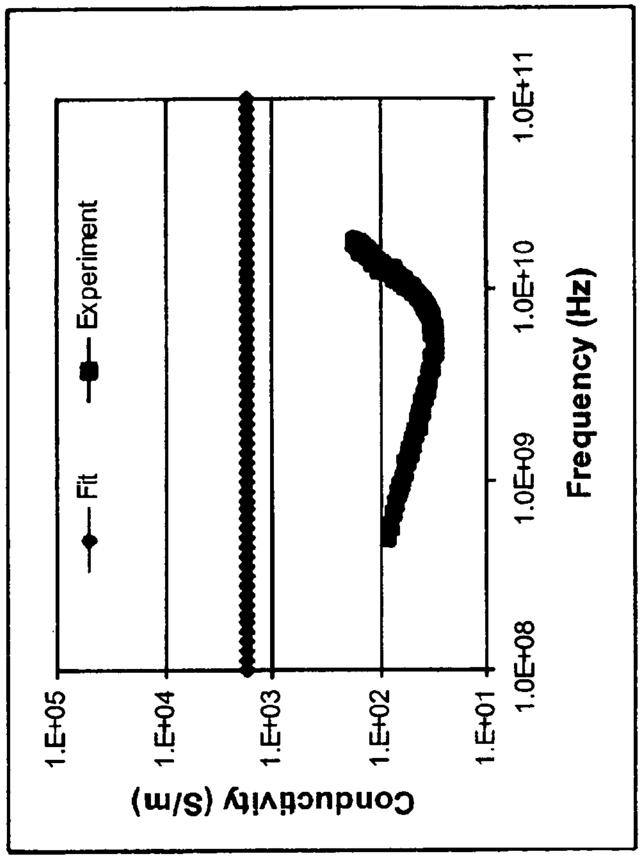
Figure 20C:
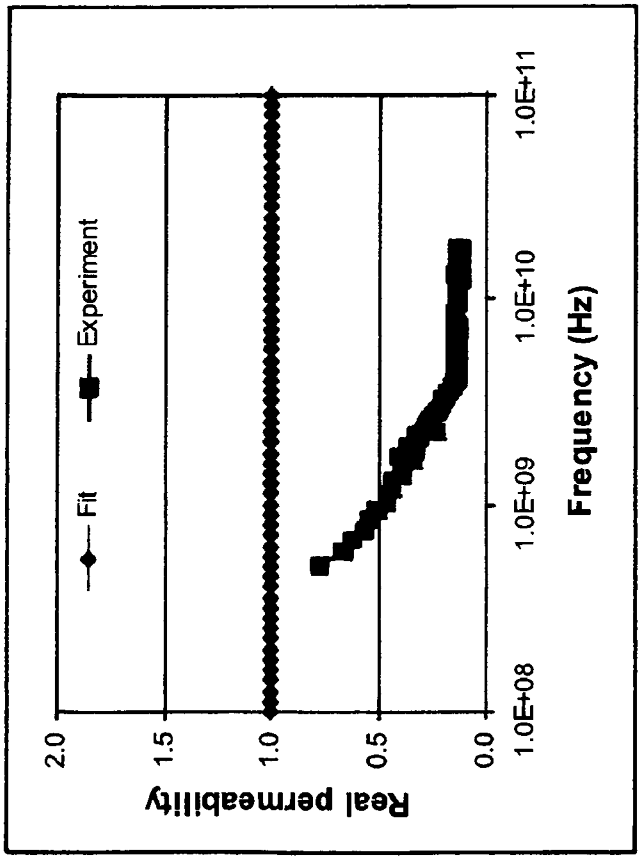
Figure 20D:
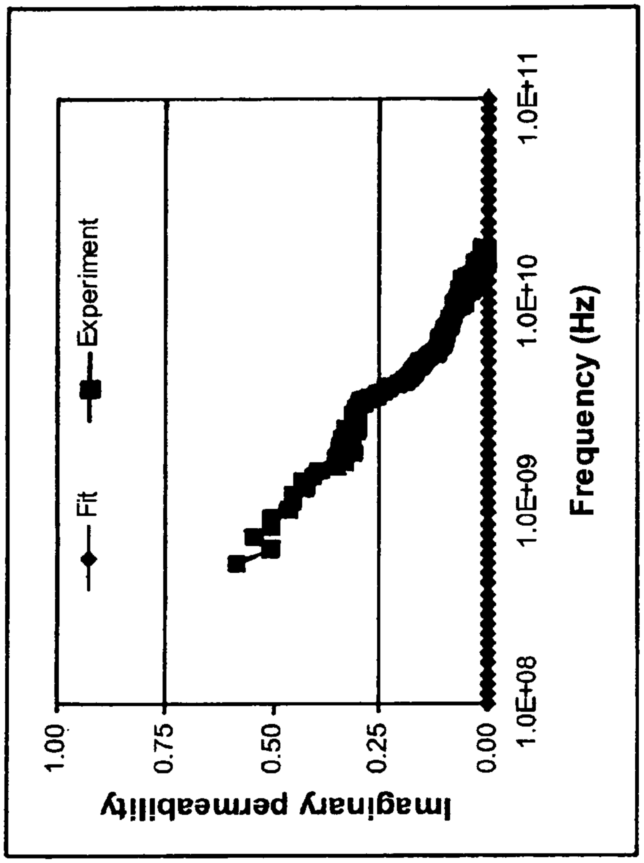
Figure 23A:
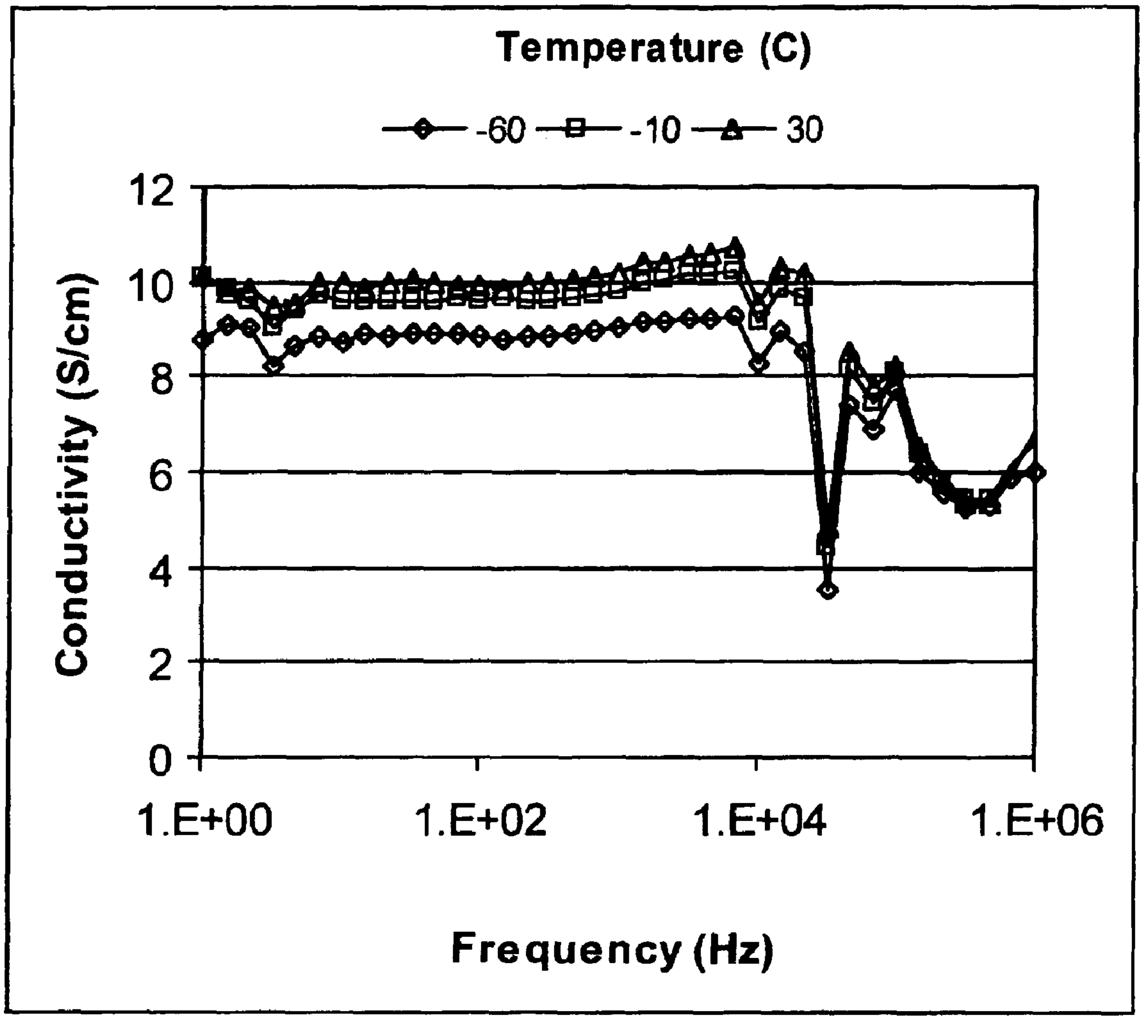
Figure 23B:
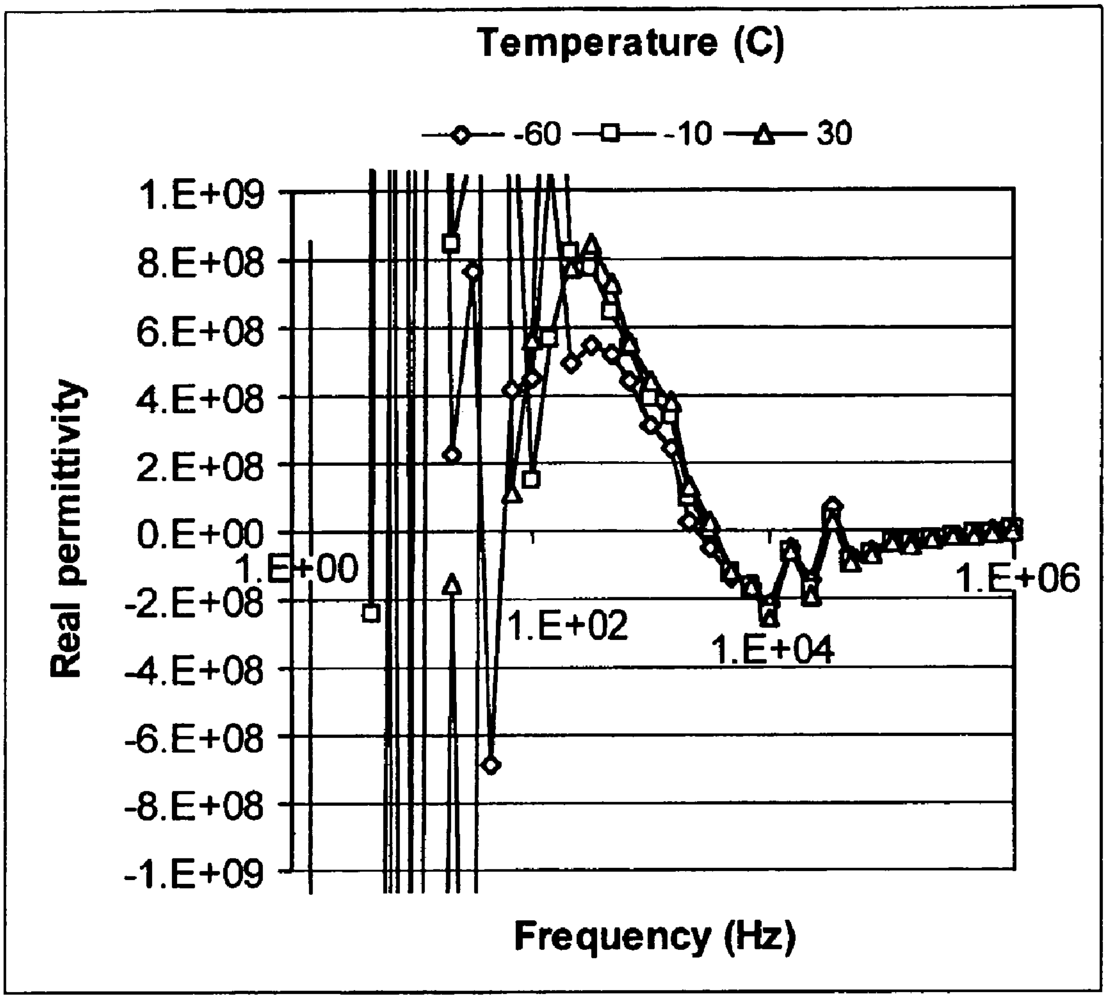

FIGS. 15*a* and 15*b* illustrate the experimental complex permittivity spectrum of a titanium diboride PTFE composite;

FIGS. 16*a* to 16*d* illustrate the experimentally determined dielectric response of nano-copper PTFE composites;

FIGS. 17*a* to 17*d* illustrate the experimentally determined dielectric response of nano-cobalt PTFE composites;

FIGS. 18*a* to 18*d* illustrate the experimentally determined microwave magnetic permeability spectra of cobalt PTFE and cobalt wax composites;

FIGS. 19*a* to 19*d* illustrate the fit between experimental data and modelled or theoretical data using the fitting parameters given in Table 3;

FIGS. 20*a* to 20*d* illustrate the fit between experimental data and modelled or theoretical data using the fitting parameters given in Table 4;

FIGS. 21*a* to 21*h* show SEM (scanning electron microscope) images of PTFE and nano-silver particles composites;

FIGS. 22*a* to 22*d* show a further fit between experimental data and modelling or theoretical data using the fitting parameters given in Table 5;

FIG. 23*a* shows low frequency conductivity measurements for nano-silver compositions; and FIG. 23*b* shows low frequency real permittivity measurements for the nano-silver samples of FIG. 23*a*.

Figure 5:
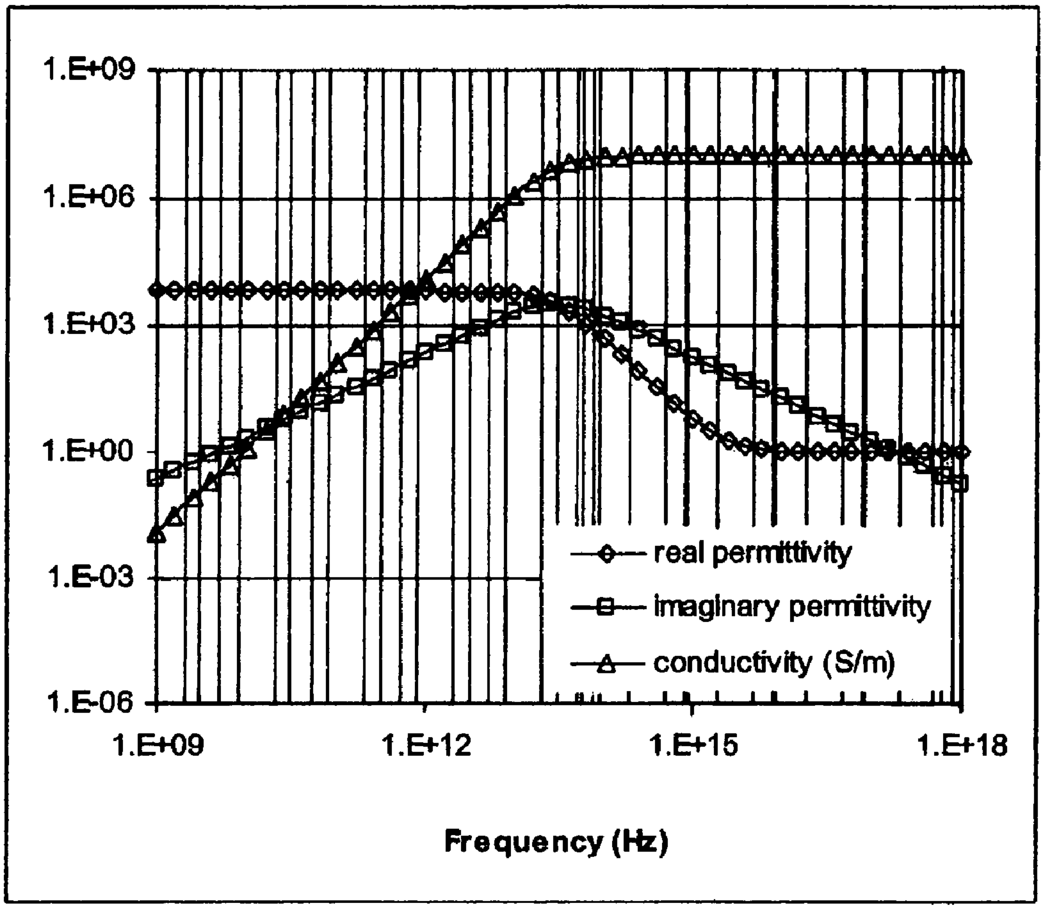
FIG. 5 shows the theoretical electromagnetic properties for the composite material of FIG. 4, but with a filler volume fraction or concentration of 99.9 vol % predicted using Maxwell-Garnett mixture law.
Figure 6:
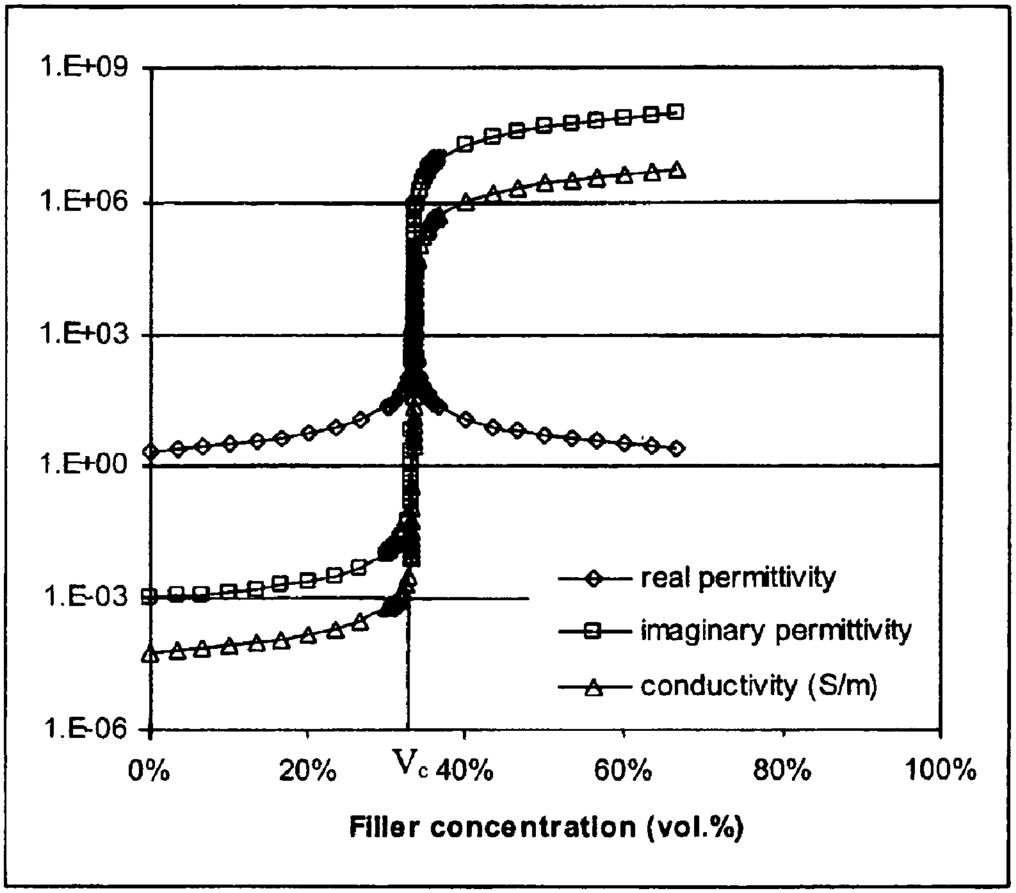
FIG. 6 shows the theoretical variation of composite permittivity and conductivity with filler volume fraction or concentration predicted using the Bruggeman model.
Figure 24:
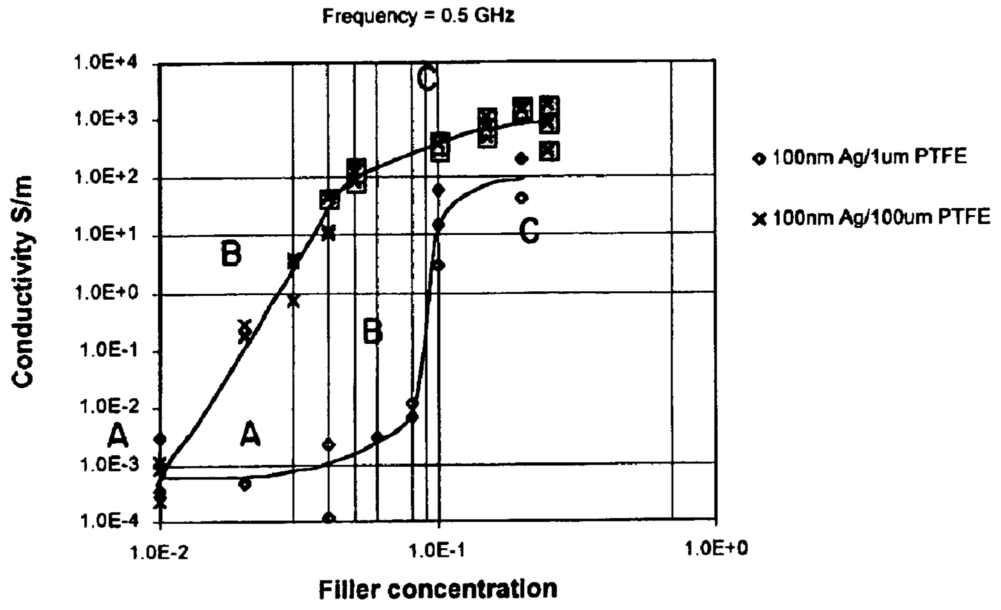
Figure 25:
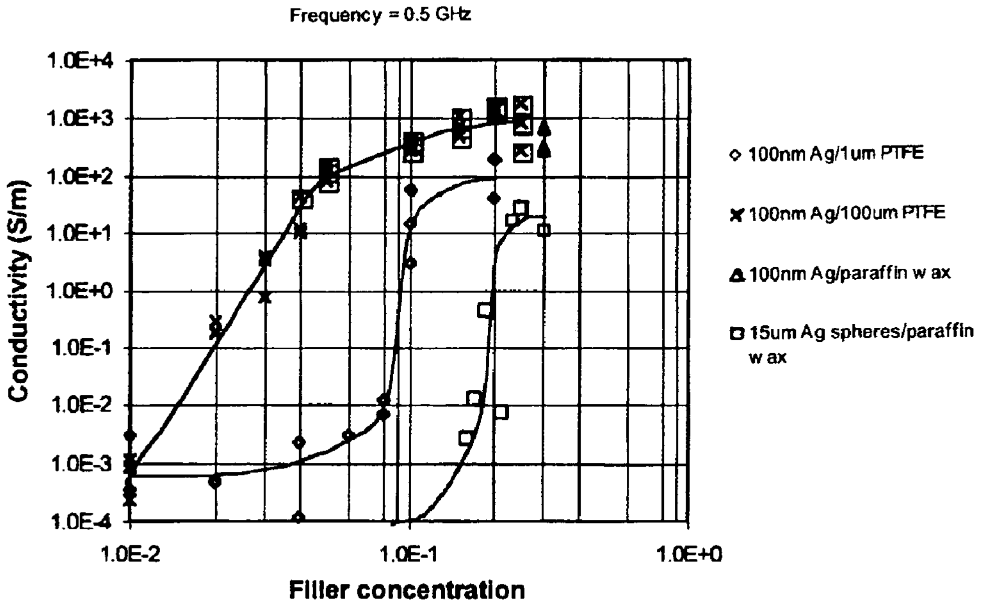
Figure 26:
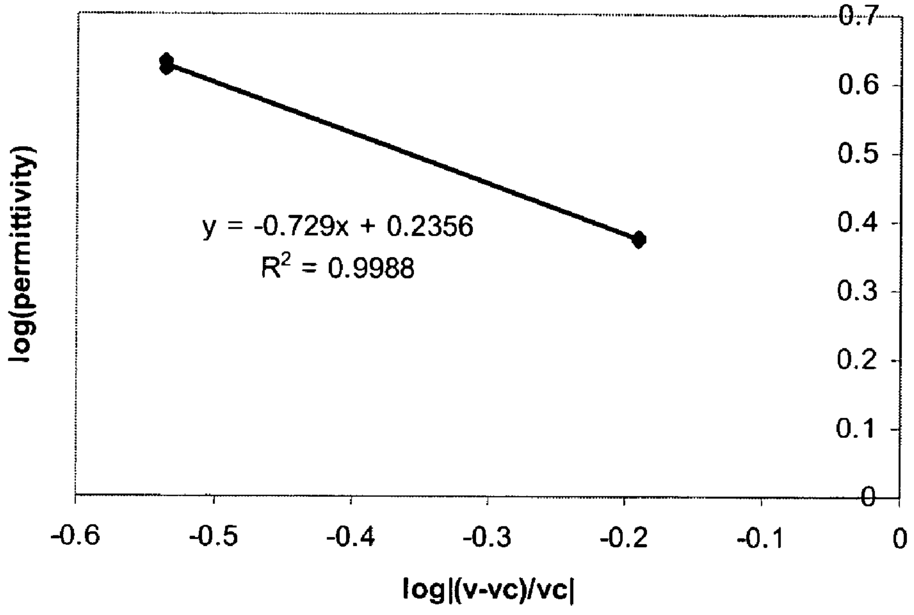
Figure 27:
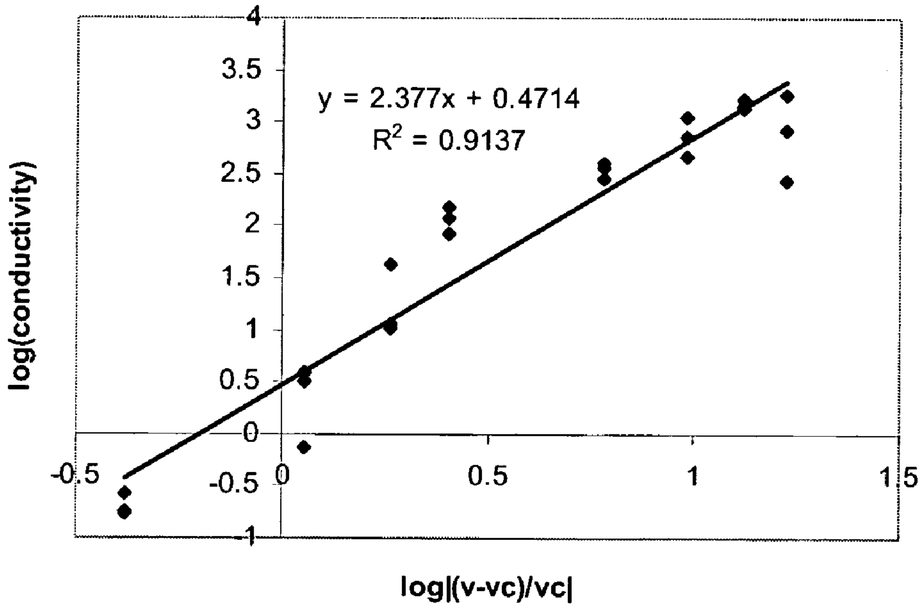
Figure 28:
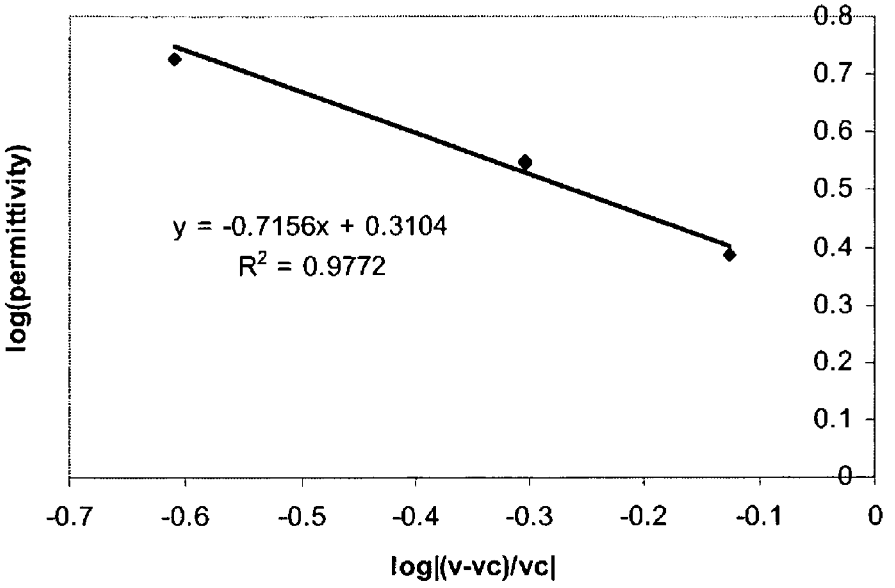
Figure 29:
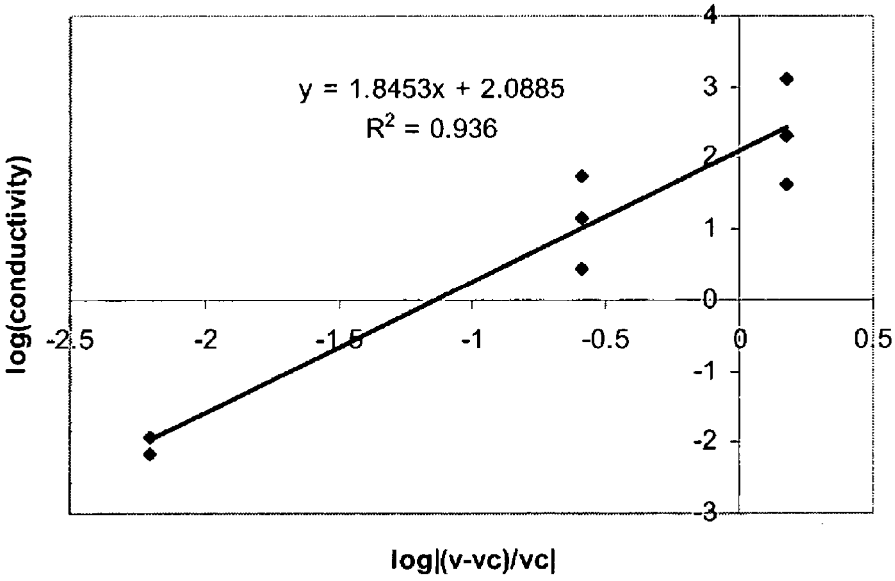
Figure 30:
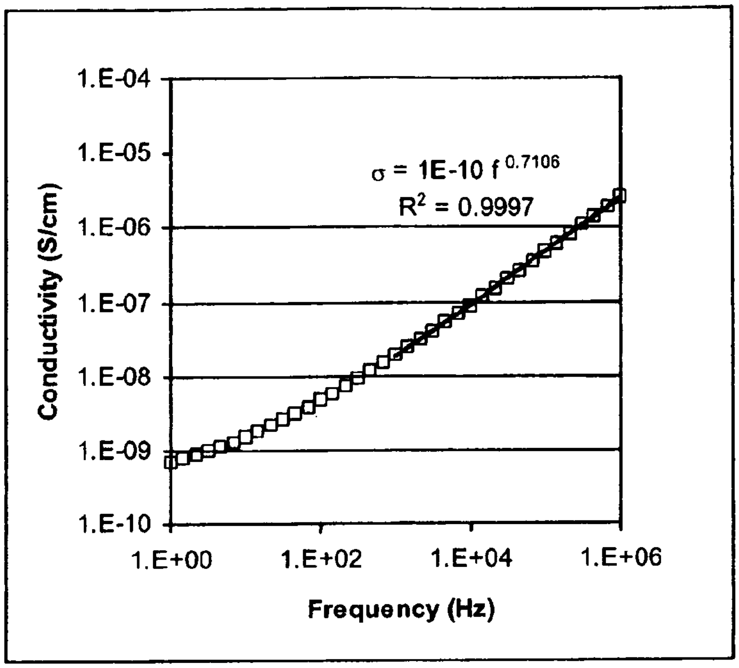
Figure 31:
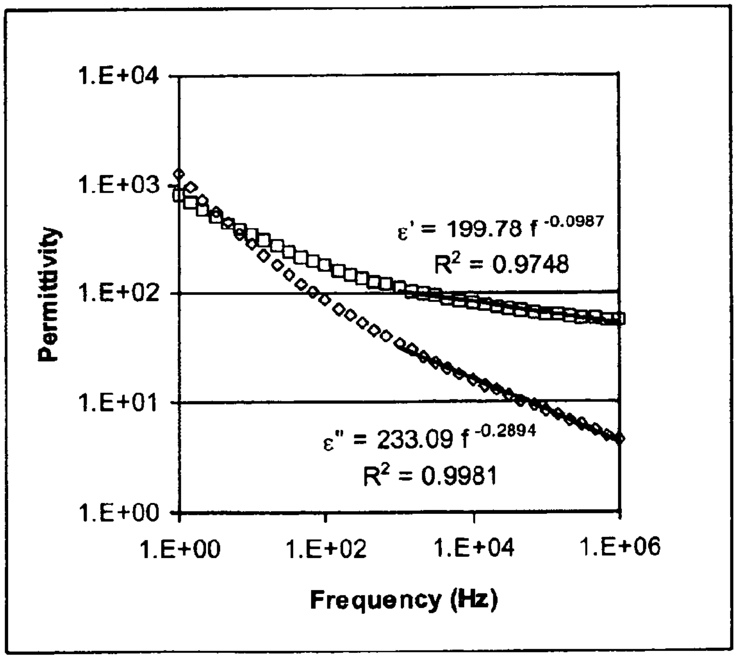
Figure 32:
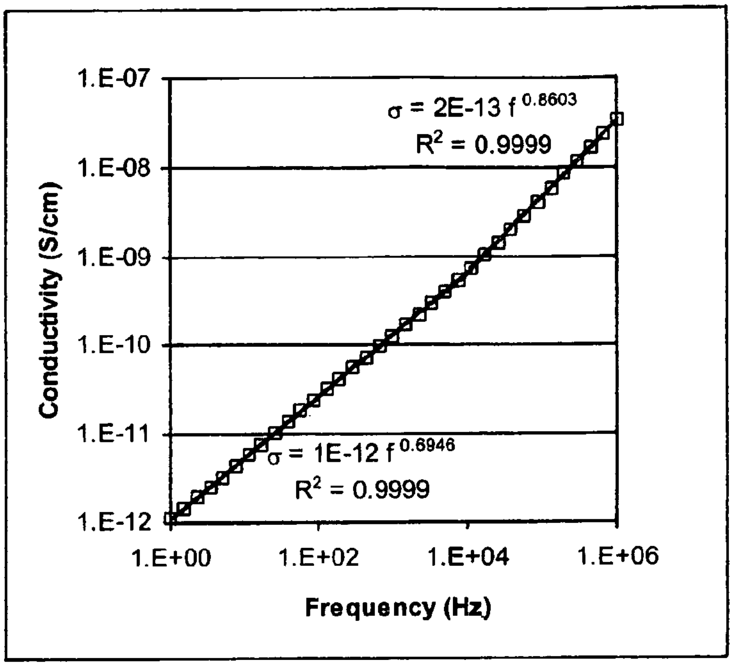
Figure 33:
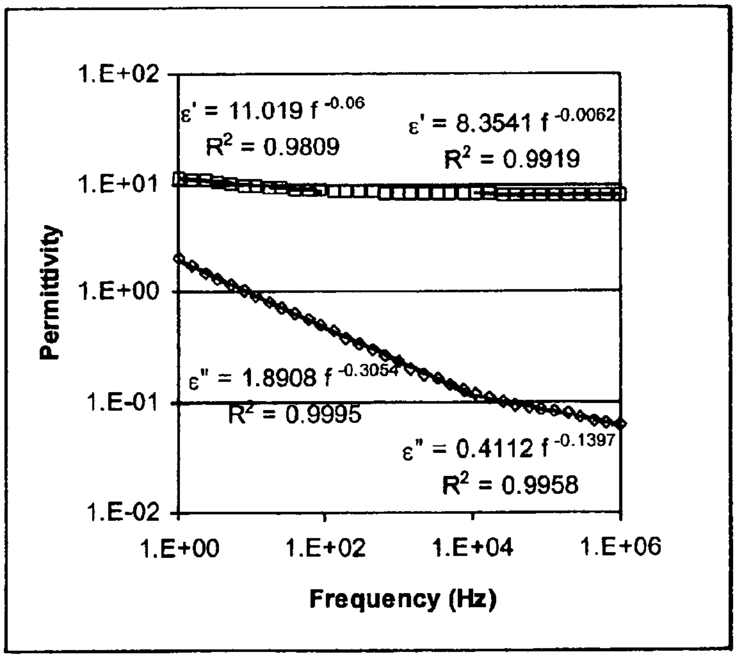
Figure 34:
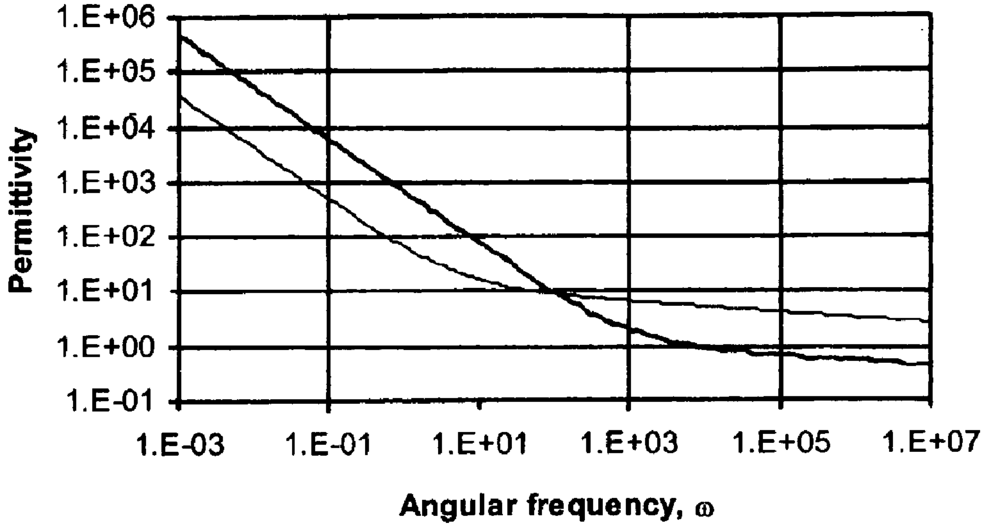
Figure 35:
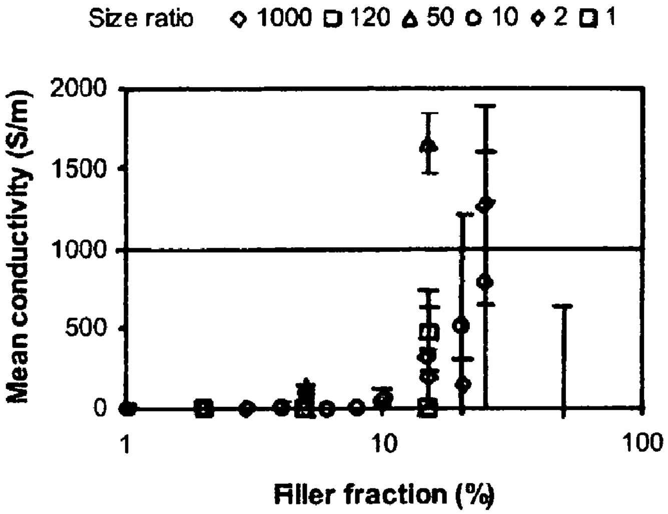
Figure 36:
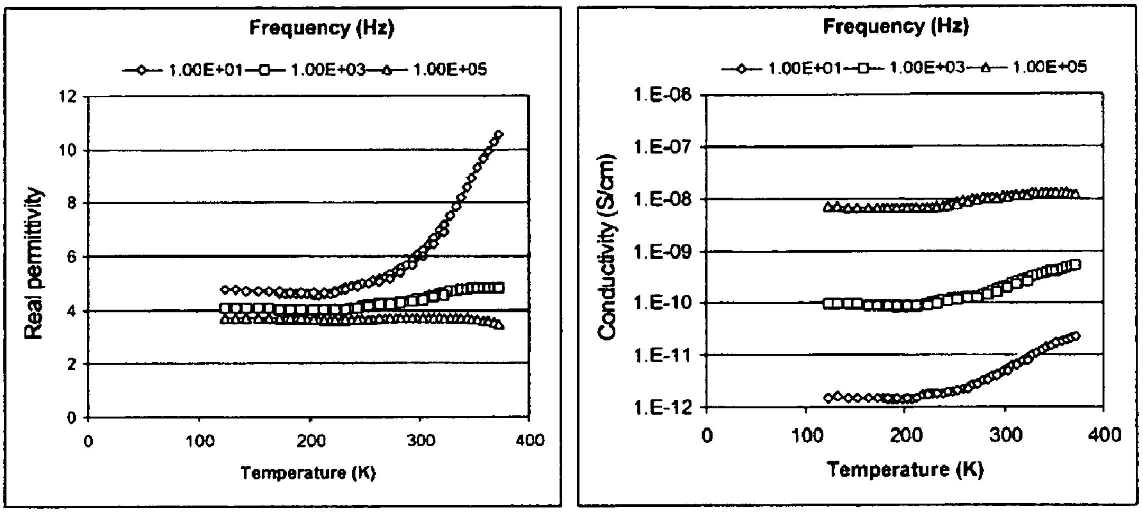
Figure 37A:
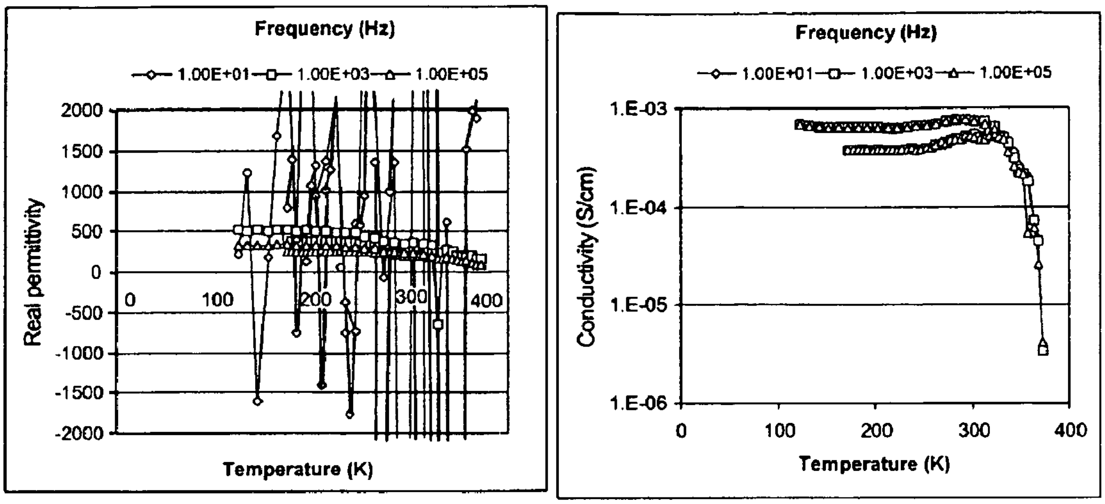
Figure 37B:
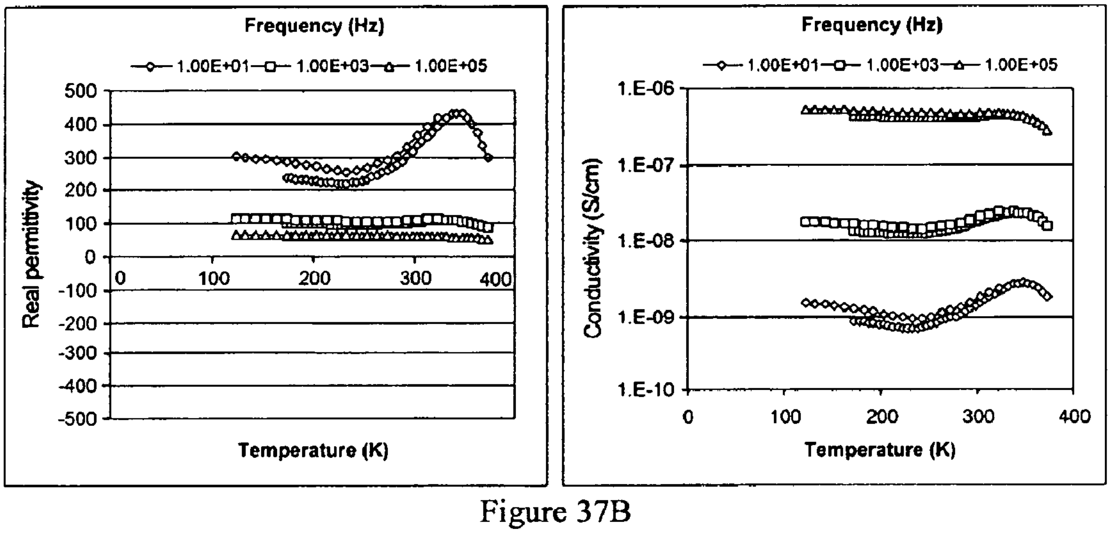
Figure 37C:
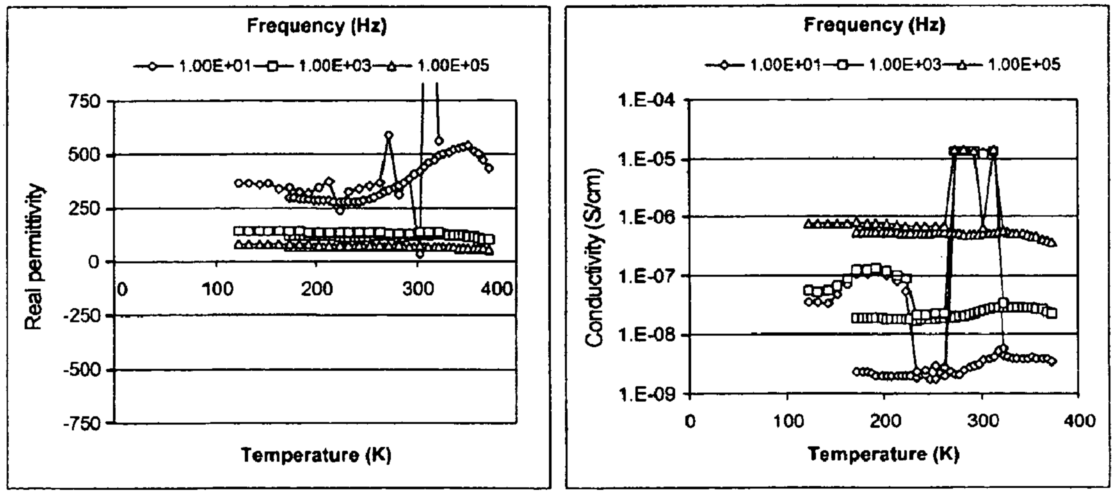
Figure 38:
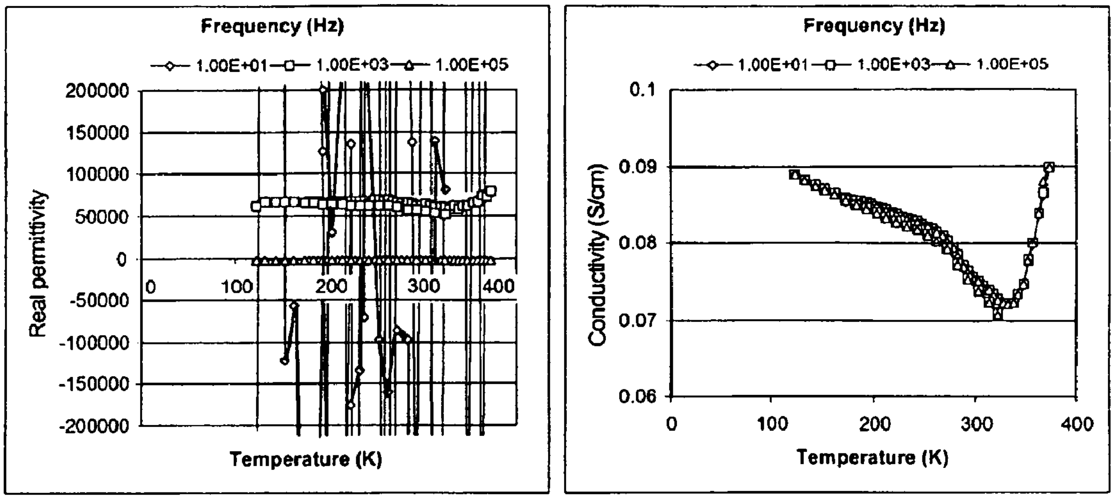
Figure 39:
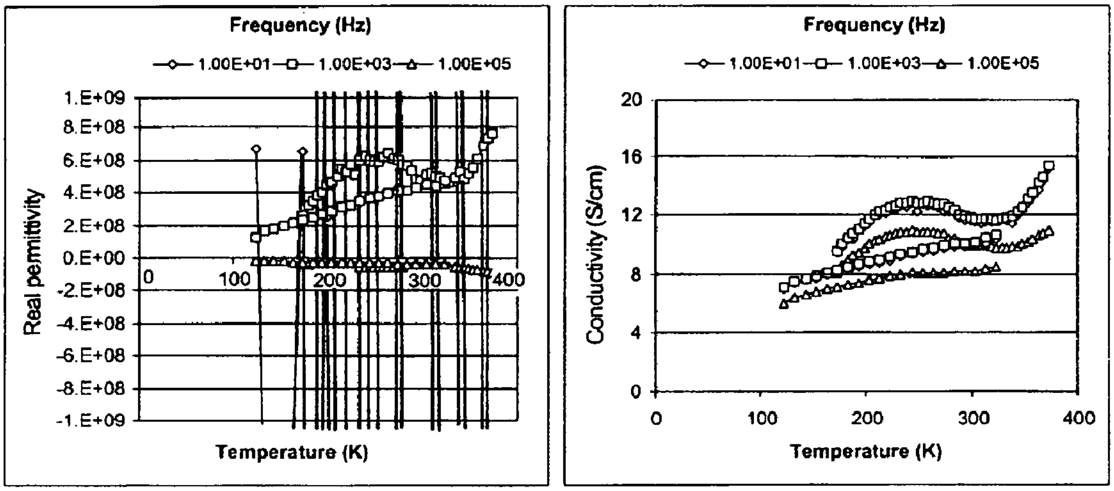
Figure 40:
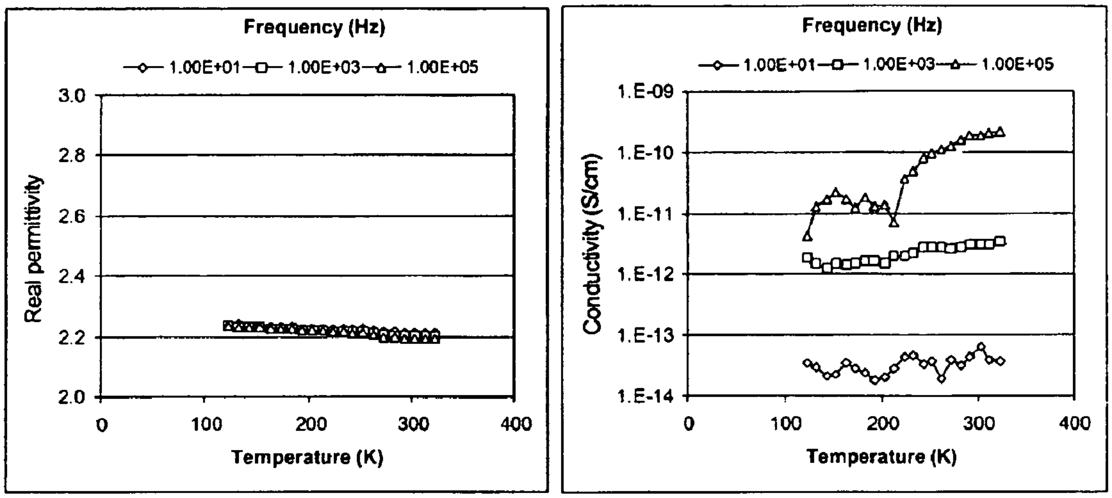
Figure 41:
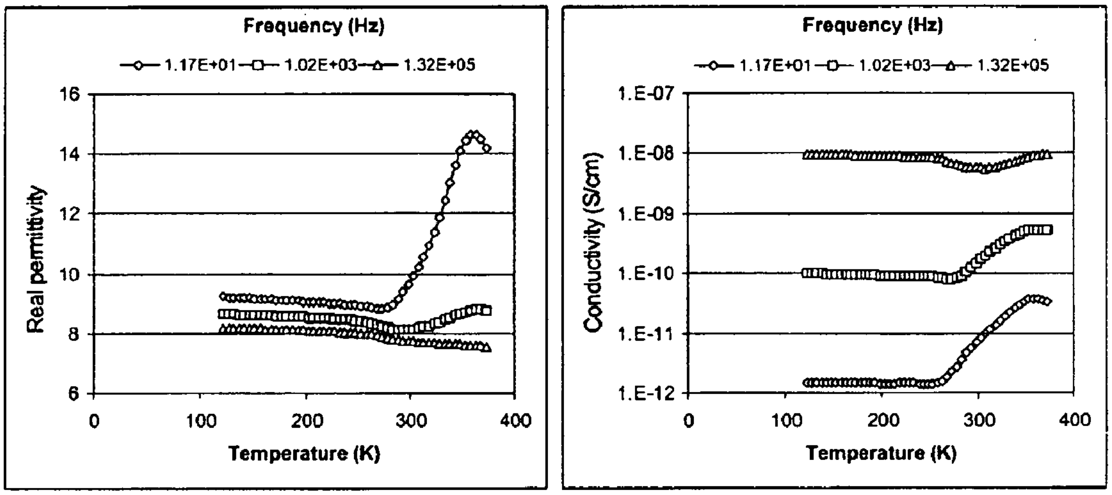
Figure 42B:
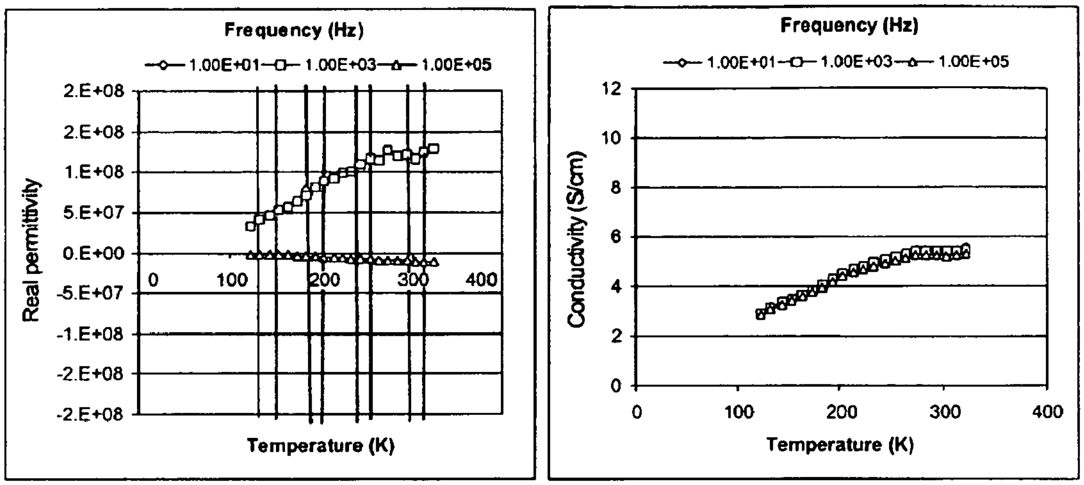
Figure 42C:
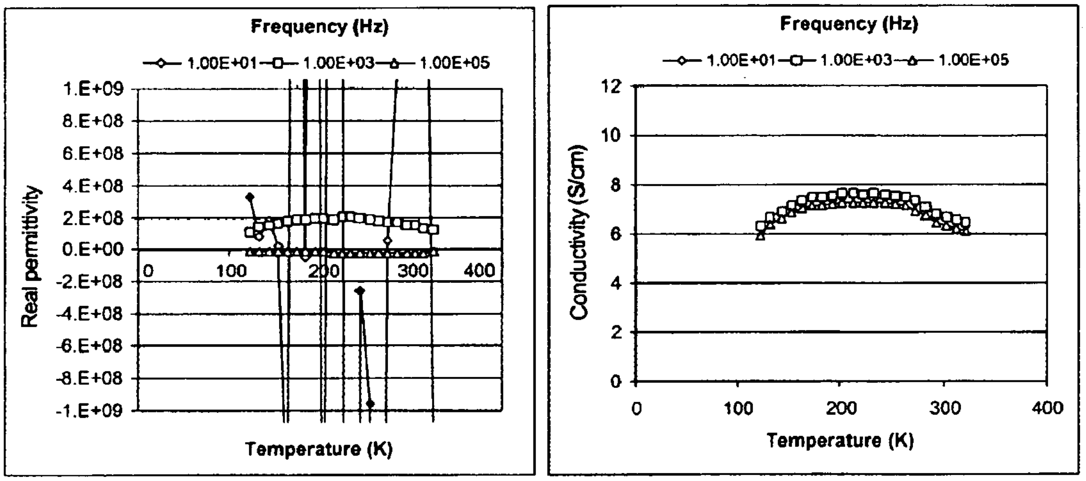
Figure 43:
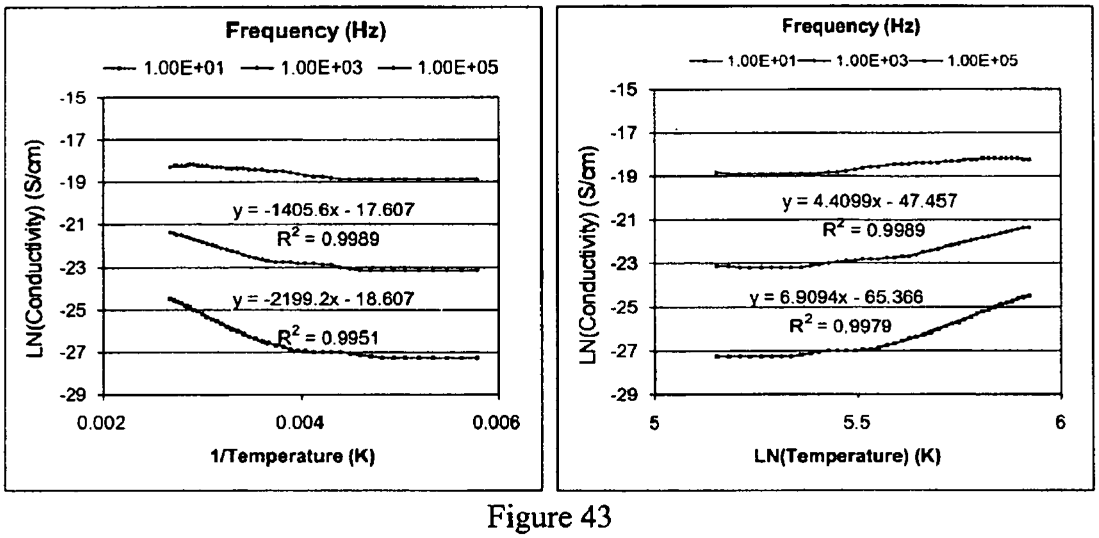
Figure 44:
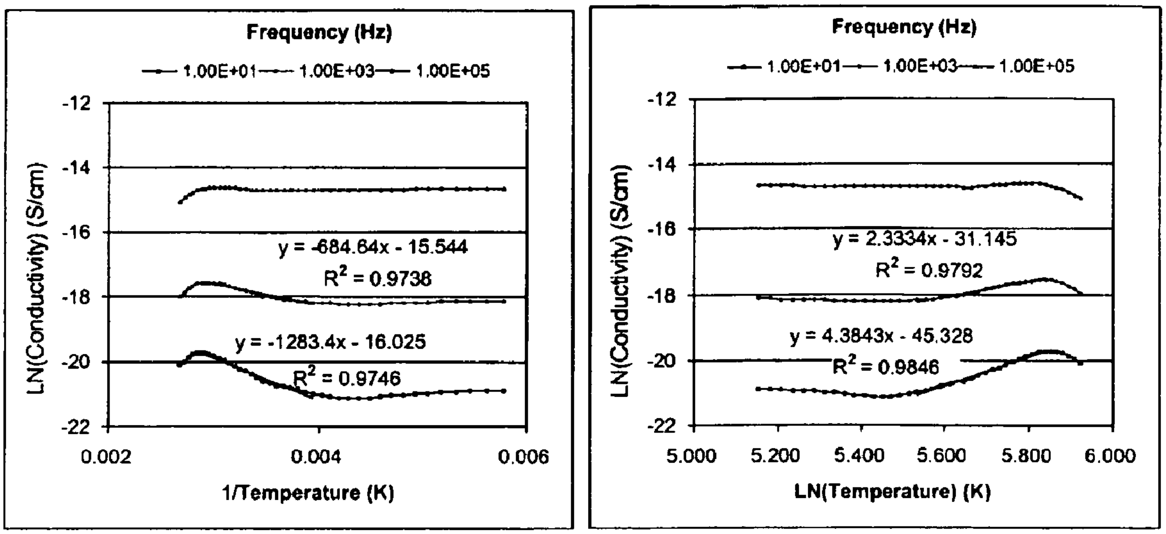
Figure 45:
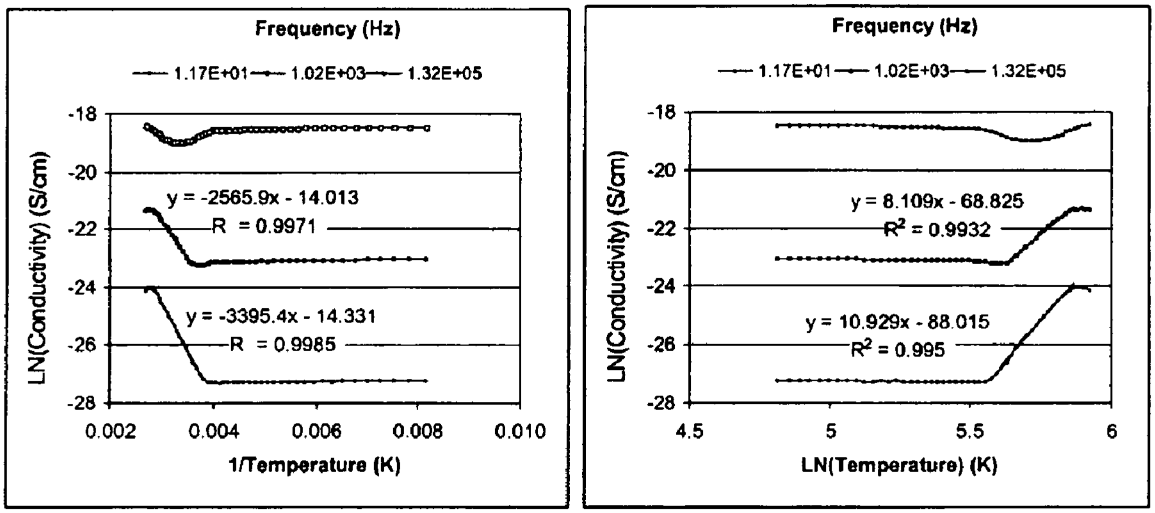

FIG. 24 is a schematic graph of the insulator-to-metal transition for compositions with matrix particle sizes of 1 μm and 100 μm;

FIG. 25 is a graph comparing the concentration dependence of the conductivity of four silver-based compositions at 0.5 GHz;

FIG. 26 is a graph showing scaling of the real permittivity of a sample of 100 nm Ag/100 μm PTFE composite;

FIG. 27 is a graph showing scaling of the conductivity of a sample of 100 nm Ag/100 μm PTFE composite;

FIG. 28 FIG. 5 is a graph showing scaling of the real permittivity of a sample of 100 nm Ag/1 μm PTFE composite;

FIG. 29 FIG. 6 is a graph showing scaling of the conductivity of a sample of 100 nm Ag/1 μm PTFE composite;

FIG. 30 is a graph of frequency dependent conductivity of a 2 vol % 100 nm Ag/100 μm PTFE composite over the range 1 Hz to 1 MHz and power law analysis;

FIG. 31 is a graph of frequency dependent real permittivity of a 2 vol % 100 nm Ag/100 μm PTFE composite over the range 1 Hz to 1 MHz and power law analysis;

FIG. 32 is a graph of frequency dependent conductivity of a 8 vol % 100 nm Ag/1 μm PTFE composite over the range 1 Hz to 1 MHz and power law analysis FIG. 33 is a graph of frequency dependent real permittivity of a 8 vol % 100 nm Ag/1 μm PTFE composite over the range 1 Hz to 1 MHz and power law analysis;

FIG. 34 illustrates dielectric response;

FIG. 35 is a summary of experimental results in terms of measured conductivity at 0.5 GHz;

FIG. 36 is a graph showing the temperature dependence of the conductivity of samples of 1 vol % 100 nm Ag/100 μm PTFE composite (2 samples);

FIG. 37 is a graph showing the temperature dependence of the conductivity of samples of 2 vol % 100nm Ag/ 100 μm PTFE composite (3 samples);

FIG. 38 is a graph showing the temperature dependence of the conductivity of samples of 3 vol % 100 nm Ag/100 μm PTFE composite (3 samples);

FIG. 39 is a graph showing the temperature dependence of the conductivity of samples of 5 vol % 100 nm Ag/100 μm PTFE composite (2 samples);

FIG. 40 is a graph showing the temperature dependence of the conductivity of samples of 2 vol % 100 nm Ag/1 μm PTFE composite (1 sample);

FIG. 41 is a graph showing the temperature dependence of the conductivity of samples of 8 vol % 100 nm Ag/1 μm PTFE composite (2 sample);

FIG. 42 is a graph showing the temperature dependence of the conductivity of samples of 10 vol % 100 nm Ag/1 μm PTFE composite (2 samples);

FIG. 43 shows graphs of ln(conductivity)v 1/T and ln(conductivity) v ln(temperature) for the samples of FIG. 37;

FIG. 44 shows graphs of ln(conductivity)v 1/T and ln(conductivity) v ln(temperature) for the samples of FIG. 38; and FIG. 45 shows graphs of ln(conductivity)v 1/T and ln(conductivity) v ln(temperature) for the samples of FIG. 42.

Figure 46:
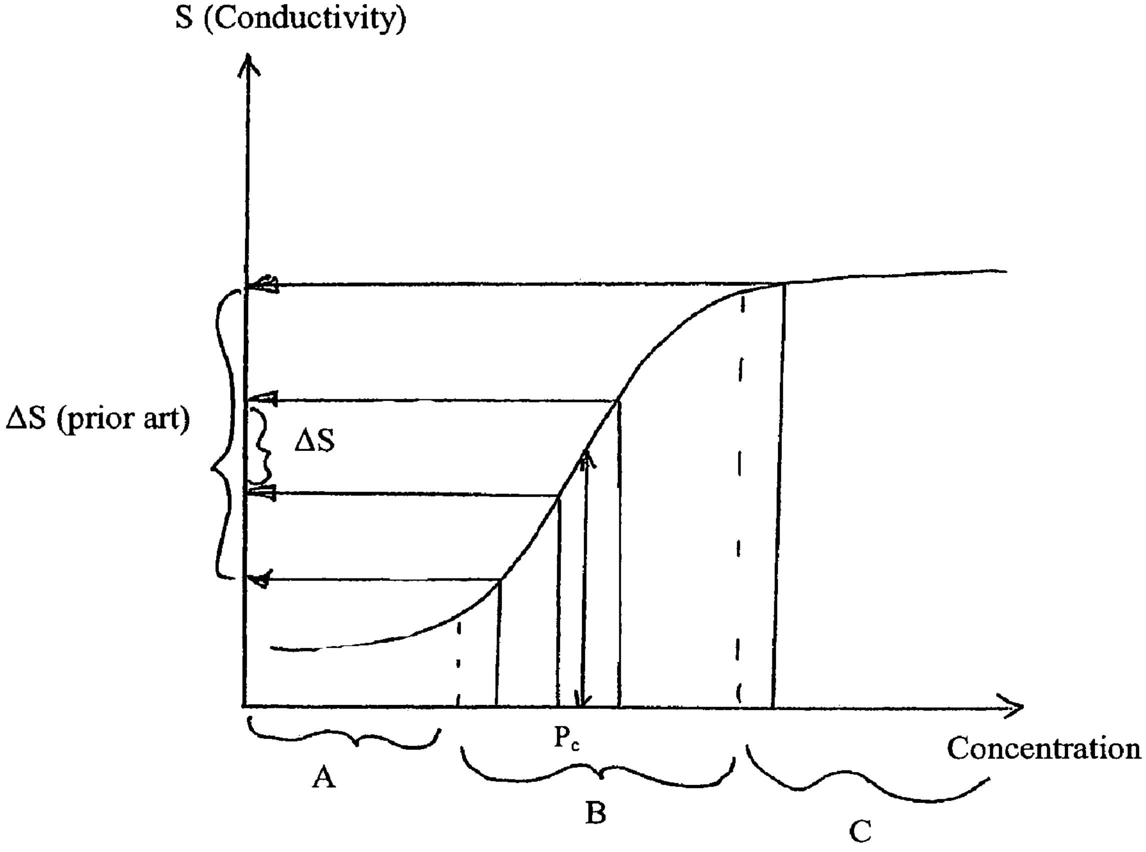
Figure 47A:
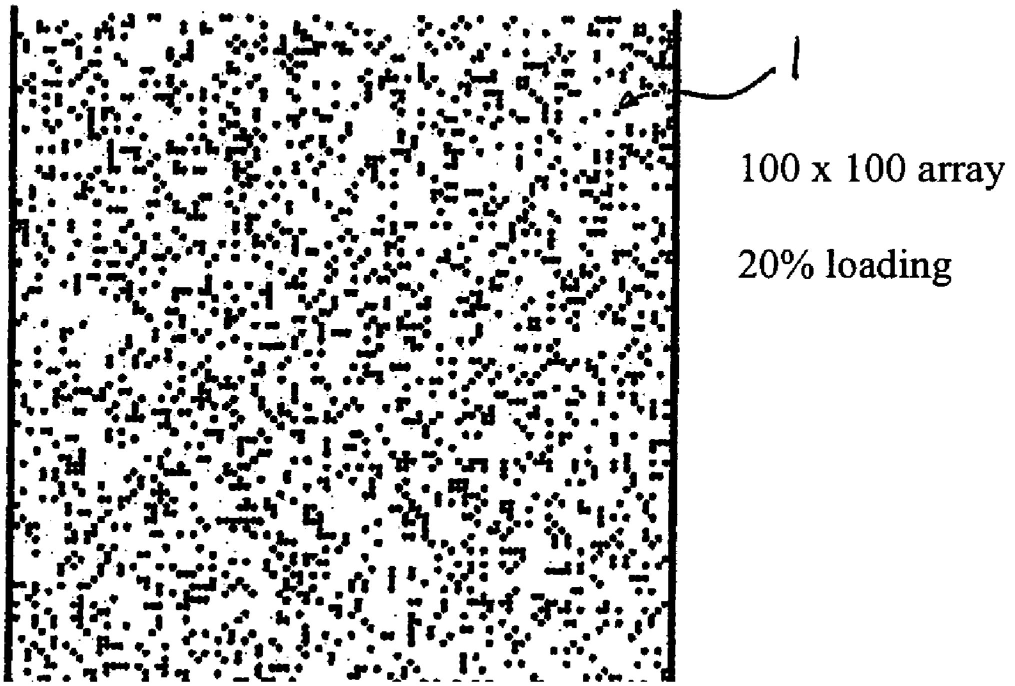
Figure 47B:
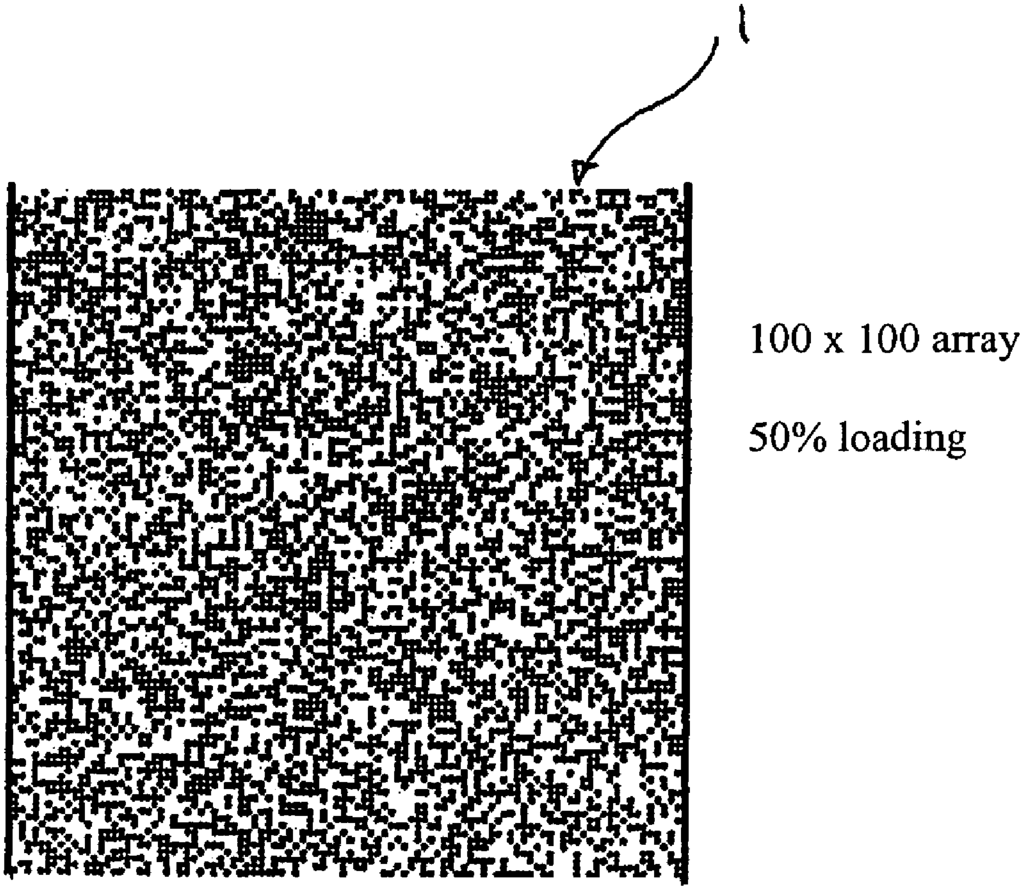
Figure 47C:
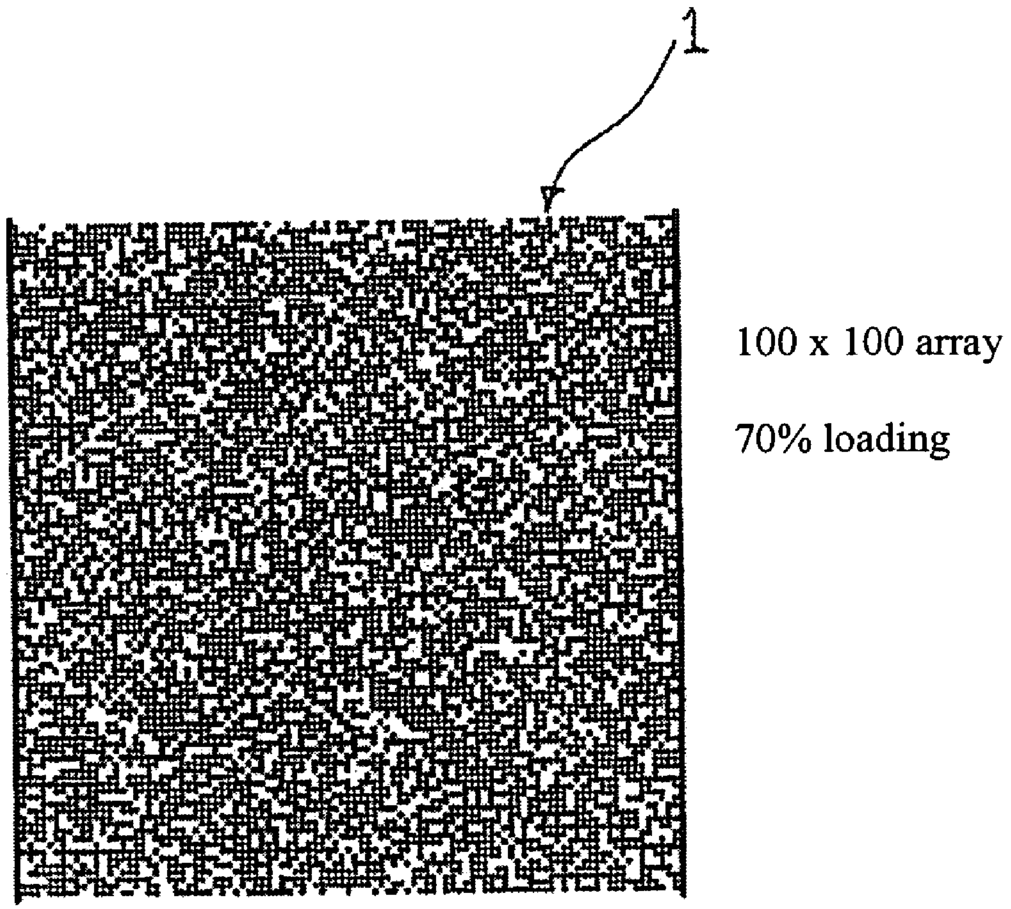

FIG. 46 illustrates the percolation threshold for a composite material,

FIGS. 47*a* to 47*c* illustrate three different conductive patterns made up of circular conductive elements for placing on a dielectric substrate.

Figure 48:
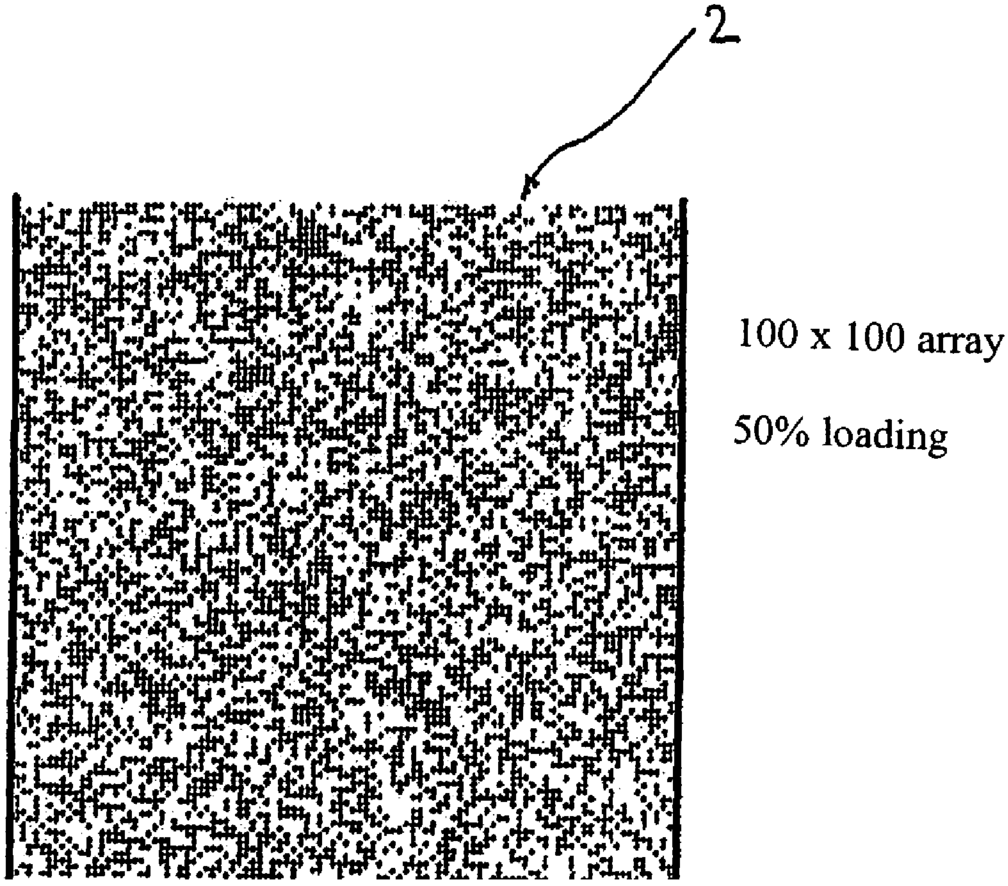
Figure 49:
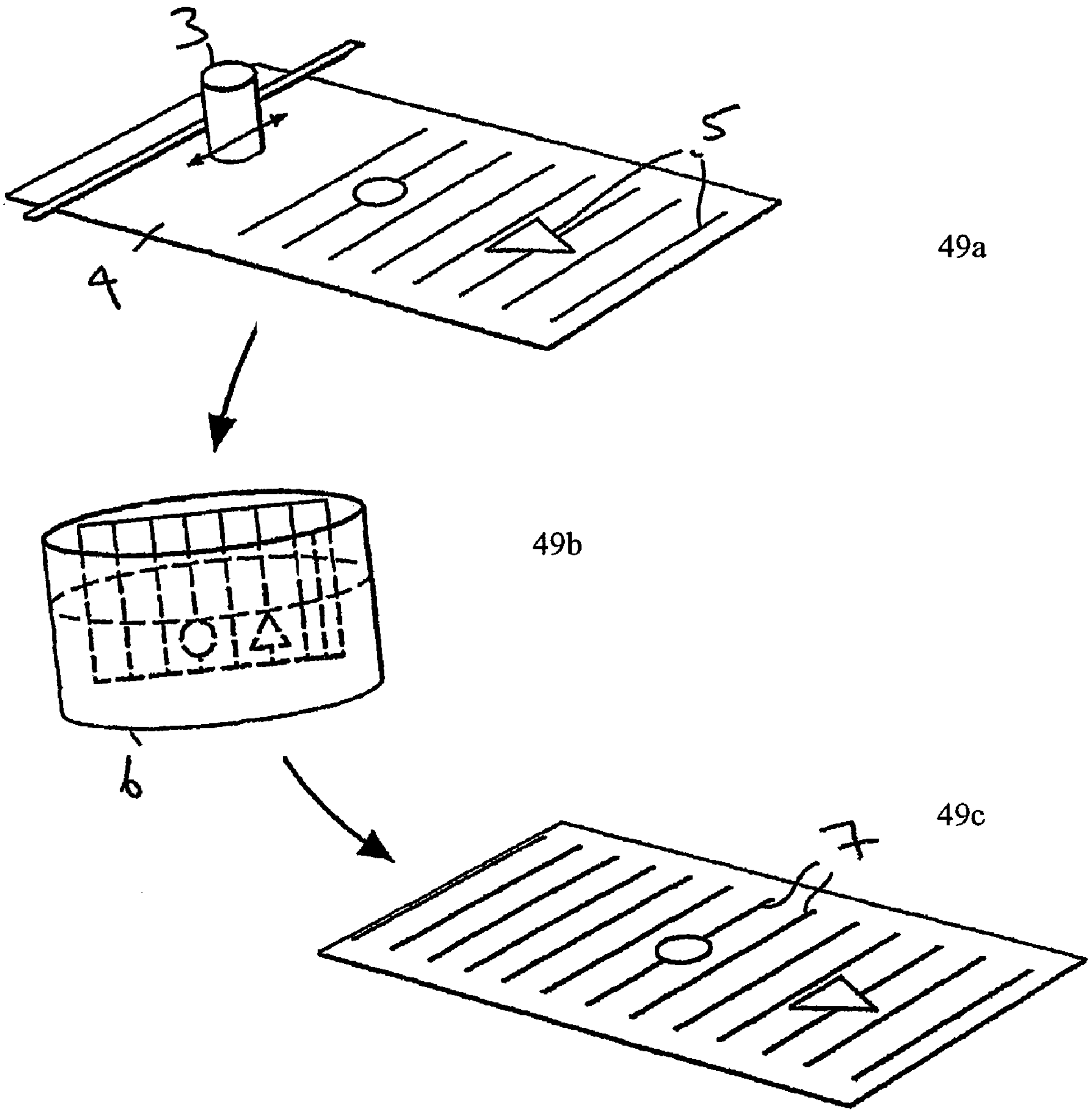
Figure 50:
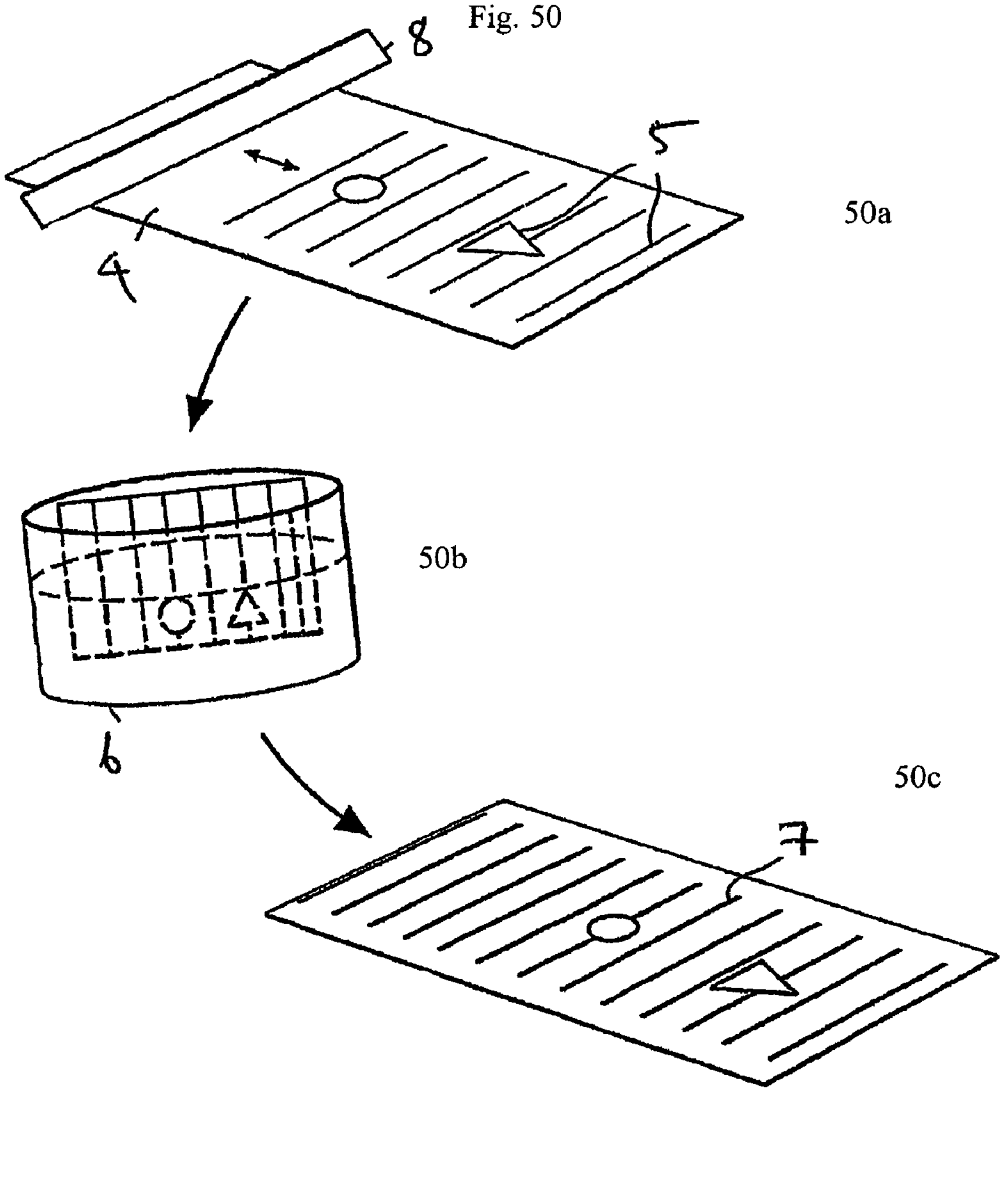

FIG. 48 illustrates an alternative conductive pattern made up of crossed dipoles or crosses; and FIGS. 49 and 50 illustrate two possible methods of making a two-dimensional composite material using conductive patterns of the type shown in FIGS. 47 and 48.

The inventor of the subject invention is the first to appreciate, after extensive research and investigation, that it is possible to produce a material having a plasma frequency below the plasma frequencies of conventional bulk materials. The inventor is the first to establish that metals comprising electrically conductive particles within an insulating host medium can have a plasma frequency below that of conventional bulk metals.

Although it is known (See Niesow at al, Journal of Applied Physics, Vol. 94, number 10-15 November 2003) that plasma polymer films with embedded silver nanoparticles can exhibit a reversible electronic switching effect, the inventor of the subject application is the first to realise that it is possible to create materials having a plasma frequency below that for conventional bulk metals using composite metals comprising a mixture of electrically conductive and electrically non-conductive particles in the manner set out in the claims of the subject applications.

Some embodiments of the present invention are developed from a non-periodic and generally random distribution of conducting particles within an insulating host medium. The conducting particles may be a metal, metal alloy, conductive metal oxide, intrinsically conductive polymer, ionic conductive material, conductive ceramic material or a mixture of any of these. In preferred embodiments the conducting particles are stable against oxidation and passivation and are, for example, noble metals such as silver or gold, metallic alloys or conducting ceramics (titanium diboride).

The insulating material may be particles of polytetrafluoroethylene (PTFE), paraffin wax, a thermosetting material, a thermoplastic material, a polymer, an insulating ceramic material, glass or a mixture of insulating materials. The insulating material could also be air, or contain trapped air.

Investigations into the performance of different composites are ongoing. Presently, the inventor has determined that composite materials comprising a mixture at approximately its percolation threshold of conductive particles in the size range 1 nm to 1 μm and larger non-conductive particles (preferably at least 10 times as large as conductive particles) have particularly desirable properties. For example and as discussed in more detail below, silver particles having an average size of 100 nm (as determined using specific surface area measurements (BET)) randomly distributed in a PTFE host made up of PTFE particles having an average size of 100 μm. (Aldrich 468811-8).

The nano silver in PTFE composite may be made by mixing particles of the two constituent elements to form a mix, forming the mix to produce a preform and recovering the composite material.

The composite may be made by the methods described below in connection with the experiments carried out by the inventors (see experiments 1 to 3). In these methods powders are mixed and then die-pressed at a pressure in the range 130-260 MPa for a period in the range 60-300 second.

Although in the experiments the powder mixtures were die-pressed at room temperature, the temperature used to press the medium may be varied according to the polymer used, and should be sufficient to allow preferable conductive particle coating of non-conductive matrix by inducing mechanically or thermally induced flow. Pressure and time may also be varied accordingly. Other methods of consolidating a powder feedstock include extrusion and flame-spraying.

Alternatively, the conducting powder could be dispersed by stirring into a carrier material such as a thermoplastic at a temperature above its melting point, or after the thermoplastic has been dissolved in a suitable solvent, or paraffin wax. The conducting particles could be mixed with a thermosetting polymer prior to curing (by chemical or other means). The conducting particles could be formed in situ within a polymer phase by chemically or electrochemically reducing an appropriate precursor. The conducting powder could be mixed with insulating ceramic or glass powder, compacted and then sintered to form a consolidated ceramic or glass component.

It is possible that any of these systems could be formed into a foam (blown or syntactic or a hybrid of both), in which case the conducting particles would reside in the cell walls. The foam may be blown using air or an inert gas (for example, Argon). In ceramic systems it could be possible to form the conducting phase during the sintering reactions and for the conducting phase to reside at grain boundaries within the resulting ceramic. A further possibility is to form a metallic foam in which case the insulating phase could be air. Again this could be achieved by blowing or syntactically by the addition of hollow particles above the melting point of the metal or a hybrid combination of the two methods. In addition, it may be beneficial to influence the connectivity of the conducting phase through the application of an external stimulus such as an electric or magnetic field during the consolidation or solidification process.

By connectivity, it is intended to mean any form of connection between particles or other constituents which forms an electrical connection. It is not necessary therefore that the particles or constituents should be in physical contact, but an electrical connection could be made even if there was a distance of the order of a few nanometers between the particles or constituents. This would increase the probability of electron tunnelling or hopping between particles or constituents, resulting in charge transfer. In particular, any electrical conductivity between particles in the form of a network, must extend over a distance greater than the order of the wavelength corresponding to the plasma frequency in the material.

Although the preparation of the samples is described in the experiments on a laboratory scale, it would be possible to use various known methods of materials processing on an industrial scale, including, but not limited to, injection moulding, extrusion, spraying or casting.

The results of experiments 1 to 3 (see below) show that it is possible to produce composite materials exhibiting a plasma-like response by dispersing silver nano-particles with micron-sized or larger PTFE particles, or micron sized titanium diboride particles with larger PTFE particles. The effect appears to be more reproducible when the conducting particle size is significantly smaller than the insulating particle size. This may be because it is easier and more reproducible to form conductive networks around and between larger non-conductive particles if the conductive particles forming this network are small in comparison.

A further benefit of using conducting particles that are much smaller than the insulating particles would appear to be a significant reduction in the critical conducting particle concentration—the percolation threshold—and more reproducible control of insulator/conductor morphology.

However, particle size per se does not appear to be a first order cause of the observed effects, but it is the nature of the inter-particle contacts and formation of a percolated microstructure which are critical, as illustrated by the particle size difference effects discussed above and in connection with the experiments discussed below. However, the ratio of sizes of conductive to non-conductive particles may be less than, equal to or greater than unity.

Further materials systems that may be of use are excluded volume systems (which utilise small filler concentrations), conductor coated particles and impregnated ceramic materials. Foams and other well known insulating matrices may also be of use. Other ceramic materials, including those where a second phase (for example a conducting phase) is included at grain boundaries may also be suitable for use with the invention, for example, Zinc Oxide (ZnO) thin films. Metal-matrix composites may also be of use.

In addition, it is proposed that the combination of the current invention with a component that exhibits negative magnetic permeability over a frequency range where the permittivity is also negative (i.e. below the plasma frequency) would result in a material with a negative refractive index over the same frequency range. A suitable magnetic material would be a ferromagnetic substance: For example the replacement of the purely conductive filler particles discussed above with ferromagnetic metal particles such as cobalt, iron or nickel or their alloys. Such a material would exhibit a negative permeability if inherent damping mechanisms were sufficiently suppressed or excluded.

The ferromagnetic material could be added to the insulator phase prior to the formation of the negative permittivity composite as shown by way of example in Experiments 1 and 2. Alternatively, if the ferromagnetic component has sufficient electrical conductivity then it could be used in place of the silver or titanium diboride to form a composite with simultaneous negative permittivity and permeability.

The effective properties of composites comprising a random distribution of conductively particles in an insulating host medium may be predicted using mixture laws (also referred to as effective medium theories), of which there are many (Priou A., Dielectric Properties of Heterogeneous Materials, Elsevier, New York, 1992; Neelakanta P Handbook of Electromagnetic Materials, CRC Press, New York, 1995; Youngs I Electrical Percolation and the Design of Functional. Electromagnetic Materials, PhD Thesis, University of London, 2001). In the majority of cases, selection of an appropriate mixture law is achieved empirically. It is possible to relate different mixture laws to specific combinations of particle shape, orientation and microstructural arrangement. However, it can be difficult to pre-determine the microstructural arrangement that will result from a particular combination of components because the particle arrangement will be influenced by surface chemistry and processing conditions.

Bearing in mind the above limitations, it is possible to select a small number of mixture laws that enable the engineer to explore the qualitative nature of the filler concentration and frequency dependence of complex permittivity that can be expected for these composites, even if the laws may be quantitatively incorrect.

It will become clear in the following analysis that one of the existing mixture laws suggests that metals of the type claimed would result in plasma frequencies lower than that of conventional bulk materials. The inventor is the first to appreciate the advantageous properties of the claimed materials. The following discussion of the existing mixture laws clearly demonstrates how no-one would have considered creating or using materials as claimed in this application.

The earliest mixture laws were developed on the assumption of dilute filler concentrations, with the separation between filler particles being large compared to their radius, A good example is that due to Maxwell-Garnett (Maxwell-Garnett J. 'Colours in metal glasses and in metal films'. Philosophical Transactions of the Royal Society, CCIII, pp. 385, 1904.)

The Maxwell-Garnett model or mixture law defines how the overall permittivity $\in$ of the composite material is related to the permittivity of the filler $\in_f$, the permittivity of the matrix $\in_m$, and the filler volume fraction V:

$$\varepsilon = \varepsilon_m + 3\varepsilon_m \frac{V\dfrac{\Delta\varepsilon}{\varepsilon_f + 2\varepsilon_m}}{1 - V\dfrac{\Delta\varepsilon}{\varepsilon_f + 2\varepsilon_m}} \quad (13)$$

with $\Delta\in=\in_f-\in_m$. If the filler is a metal then its permittivity may be approximated using the low frequency form of the Drude model $$\varepsilon_f = 1 - i\frac{\sigma_f}{2\pi f \varepsilon_o} \quad (14)$$

Where $\sigma_f$ is the filler conductivity.

Figure 4:
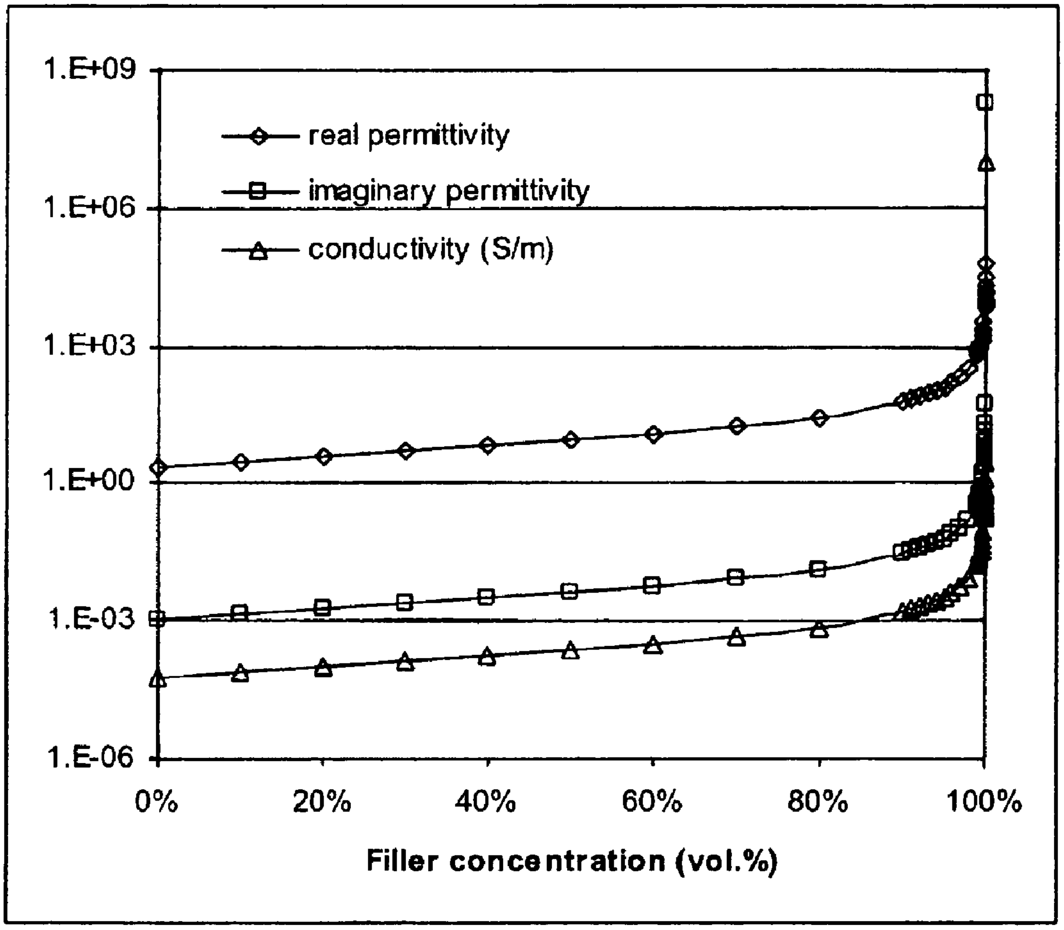
FIG. 4 shows the theoretical electromagnetic properties of a composite material with a filler conductivity of $1\times10^7$ S/m in a matrix with a permittivity of 2.1-j0.001 at 1 GHz predicted using Maxwell-Garnett mixture law.

The filler volume fraction dependence of the relevant effective electromagnetic properties (real and imaginary components of permittivity, and conductivity) for a representative theoretical composite with a filler conductivity ($\sigma_f$) of $1\times10^7$ S/m and a matrix permittivity of 2.1-j0.001 is illustrated in FIG. 4 (using the Maxwell-Garnett model) for a frequency of 1 GHz.

It is observed that both components of permittivity and conductivity increase with increasing filler volume fraction from those of the matrix to those of filler. In particular, it is observed that the composite has properties close to those of the filler phase when the filler volume fraction or concentration is very close to 100%. Intuitively, this is incorrect for a composite containing mono-disperse filler particles, especially in terms of the composite conductivity, because it is to be expected that the composite conductivity would approach that of the filler component as soon as the particles touch—i.e. at close-packing, which occurs for filler concentrations in the range 52 to 74 vol. % for spherical particles. Nevertheless, it is recalled that the Maxwell-Garnett model was developed under the assumption of dilute filler concentrations.

Figure 2:
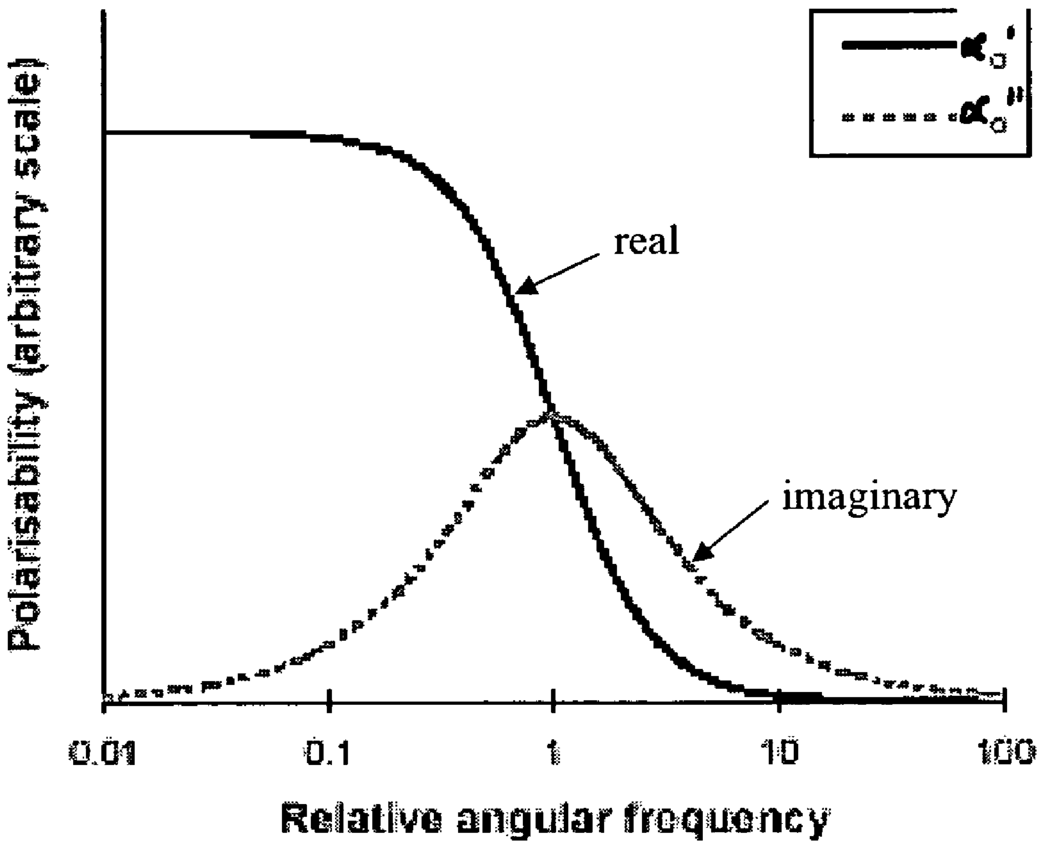
FIG. 2 illustrates the low-frequency permittivity component of a typical dielectric material centred on a relaxation frequency.
Figure 3:
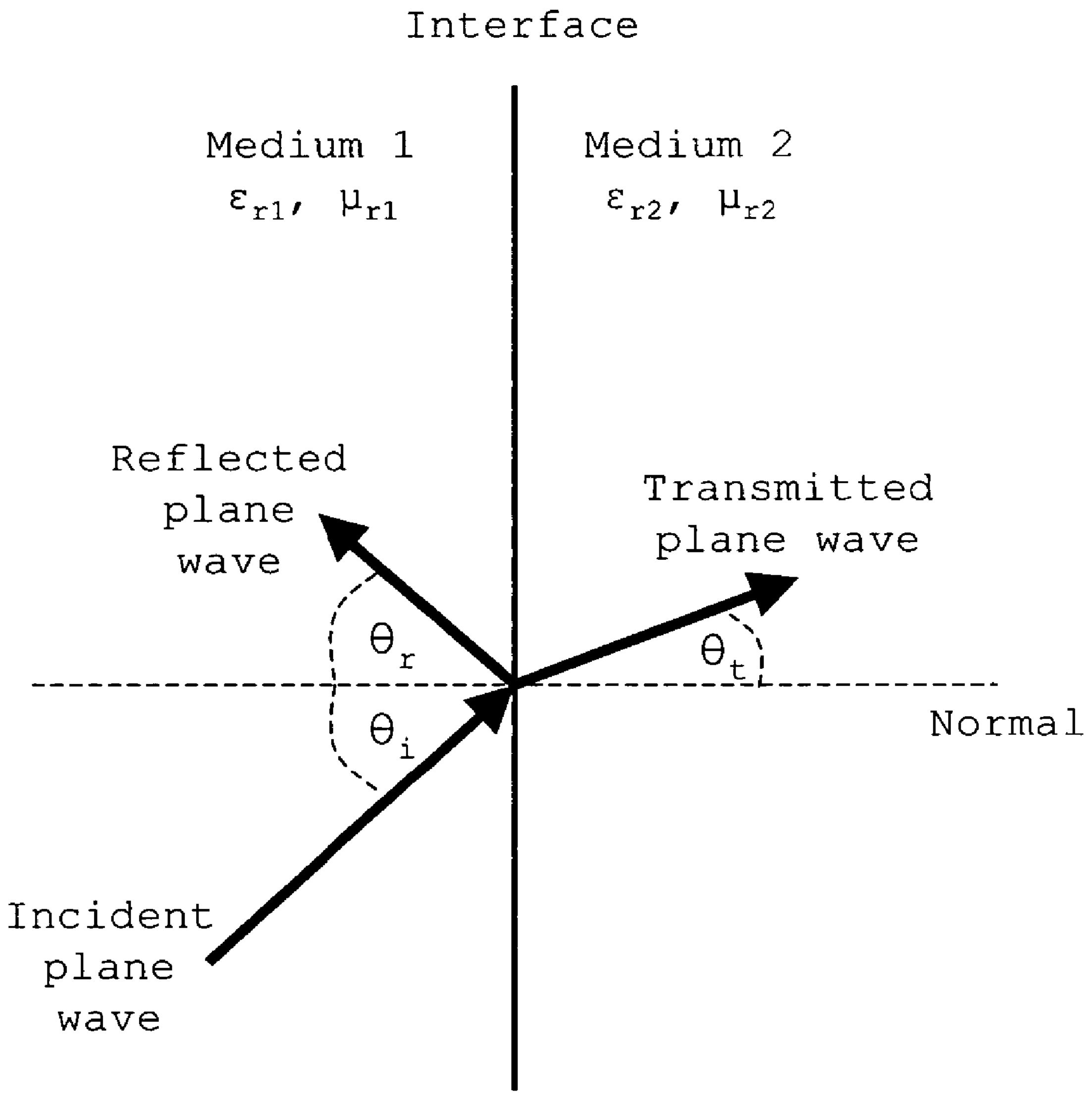
FIG. 3 shows an interface between two media for illustrating the Fresnel equations.

The frequency dependence of the effective electromagnetic properties for the same composite at a filler concentration of 99.9 vol. %, derived using Maxwell-Garnet theory, is illustrated in FIG. 5. A relaxation-type dielectric response similar to that shown in FIG. 2 is observed. The relaxation frequency is at approximately 10 THz ($10\times10^{12}$—i.e. above the microwave range, which is approximately $10^8$ to $10^{12}$ Hz).

An important advance was made by Bruggeman (Bruggeman D. "Annalen der Physik Leipzig", vol 24, p 636, $1935_e$). Bruggeman sought to overcome the dilute approximation by treating the filler particles as being dispersed within a background medium that had the permittivity of the mixture rather than the permittivity of the insulating phase. This led to the following equation, known as the Bruggeman symmetric mixture law or effective medium theory.

$$(1-V)\frac{\varepsilon-\varepsilon_m}{2\varepsilon+\varepsilon_m}+V\frac{\varepsilon-\varepsilon_f}{2\varepsilon+\varepsilon_f}=0 \quad (15)$$

FIG. 6 illustrates the theoretical filler volume fraction concentration dependence of the real ($\in'$,$\sigma_f'$) and imaginary ($\in''$, $\sigma_f''$) components of permittivity and conductivity for the same representative composite (i.e. with a filler conductivity of $\sigma_f$ of $1\times10^7$ s/m, a matrix permittivity $\in_m$ of 2.1-j0.001 and for a frequency of 1 GHz). This figure may be compared directly to FIG. 4.

The Bruggeman model predicts that the properties of the mixture increase dramatically at a critical filler concentration that is much smaller than the concentration for close packing. This critical concentration is generally referred to as the percolation threshold (Vc). The Bruggeman model predicts (see FIG. 6) for spherical particles randomly filling a cubic lattice, percolation is predicted to occur at a filler volume fraction of approximately 35%. In fact, real composites materials comprising spherical particles randomly filling a cubic lattice, percolation is reached at the much lower volume fraction of approximately 16%. The Bruggeman theory is therefore quantitatively wrong insofar as prediction of the critical threshold volume filler fraction $V_c$ is concerned. It is however qualitatively correct in that the percolation threshold of the material is important, since it represents the filler volume fraction at which the composite system will undergo an insulator-to-conductor transition. It is expected that the composite material would exhibit insulator-like properties for filler concentrations below the percolation threshold and potentially metal-like properties for filler concentrations above it.

Percolation theory is a way of describing the processes, properties and phenomena in a random or disordered system. The amount of disorder is defined by the degree of connectivity between particles. If p is a parameter that defines the degree of connectivity between various particles in a material, then if p=0, none of the particles are connected, and if p=1, all the particles are connected to the maximum number of neighbouring particles. There is a point, $p_c$ (the percolation threshold), where each of the particles is connected to the minimum number of neighbouring particles, such that there is a sufficiently long unbroken path of that type of particle for current to flow in the material.

In a metal matrix composite, where, e.g. aluminium particles are dispersed in a ceramic matrix, the percolation threshold for applied D.C. (Direct Current) is reached when there is at least one continuous path of aluminium from one side of the matrix to the other. In a similar metal matrix composite the percolation threshold for applied A.C. (Alternating Current) is reached when there are sufficiently long paths around particles at the ends of the matrix, for electrons to move as far as is possible in each direction of cycle of applied current before the direction of applied current is reversed. In other words, the paths are sufficiently long for electrons to move as far as the phase of the applied alternating current allows them. At this point, the material may begin to exhibit metallic characteristics; for example, an electric current may flow.

The behaviour of random materials, for example those showing no form of ordering or periodic structure, such as powder systems, near their percolation threshold has been widely studied, both experimentally and theoretically. It is apparent that, for perfectly random systems, there are a number of features associated with their behaviour over a narrow concentration range about the percolation threshold.

Many of these features are related to the power-law response observed in systems exhibiting percolative behaviour and the fact that the exponents in these power-laws appear independent of the precise nature of the material, except for the dimensionality of the connectivity between particles. A macroscopic example of this is the filler volume fraction or concentration dependence of the real permittivity and conductivity for a conductor-insulator composite near the percolation threshold. Percolation theory suggests the following power-laws:

$$\varepsilon' \propto (V-Vc)^{-s},\ \sigma \propto (V-Vc)^{t} \text{ and } \varepsilon''=\frac{\sigma}{\omega,\ \varepsilon o} \quad (16)$$

Where $\in'$ is real permittivity, V is the volume fraction of the filler, Vc is the critical filler volume fraction corresponding to the percolation threshold and σ is conductivity.

Figure 7:
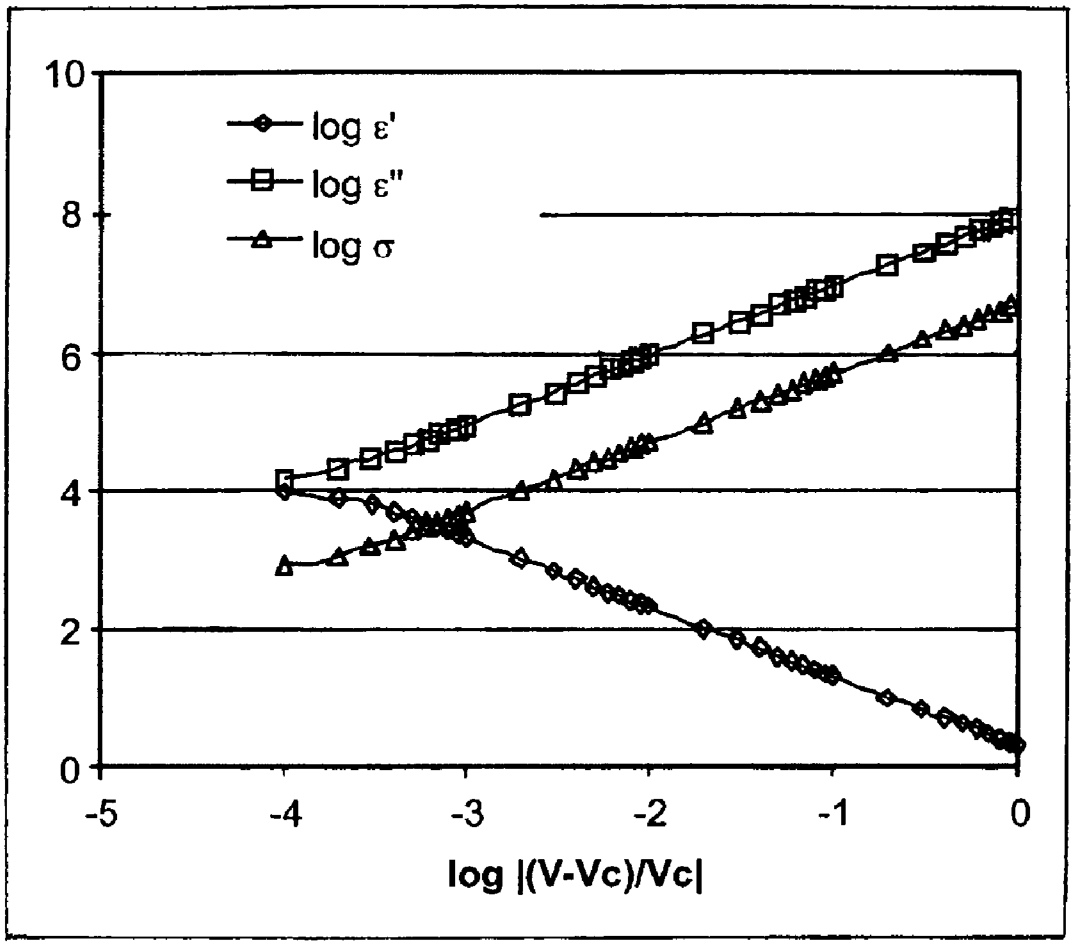
FIG. 7 illustrates the theoretical variation in permittivity and conductivity under percolation theory using the Bruggeman model.

FIG. 7 illustrates this point using the data presented in FIG. 6 and calculated using the Bruggeman mixture law. The logarithm of each property is plotted against the logarithm of a normalised filler volume fraction (V−Vc)/Vc. The data for real permittivity $\in'$ is for filler volume fractions leading up to the percolation threshold. The data for the imaginary permittivity $\in''$, and conductivity σ are for filler volume fractions above the percolation threshold filler volume fraction Vc. The gradients in FIG. 7 provide the values for the exponents set out in equation (16) above. It is deduced that the Bruggeman mixture law predicts that both s and t equal unity. It is at this point that the Bruggeman model deviates from percolation theory on a quantitative level. Percolation theory predicts that for particles connected on a three-dimensional network, the exponents should have the following values: s=0.73 and t=1.9.

Figure 8:
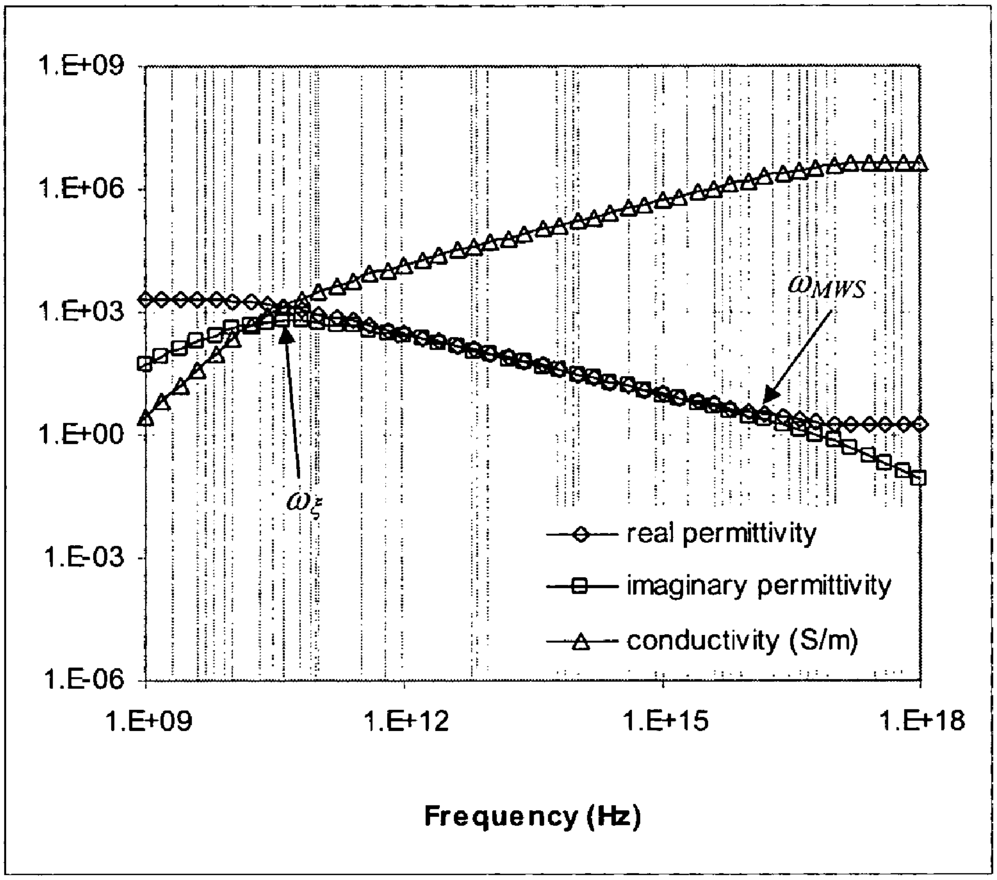
FIG. 8 shows the theoretical variation in permittivity and conductivity for a composite with a filler volume fraction or concentration of 33.3 vol %, using the Bruggeman model.

FIG. 8 illustrates the frequency dependence of the effective electromagnetic properties for the game composite at a filler volume fraction V of 33.3 vol. %, calculated using the Bruggeman mixture law. In terms of the normalised filler concentration (V−Vc)/Vc defined previously, this concentration is equivalent to that presented in FIG. 5 for the Maxwell-Garnett mixture law. It is observed that the Bruggeman mixture law predicts a much broader and non-Debye relaxation peak for this filler concentration which is close to but below the percolation threshold. This peak may be characterised by two characteristic frequencies $\omega_\xi$ and $\omega_{MWS}$ that mark the clear changes in gradient visible in all three parameters shown in FIG. 8. In addition, since the data is already plotted on log-log scales, it is observed that the data covering the central frequency range, defined by these two characteristic frequencies, also obeys a distinct power-law response. In this case, the gradients all equal one half.

Percolation theory predicts such a power-law response, with the relationships:

$$\in'(\omega, V=Vc))\propto\omega^{-y} \text{ and } \sigma(\omega, V=Vc))\propto\omega^{x} \quad (17)$$

furthermore, that these exponents x, y are related to the exponents s, t (see above) for the concentration dependence by:

$$x+y=1,\quad x=\frac{t}{s+t}\approx 0.72,\quad y=\frac{s}{s+t}\approx 0.28 \tag{18}$$

Again, it is noted that the Bruggeman model is quantitatively incorrect, yet self-consistent.

The loss angle δ (where tan(δ)=∈"/∈', and ∈"is the imaginary part of the permittivity, and ∈' is the real part) attains a constant value given by yn/2 for the frequency range between the two characteristic frequencies, which may be specified as $$(V-Vc)^{s+t}\frac{\sigma_f}{\varepsilon_o\varepsilon_m}\cong\omega_\xi\leq\omega\leq\omega_{MWS}\cong\frac{\sigma_f}{\varepsilon_o\varepsilon_m} \tag{19}$$

The term $(V-V_e)^{s+t}$ is a weighting to indicate how close a composition is the percolation threshold. The frequencies occurring between $\omega_\xi$ and $\omega_{MWS}$ indicate the parallel nature of the behaviour of the real and imaginary permittivity components, as shown, for example, in FIG. 8.

Thus, as the percolation threshold is approached, the lower characteristic frequency $\omega_\xi$ tends to zero.

This discussion highlights the importance of an accurate quantitative description of the electromagnetic response of materials near the percolation threshold to the design of composite materials for electromagnetic applications. The inventor has appreciated that the existing theoretical models are wrong. The Maxwell-Garnet metal (see FIGS. 4 and 5) is both quantitatively and qualitatively wrong in that it entirely fails to predict percolation threshold effects. The Bruggeman model (see FIGS. 6 to 9) is quantitatively wrong as although it predicts percolation effects it predicts values for the percolation threshold which differ widely from actual measured values.

Figure 9A:
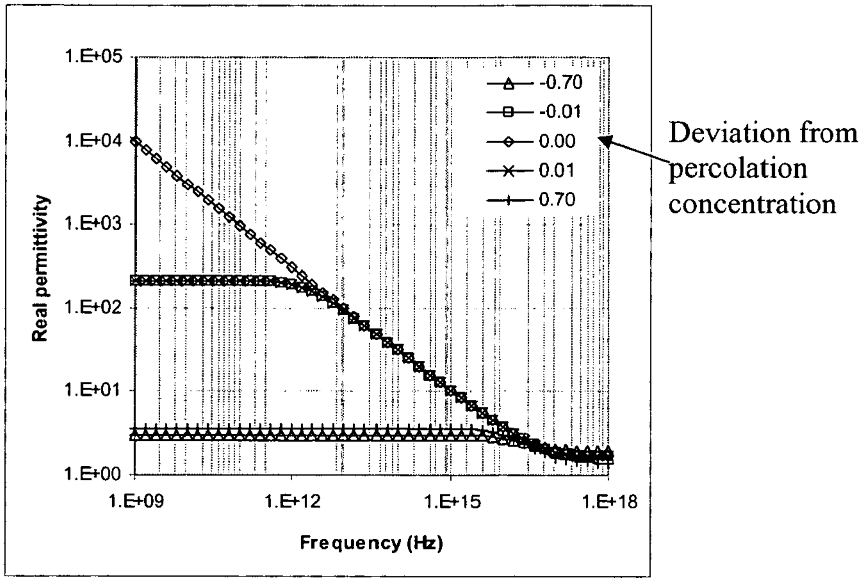
Figure 9B:
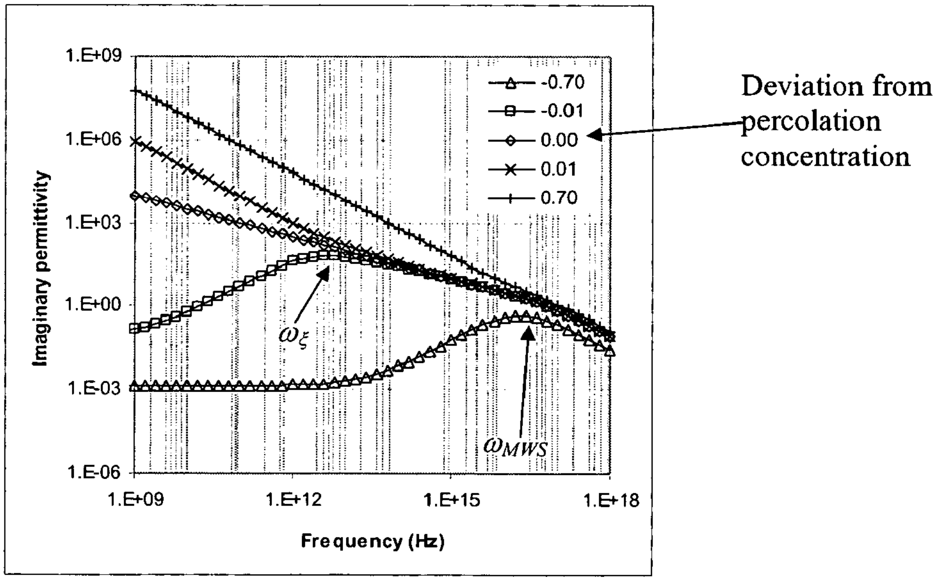
Figure 9C:
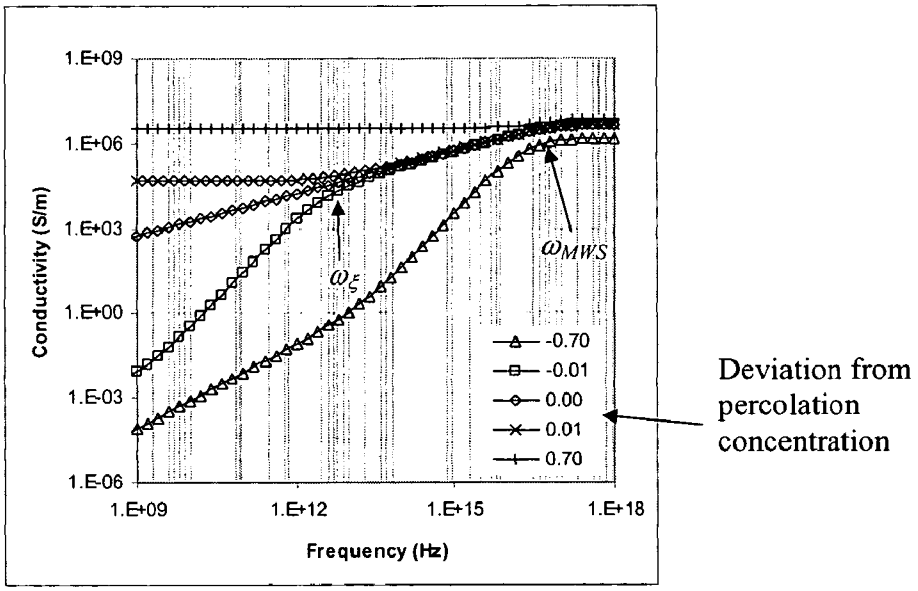
Figure 9D:
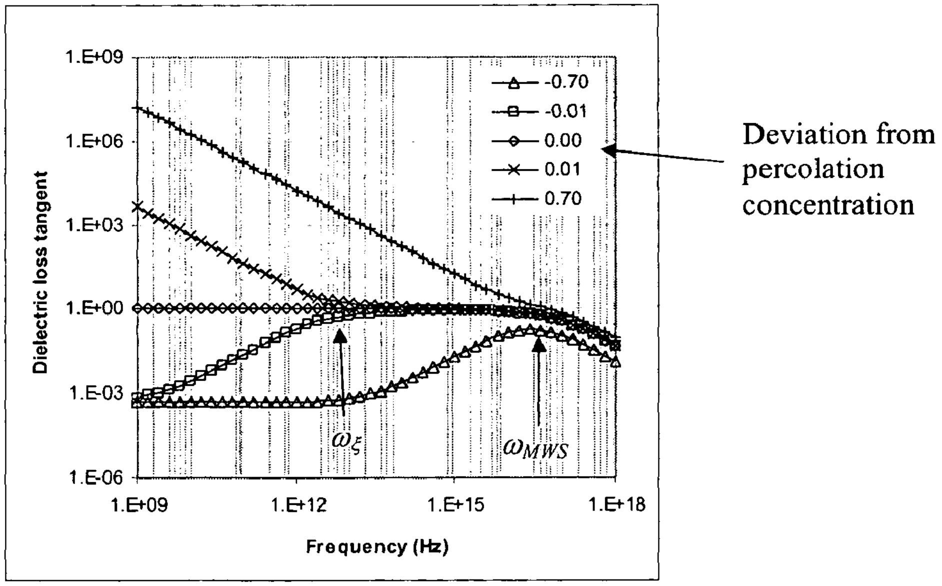
Figure 9E:
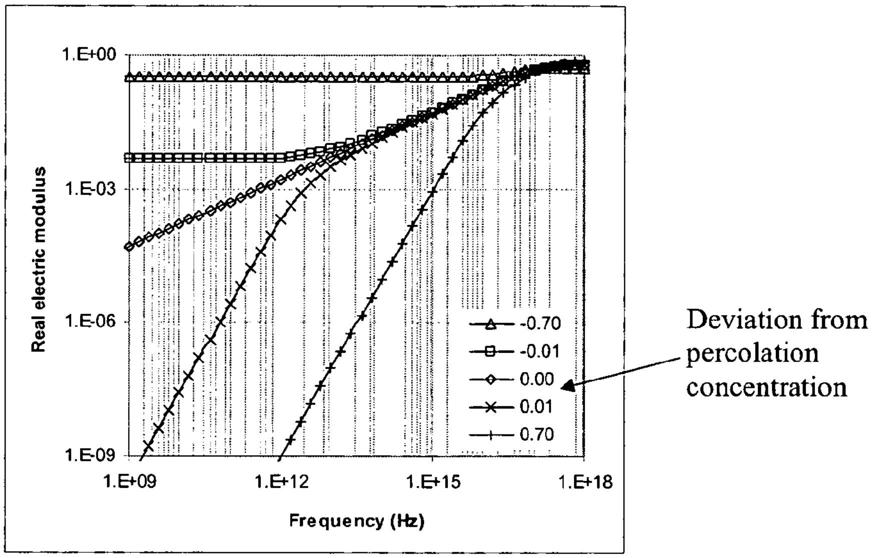
Figure 9F:
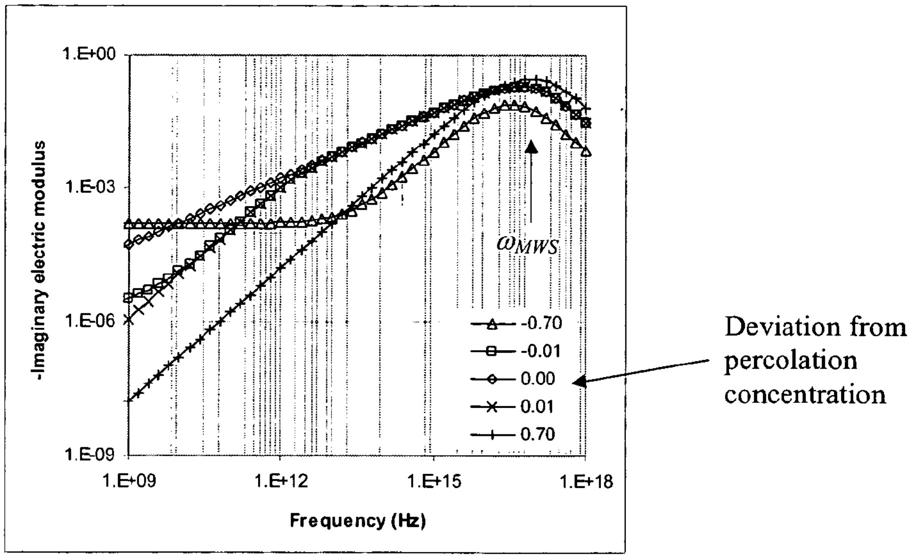

FIGS. 9*a* to 9*f* present the generic regimes according to the Bruggeman model for the frequency dependence of the electromagnetic properties of composites for filler volume fractions below, at and above the percolation threshold. The concentrations used are ($V_0$-0.70), ($V_0$-0.01), Vc, ($V_0$+0.01) and ($V_0$+0.70), (all volume concentrations) where $V_v$ is the critical filler volume fraction corresponding to the percolation threshold. FIG. 9*a* shows the real permittivity, FIG. 9*b* the imaginary permittivity, FIG. 9*c* the conductivity, FIG. 9*d* the dielectric loss tangent, FIG. 9*e* the real electric modulus and FIG. 9*f* the imaginary electric modulus. It is observed that a metallic or plasma-like dielectric response is not predicted even for filler concentrations well above the percolation threshold.

As discussed above, the inventor has however appreciated that the existing theoretical models are flawed. The inventor is the first to appreciate that mixtures of conductive and non-conductive parties can exhibit a dielectric response at conductive filler concentrations from near to and above the percolation threshold.

In the light of the inventor's realisation, a series of experiments to determine the feasibility of producing composite materials which exhibit a plasma frequency and a negative permittivity to incident radiation of selected frequencies or ranges or frequencies were carried out.

Initially, experiments were carried out to determine the percolation threshold of each type of conductor-insulator composite (defined by a unique choice of conducting filler and insulating host medium) and to determine the level of conductivity achieved in composites with filler concentrations above the percolation threshold. Such experiments would also determine whether the percolation threshold and the dielectric properties of the materials were influenced by any particle size effects (for example the ratio of the conducting particle size to the insulating particle size).

For these experiments, composites comprising mixtures of small (relative to the effective wavelength of electromagnetic waves in the composite) particles of conductive materials such as metals or conductive ceramics and small particles of insulating materials such as insulating polymers are made up by mixing controlled quantities of the conductive and insulating particles to form a loose powder mixture. The materials may be mixed using a shaker mixer and the particles may be of any suitable average size or size distribution, although particle sizes that are small (less than one tenth) of the wavelength of interest are preferred.

In particular, where the selected frequencies are in the range 0.1 to 100 GHz (i.e. wavelength in the range 3 m to 3 mm), suitable particle size distributions are from 1 nm to 250 nm for the conductive particles (for example, nano-silver, having an average particle size of 10 nm) and 1 μm to 100 μm for the non-conductive particles. The powder mixture was then die pressed at room temperature to provide a consolidated composite medium, for example using a pressure in the range of 130-260 MPa applied for a period in the range 60-300 seconds.

The plasma frequencies determined in the following experiments give rise to a range of effective wavelengths within the actual material. The value of these effective wavelengths are determined using the equations:

$$C=f\lambda;\quad C=\frac{1}{\sqrt{(\varepsilon_r\,\mu_r)}}\cdot\frac{1}{\sqrt{(\varepsilon_o\,\mu_o)}} \tag{20}$$

where $\in_r$ and $\mu_r$ are the relative permittivity and relative permeability respectively, $\in_o$ and $\mu_o$ are the permittivity and permeability in a vacuum and c is the speed of light.

Initially, experiments were carried out to study the dielectric properties of composite materials comprising various fillers and conductive components. In each of these experiments, the conductive components are in the form of particles. The non-conductive components may also be composed of particles.

Size measurements for very small particles are dependent on the form of measurement used to analyse the particles. This is because of both morphology effects being important and the fact that the particles will be polydisperse (not all of the same size). In the following experiments (and elsewhere in this patent application), sizes are average sizes determined by specific surface area measurements (BET).

Experiment 1 (See FIGS. 10*a* to 10*d*)

Initially, four nano-aluminium PTFE (polytetrafluoroethylene) mixtures were prepared, with two different PTFE average particle sizes used to investigate particle size effects, as shown in Table 1 below. The nano-aluminium had an average size of 100 nm as measured using specific surface area measurements (BET). The two other experiments and the preferred embodiments of the invention described above PTFE particle sizes used in this, were 1 micron powder (Aldrich 43093-5) and 100 micron powder (Aldrich 46811-8).

TABLE 1

| nano-aluminium and PTFE particle sizes in initial experiment | |
|---|---|
| nano-aluminium concentration (vol. %) | PTFE particle size (μm) |
| 1.7 | 100 |
| 8.1 | 100 |
| 8.1 | 1 |
| 15.6 | 1 |

For each composition, appropriate quantities of the different materials were measured into a container. The container was then placed in a dry argon atmosphere (less than 50 ppm air) for at least 12 hours to remove any residual moisture so as to reduce particle agglomeration during mixing. The container was then sealed under the argon atmosphere before placing on a shaker mixer that was then operated for approximately 60 minutes to thoroughly mix the particles. The argon atmosphere minimises any further oxidation of the particles during mixing. The resulting powder was then die-pressed at room temperature at a pressure of 260 MPa for 300 seconds to produce test samples.

For the measurements of complex permittivity over the frequency range 10 mHz to 1 GHz the sample geometry was a disc with a diameter of 10 mm and a uniform thickness in the range 0.5 to 5.0 mm. The top and bottom faces of the sample were coated with a conducting paint to improve electrode contact. For measurements of complex permittivity and permeability over the frequency range 0.5 to 18 GHz the sample geometry was a toroid with an outer diameter of 6,995 mm and an inner diameter of 3.045 mm (designed to fit standard 7 mm coaxial microwave transmission line). The samples again had a uniform thickness in the range 0.5 to 5.0 mm.

The resulting composite was then subjected to a number of experiments to determine its frequency dependent dielectric properties and its structure.

Figure 10A:
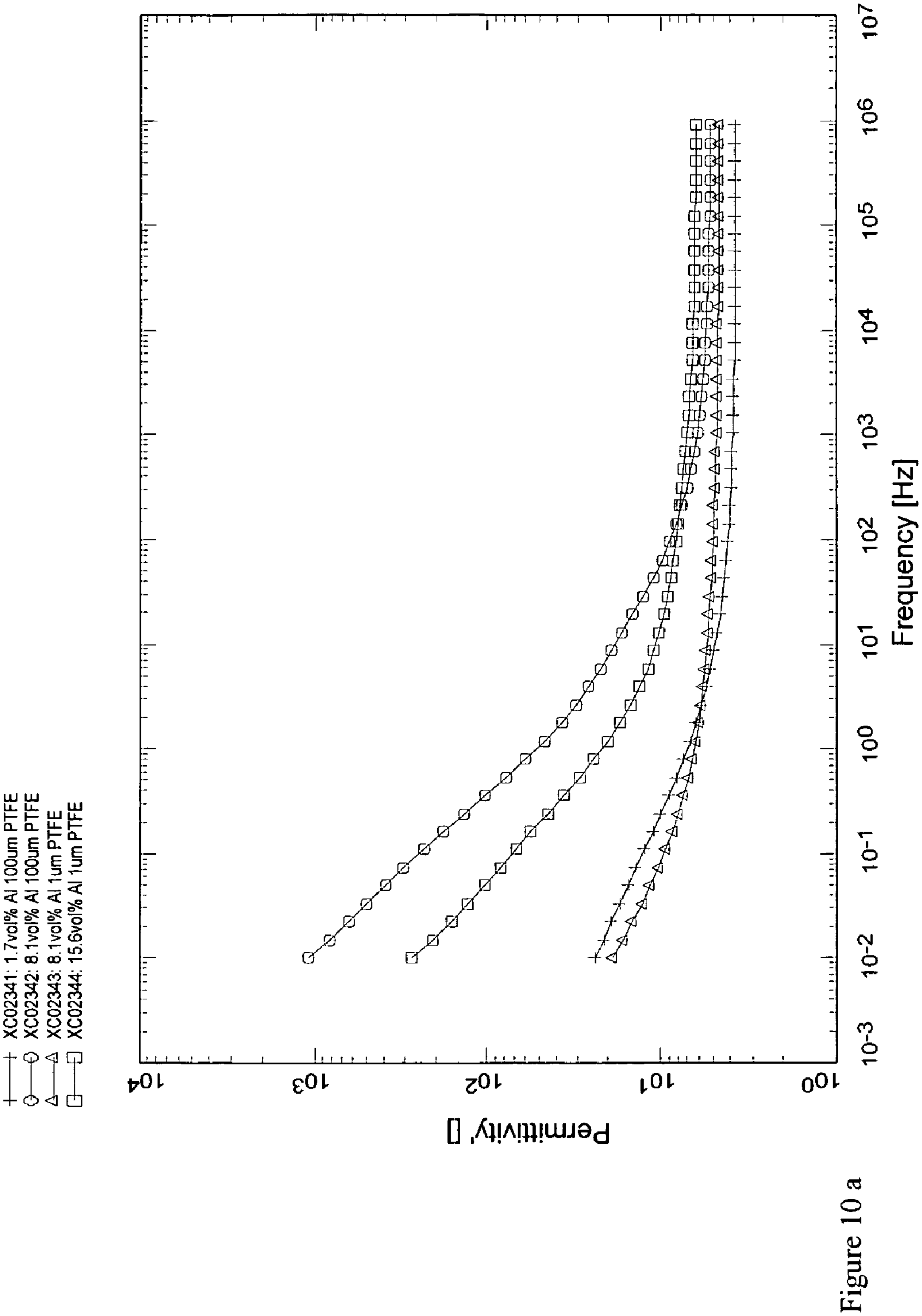
Figure 10B:
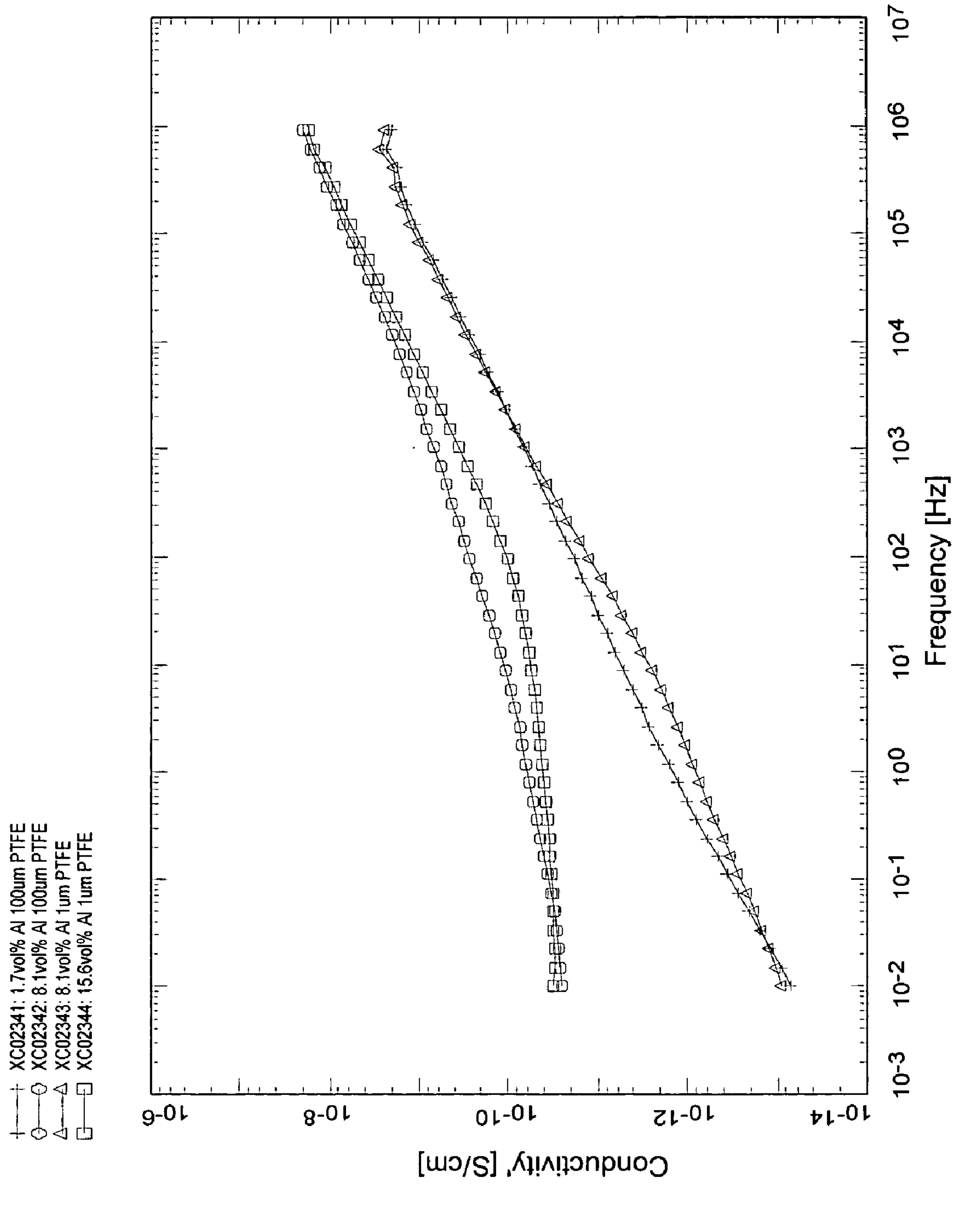
Figure 10C:
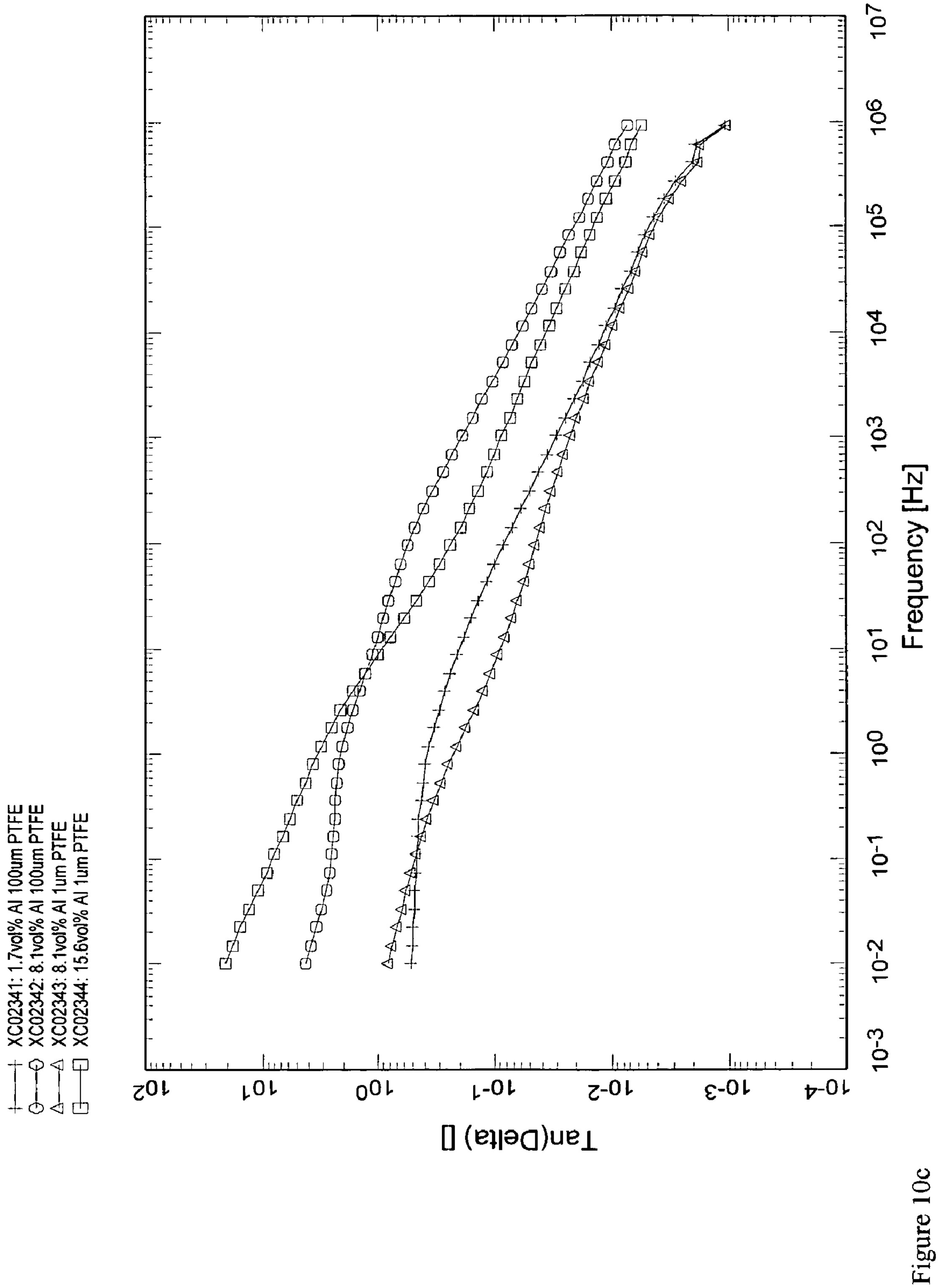
Figure 10D:
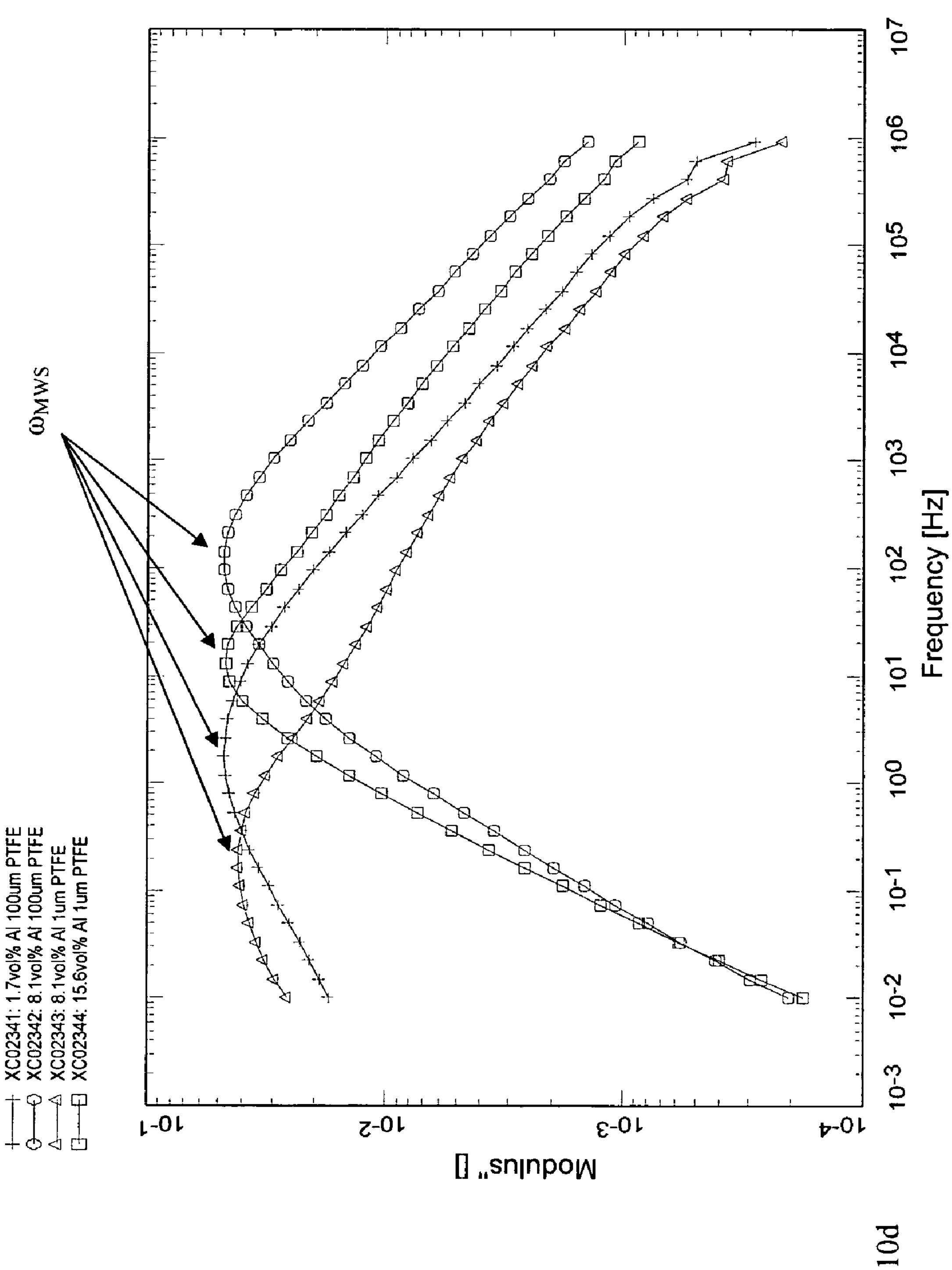

Electrical properties of the composites of experiment 1 are shown in FIGS. 10*a* to 10*d*. FIG. 10*a* illustrates the real permittivity, FIG. 10*b* the conductivity, FIG. 10*c* the dielectric loss tangent and FIG. 10*d* the imaginary electric modulus for nano-aluminium dispersed in PTFE. These measurements were undertaken at room temperature using a Novocontrol broadband dielectric spectrometer, comprising a Novocontrol Alpha dielectric analyser for the frequency range up to 1 MHz and an Agilent 4291 RF Impedance analyser for the frequency range 1 MHZ to 1 GHz.

A comparison of FIG. 10 to FIG. 9, suggests that the highest aluminium concentration for each PTFE particle size are above the percolation threshold, as the trends in FIG. 10 in real permittivity, conductivity, dielectric loss and electric modulus are similar to those for compositions in FIG. 9 which are above $V_c$. In addition, it is feasible that the percolation threshold for the larger PTFE particle size is lower. Therefore, it is surprising that the increase in conductivity at 10 mHz from the lowest to highest aluminium concentration for a given PTFE particle size is less than three orders of magnitude. Normally, for composites containing metal filler particles, it is expected that the percolation transition would result in at least ten orders of magnitude increase in composite conductivity at such a frequency. Moreover, for filler concentrations above the percolation threshold, the composite conductivity would exceed 1 S/m. In addition, the upper limiting frequency, $\omega_{MWS}$, for maximum dielectric loss appears several orders of magnitude below the microwave frequency range, (for comparison, conventional metal particles yield values several orders of magnitude above 1 GHz). This reduction in $\omega_{MWS}$ suggests that there has been a significant reduction in the conductivity of the conducting phase, below that of bulk aluminium. This may be due to appreciable surface oxidation of the aluminium nano-particles. This oxidation may be due in part to the particles being supplied under air, rather than under hexane, which is known to prevent or at least reduce surface oxidation effects. Because the resulting composite conductivity was so low and the upper characteristic frequency for critical behaviour associated with percolation theory was deduced to be below the microwave region, microwave measurements of the complex permittivity and permeability were not undertaken.

Experiment 2 (See FIGS. 11*a* to 14*g*)

Eight different silver/PTFE composites were prepared. Silver particles with a mean size of approximately 100 nm were dry-mixed with PTFE (polytetrafluoroethylene) particles as shown in Table 2:

TABLE 2

| nano-silver and PTFE particle sizes in initial experiment | | |
|---|---|---|
| | PTFE average size 100 μm | PTFE average size 1 μm |
| nano-silver concentration (vol. %) | 0.5 | 1 |
| | 1 | 2 |
| | 5 | 10 |
| | 15 | 20 |

Composites were prepared as described for Experiment 1. The resulting composite was then subjected to a number of experiments to determine its frequency dependent dielectric properties and its structure.

Figure 11A:
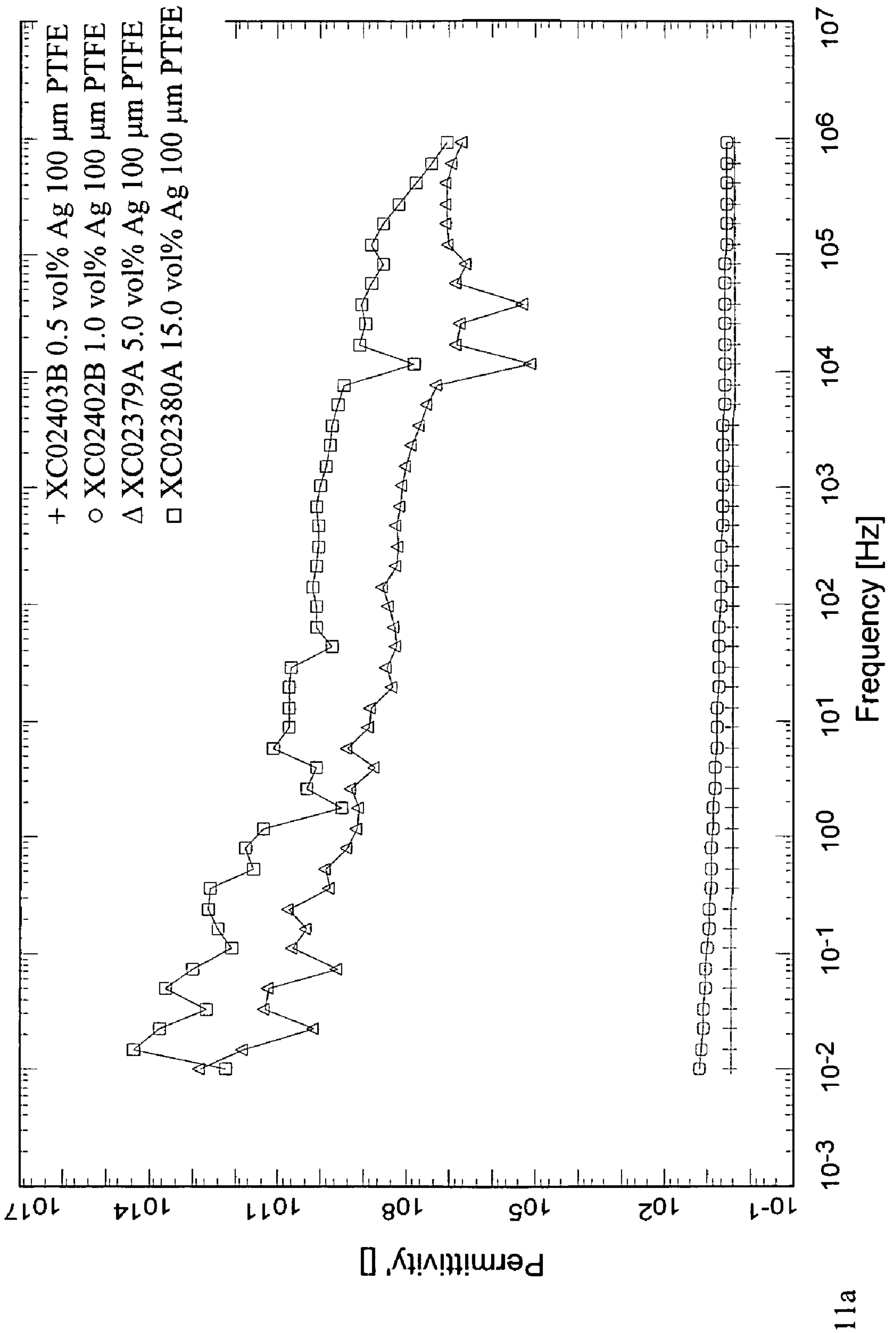
Figure 11B:
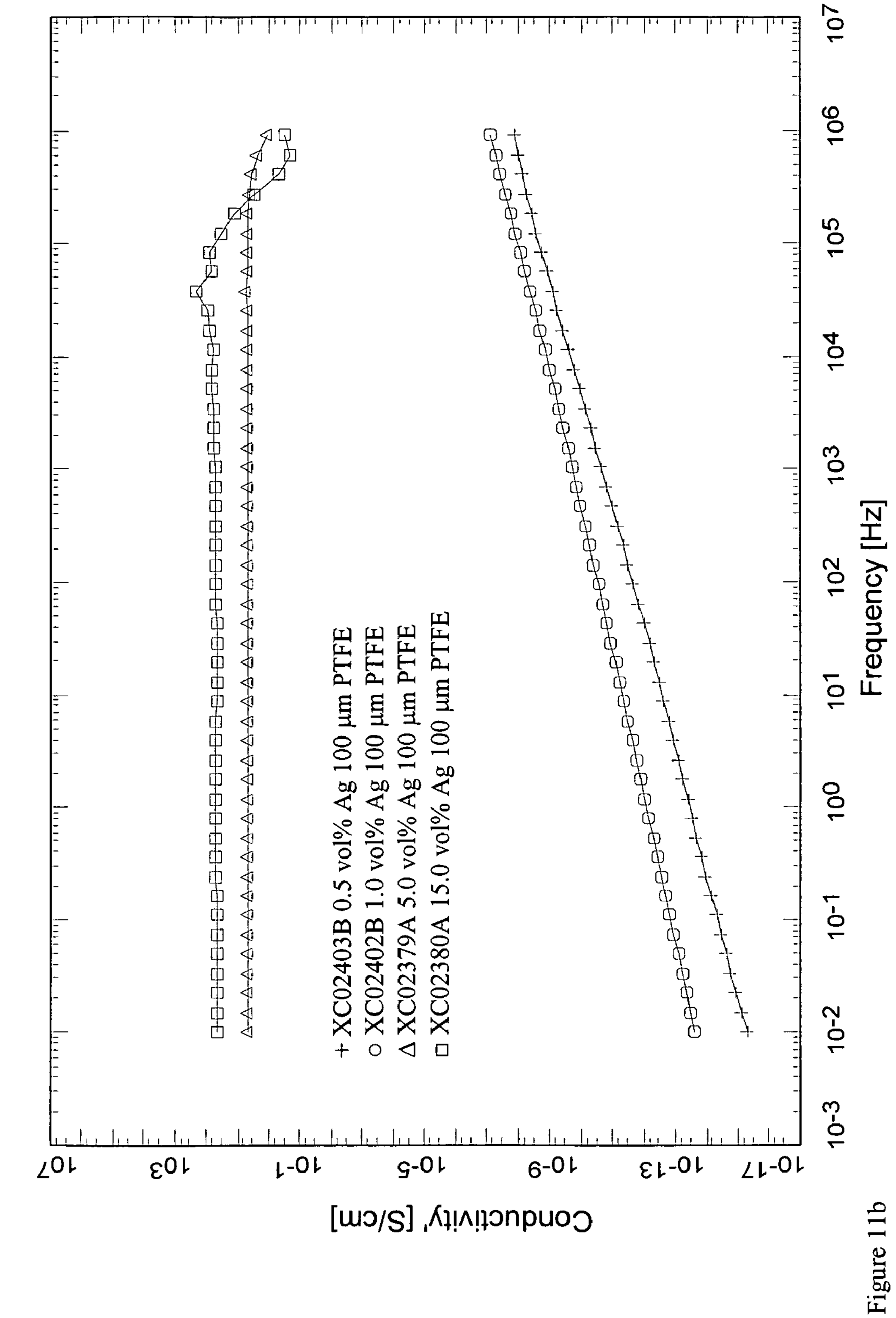
Figure 11C:
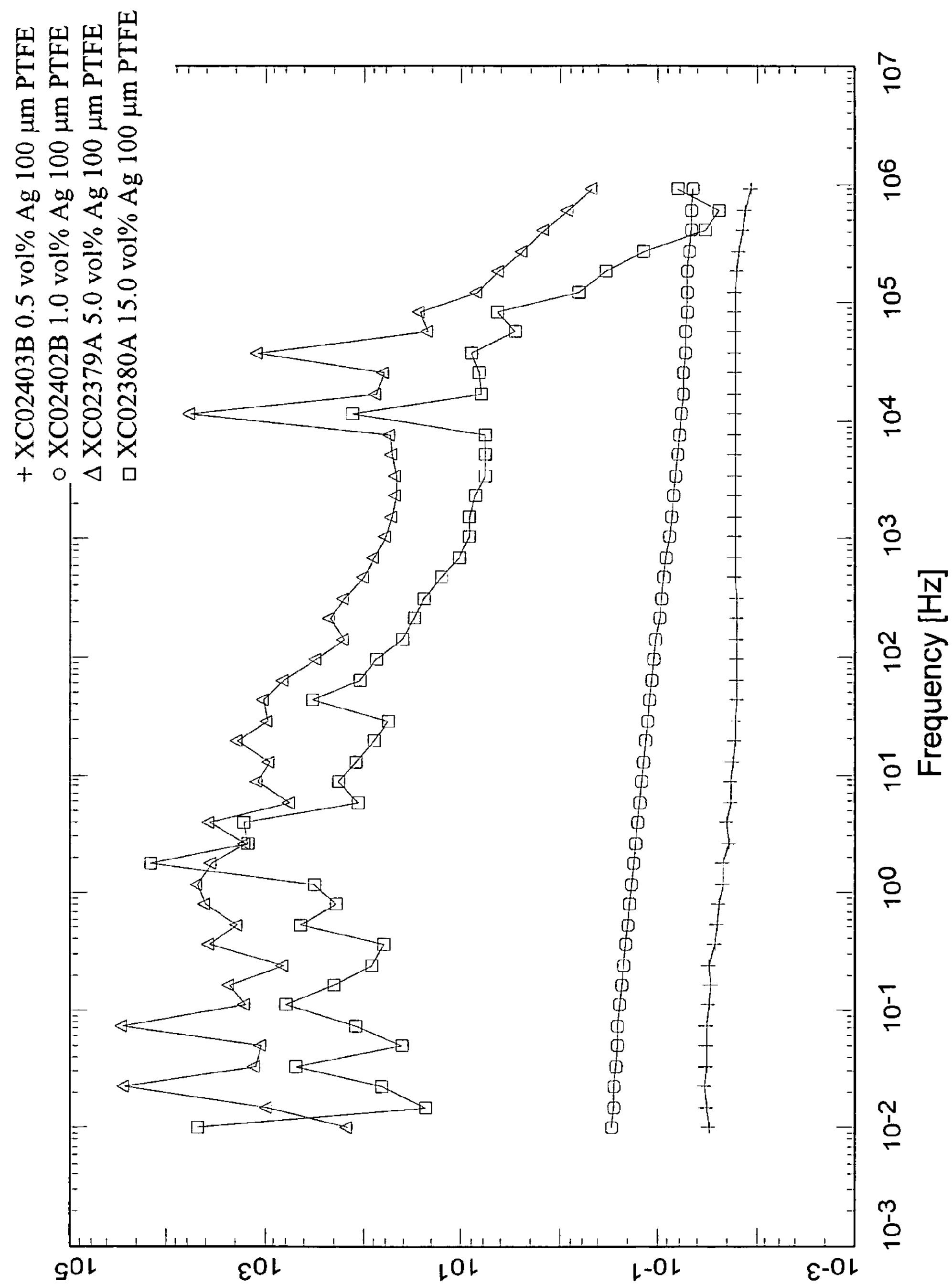
Figure 11D:
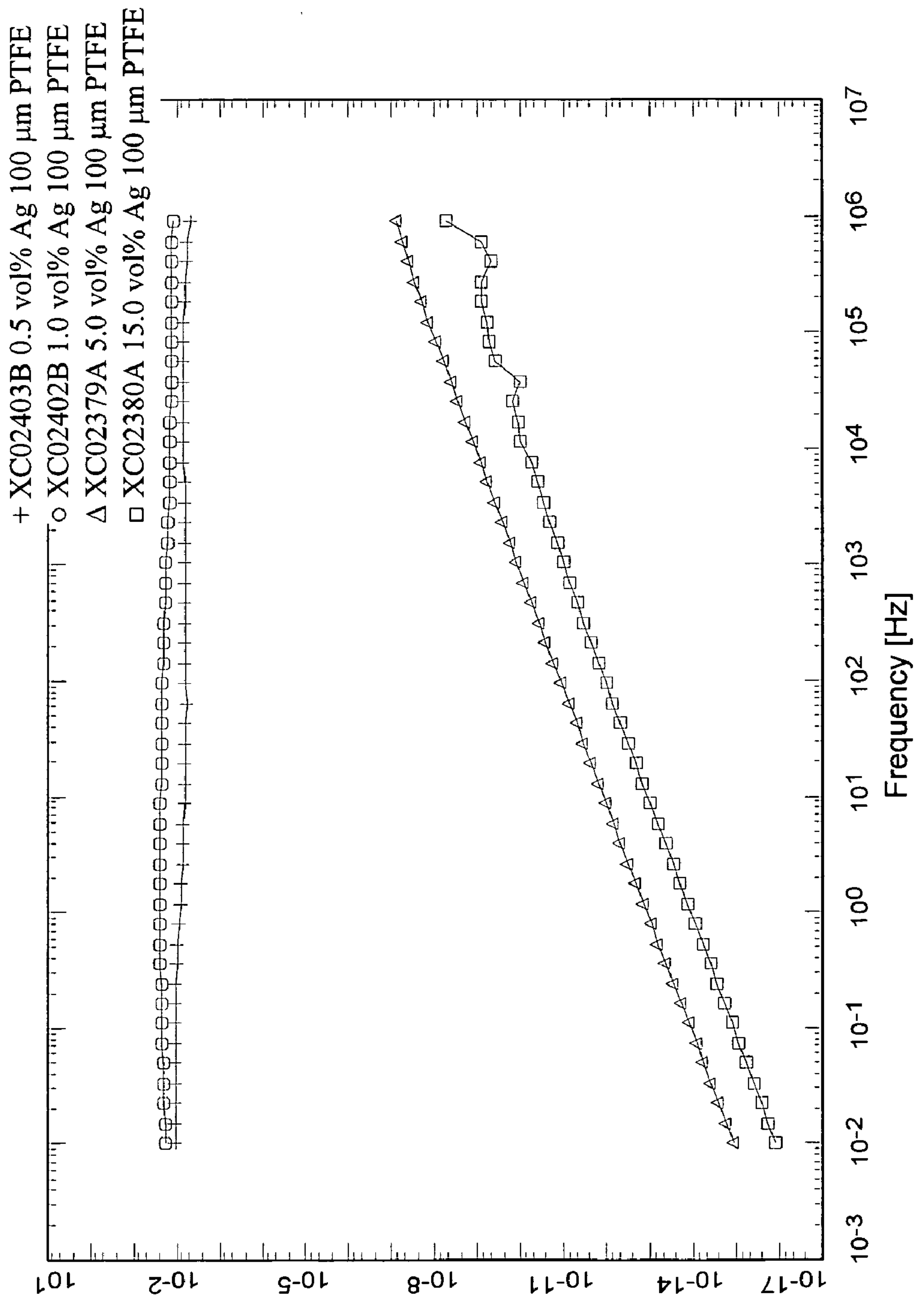

The electrical properties of the composites resulting from different concentrations or fractions of silver in 100 μm PTFE are shown in FIGS. 11*a* to 11*d*. FIG. 11*a* illustrates the real permittivity, FIG. 11*b* the conductivity, FIG. 11*c* the dielectric loss tangent and FIG. 11*d* the imaginary electric modulus for nano-silver dispersed in 100 μm PTFE.

Figure 12A:
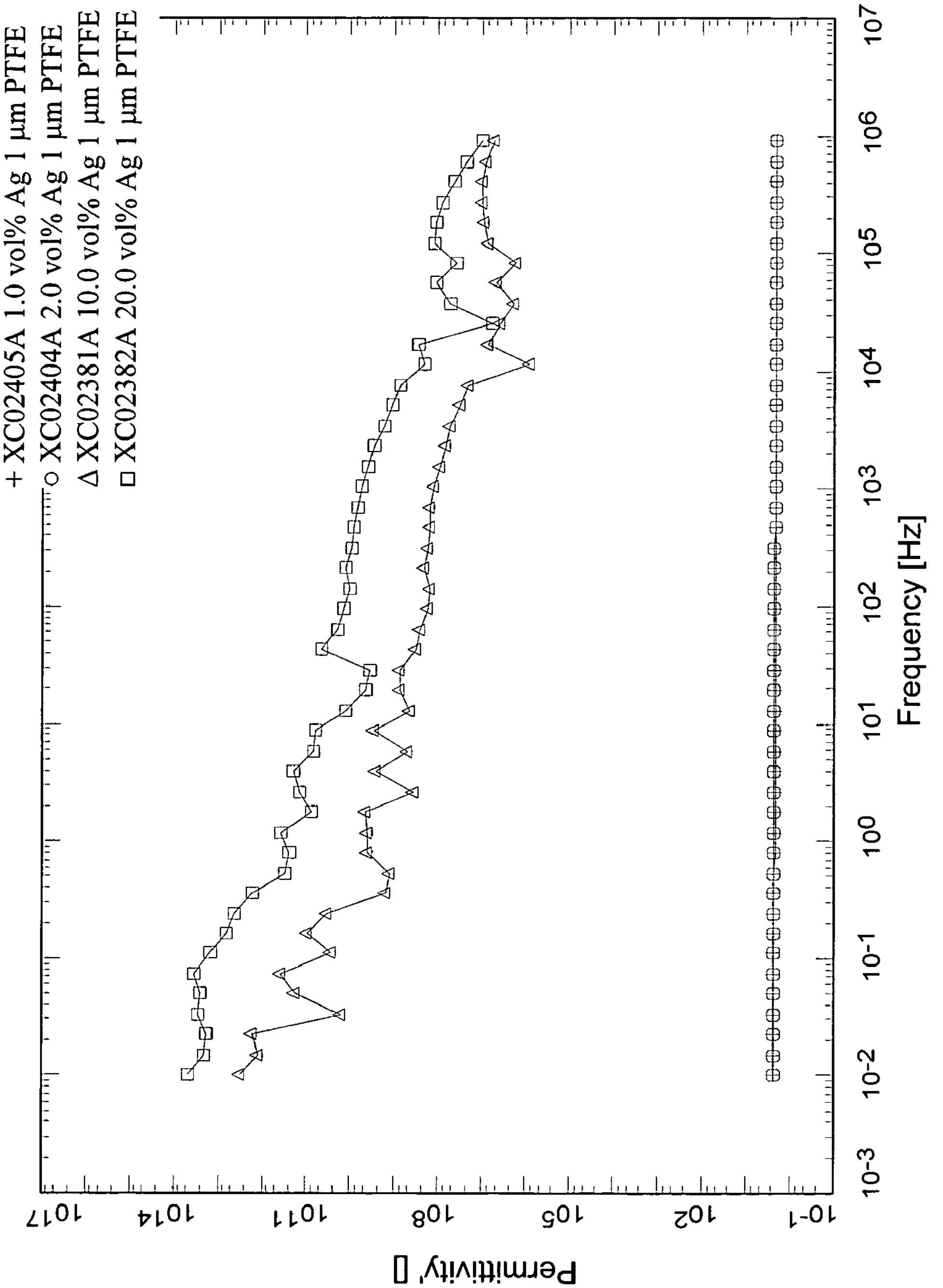
Figure 12B:
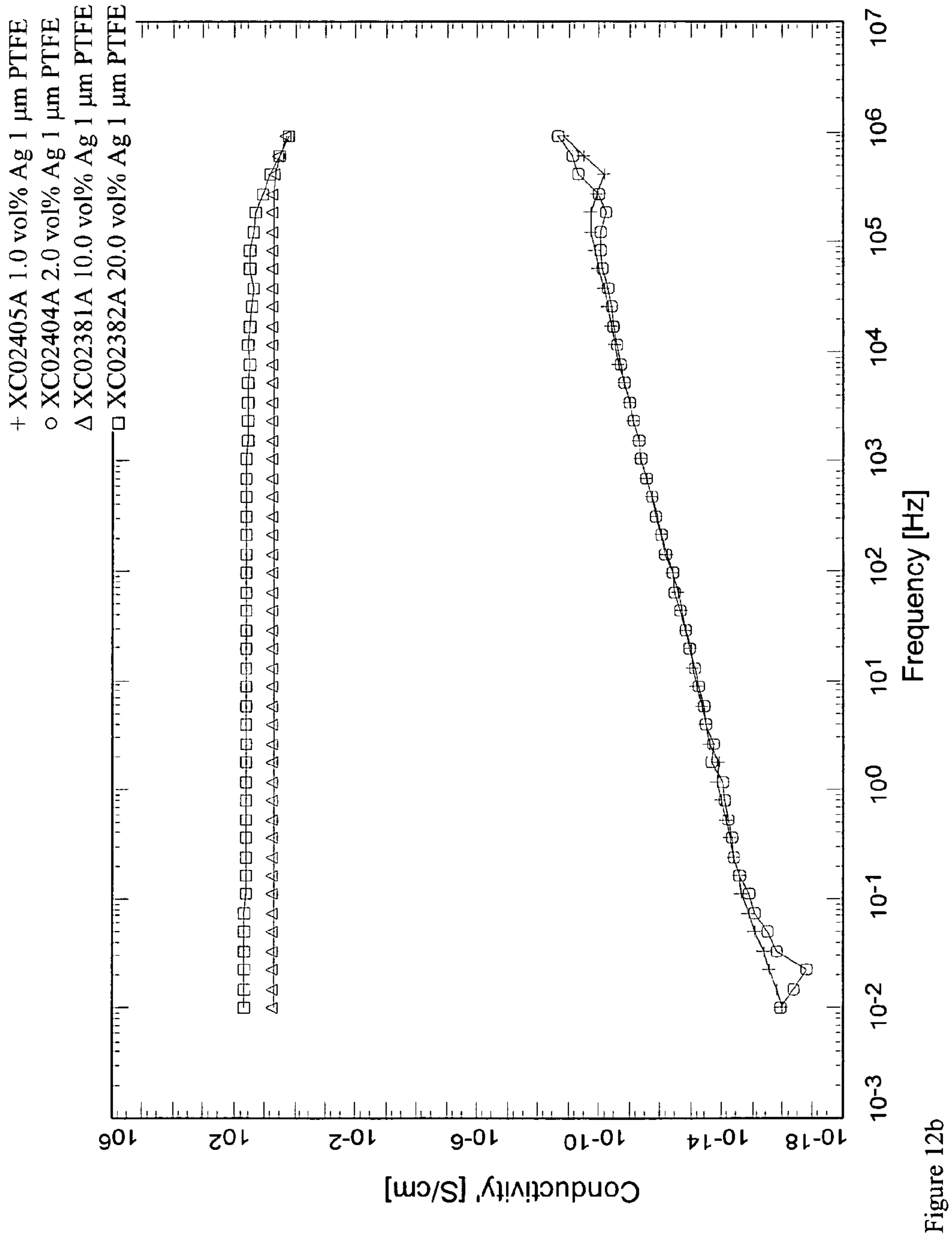
Figure 12C:
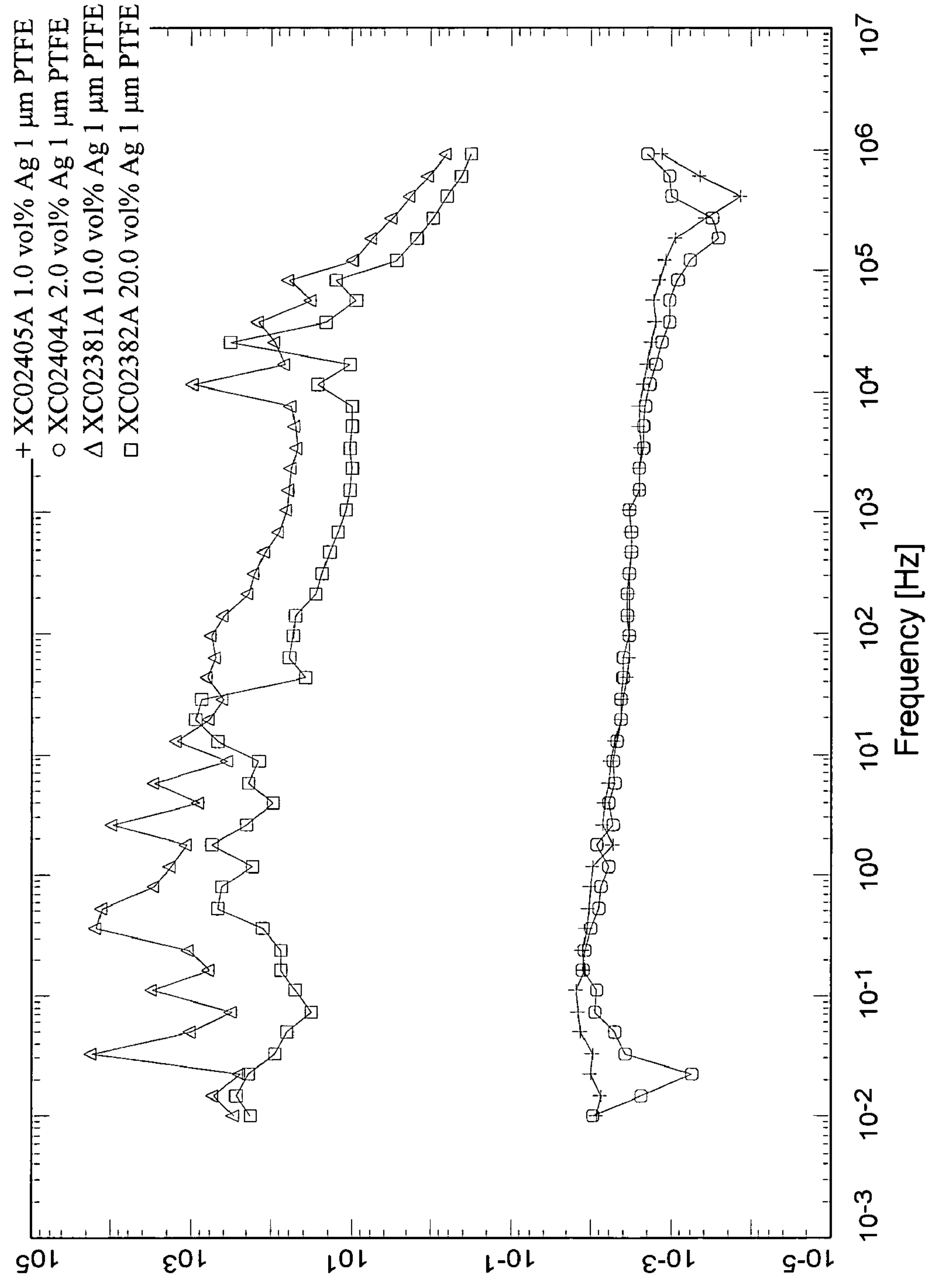
Figure 12D:
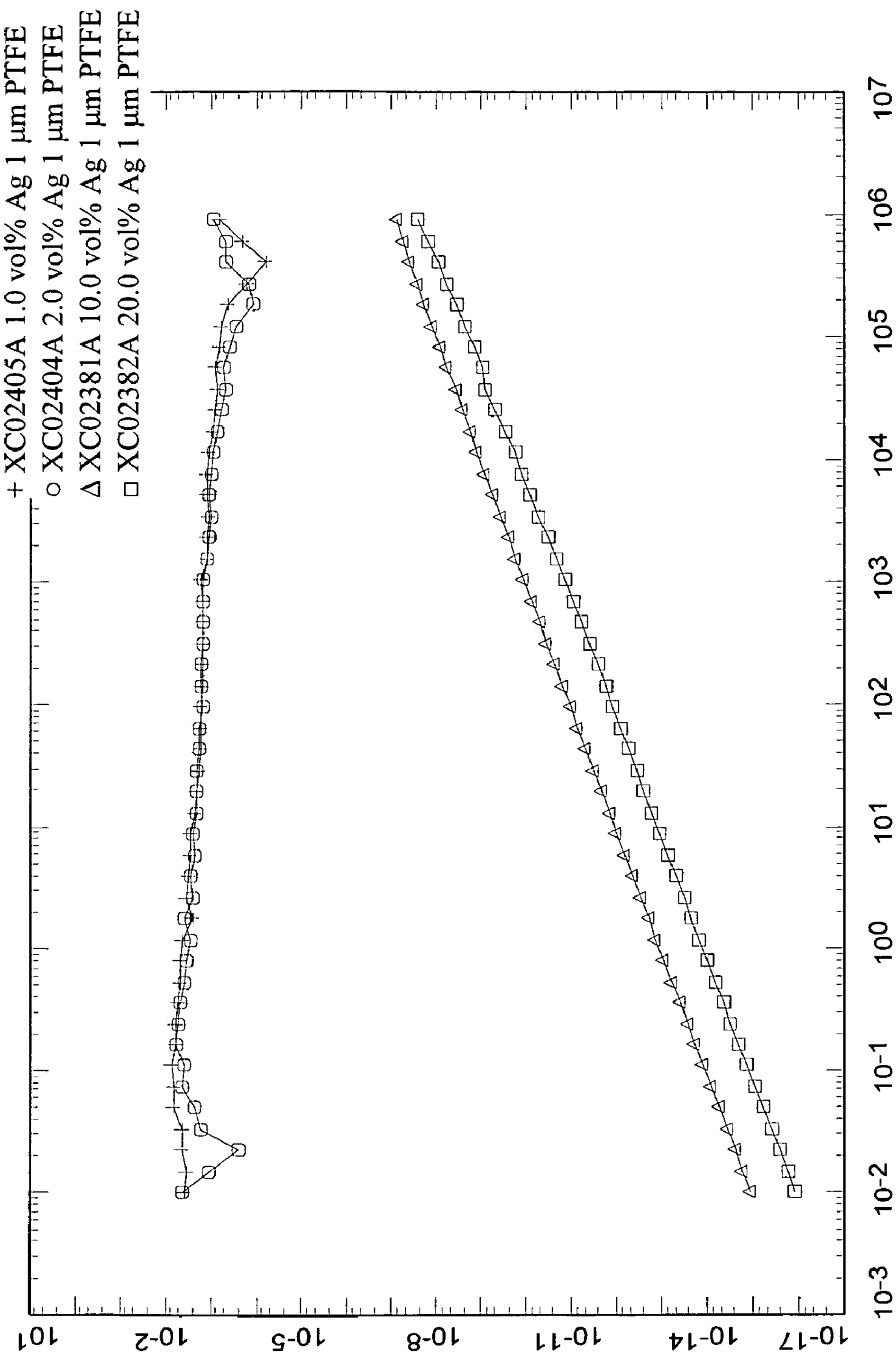

The electrical properties of the composites resulting from different fractions of silver in 1 μm PTFE are shown in FIG. 12*a* to 12*d*. FIG. 12*a* illustrates the real permittivity, FIG. 12*b* the conductivity, FIG. 12*c* the dielectric loss tangent and FIG. 12*d* the imaginary electric modulus for nano-silver dispersed in 1 μm PTFE. The measurements shown in FIGS. 11*a*-11*d* were undertaken at room temperature using a Novocontrol broadband dielectric spectrometer, comprising a Novocontrol Alpha dielectric analyser for the frequency range up to 1 MHz and an Agilent 4291 RF Impedance analyser for the frequency range 1 MHZ to 1 GHz.

The nano-silver composites exhibited a more obvious percolative response than the nano-aluminium composite, with the higher silver concentrations resulting in composites with significant conductivity for both PTFE particle sizes. There is also greater qualitative evidence that the percolation threshold is lower for a larger PTFE particle size, with the percolation threshold lying between 1.0 and 5.0 vol % for 100 μm PTFE, and between 2.0 and 10.0 vol. % for 1 μm PTFE. Given that the results for 1.0 and 2.0 vol. % for 1 μm PTFE are quantitatively very similar, it would appear that the percolation threshold will be significantly above 2.0 vol. %.

FIGS. 13 and 14*a* to *g* show the microwave response for the samples prepared in Experiment 2. These measurements were made using an Agilent 8510 Vector Network Analyser with an S-parameter Test Set and 7 mm Coaxial Transmission Line according to the method of Nicolson, Ross (IEEE Trans Instrum. And Meas., vol 19, p 377, 1970) and Weir (Proc. IEEE, vol 62, p 33, 1974).

It is observed that for silver concentrations above the percolation threshold, some samples have a real permittivity whose frequency dependence is unlike that expected from the Bruggeman model (through comparison to FIG. 9*a*, see samples XC02379 and XC02380 at concentrations of 5% and 15% in FIGS. 13*c* and 13*d*). The measured frequency dependence closely resembles that expected for a plasma. Some test samples exhibit a plasma frequency in the measured frequency range. Other test samples have a plasma frequency above the measured frequency range. For the 1 μm PTFE samples, some samples only have a real positive permittivity, which is a typical response for conductive composite materials. The plasma-like response is most consistently observed for the 100 μm PTFE samples. The conductivity highlights the percolation transition, as shown in FIGS. 13*e* and 14*e*. These microwave response results indicate that the material would be reflective to incident electromagnetic radiation at frequencies below the plasma frequency, but strongly absorbing above it.

These measurements also indicate a diamagnetic effect for silver concentrations above the percolation threshold, with a maximum magnetic loss associated with this effect. This is consistent with the Kramers-Kronig relations. Visual inspection of the composite material highlighted a significant optical reflectivity and a silvery appearance.

FIG. 14*h* compares the filler concentration dependence of the conductivity for different silver particle filled composites at an arbitrary frequency of 0.5 GHz. Composites formed from nano-silver particles dispersed with 100 μm and 1 μm PTFE particles are compared to previously obtained silver coated microspheres dispersed in paraffin wax [see Youngs I. Dielectric measurements and analysis for the design of conductor/insulator artificial dielectrics. IEE Proc., Sci. Meas. & Tech., 147(4), p 202, July 2000; Youngs I. Electrical percolation and the design of functional electromagnetic materials. PhD Thesis, University College, London. 2001]. It is observed that the gradients of the percolation transition for the nano-silver/1 μm PTFE composites is similar to that for the microsphere/wax composites although the latter has a higher percolation threshold. In contrast, the gradient of the percolation transition for the nano-silver/100 μm PTFE composites is much reduced. This difference is consistent with the relative positions of the composites on the particle size ratio scale. The microsphere/wax system exhibits a perfectly random microstructure and because the particle size ratio of the nano-silver/1 μm PTFE system is relatively close to unity its microstructure should be similarly random. Where as the nano-silver/100 μm PTFE system exhibits a clear excluded-volume microstructure. This striking difference serves to explain the increased repeatability observed in the properties of nominally identical samples or nano-silver/100 μm PTFE prepared at filler concentrations spanning the transition region.

As can be seen in FIG. 14*h* (which shows samples exhibiting a plasma-like response as solid data points and/or data points with a background) the plasma like response is exhibited for samples above the percolation threshold and on or approaching the upper plateau of the conductivity against concentration plot. The experiments suggest that the composite must have a conductivity of greater than 10 S/m and preferably about 30 S/m for a plasma-like response to be exhibited.

Experiment 3 (See FIGS. 15*a* and 15*b*)

Titanium diboride powder, of a maximum particle size of 45 μm was dry-mixed with PTFE particles having an average size at 1 μm at a titanium diboride fraction of 50 vol. %, and processed as described above for Experiment 1. The Titanium diboride powder was 45 micron powder purchased from Goodfellow Cambridge Limited.

FIGS. 15*a* and 15*b*, respectively, show the experimental complex permittivity and permeability spectrum of the resulting composite, over a frequency range of 0.5 to 18 GHz (measured using the same method used in Experiment 2.

Titanium diboride was selected because it is an oxidation resistant ceramic conductor.

The plasma resonance $\omega_p$ is clearly visible at approximately 3 GHz. There are additional zero-points in the real permittivity (at approximately 5 and 10 GHz), unlike the silver samples discussed above. The highest (3rd) zero crossing (shown as $\omega_{p1}$) is a plasma frequency that may be associated with a group of charge carriers that are more localised (which cannot cross the sample and so are probably part of finite clusters unconnected with the percolating cluster). Reference can be made to the Handbook of Conducting Polymers (Kohlman R et al ISBN 0-8247-0050-3). The ratio of $\omega_p$ to $\omega_{p1}$ is associated with the ratio of free electrons to the full conduction electron density.

There were difficulties in replicating the results of Experiment 3. The inventor believes that these difficulties may result from the fact that the conductive titanium diboride particles are larger than the non-conductive PTFE particles.

Experiments 4 and 5 (See FIGS. 16 to 18)

Following the results of experiments 1 to 3, the inventor has appreciated that it is also possible to produce composite materials utilising copper and cobalt nano-particles. Three composite materials were made. A nano copper in PTFE composite comprising copper particles having an average size of 90 nm and PTFE particles having an average size of 100 mm; a nano cobalt in PTFE composite with cobalt particles having an average size of 20 nm and PTFE particles having an average size of 100 μm; and a nano cobalt in wax composite with cobalt particles having an average size of 20 nm. The materials were produced as including PTFE and all the experiments carried out as described above for Experiment 1. The cobalt-wax composites were prepared by first dissolving the required quantity of paraffin wax (paraffin wax flakes—Aldrich 41166-3) using hexane and then stirring-in the required quantity of nano-cobalt powder. Stirring was continued until the solvent evaporated and a solid mixture remains. Test samples were prepared by die-pressing as described for Experiment 1.

FIGS. 16 and 17 show the measured electrical for the copper and cobalt composites, respectively, the experiments 4 and 5. Although the dielectric responses of copper and cobalt are similar to that of aluminium, as shown in FIGS. 16 and 17, of these three fillers, cobalt composites produce the highest conductivity, subject to the accuracy of filler concentration. FIGS. 16*a* and 17*a* show real permittivity, FIGS. 16*b* and 17*b* show imaginary permittivity, FIGS. 16*c* and 17*c* show conductivity, FIGS. 16*d* and 17*d* show dielectric lose tangent, FIGS. 16*e* and 17*e* show real electric modulus and FIGS. 16*f* and 17*f* show imaginary electric modulus.

FIG. 18 shows that negative real permeability has not been observed in either cobalt-PTFE or cobalt-wax composites, but that a ferromagnetic contribution (the reduction in real permeability with increasing frequency) inherent to the cobalt particles is observed.

Cobalt is a transition metal with unpaired electrons in the outer d-orbitals. These unpaired electrons give rise to domains of aligned magnetic dipoles and a net magnetisation which may be represented by a vector precessing about a preferred crystallographic axis. The precession frequency is determined by specific material parameters which relate to the magnetic anisotropy field inherent to the material. An incident electromagnetic wave can couple to this precession and at a critical frequency at which the incident frequency approaches the natural precession frequency resonant absorption will occur. For the transition metals and many ferrites (transition metal oxides) this occurs at microwave frequencies. The features observed in the experimental data are evidence of this process and moreover, demonstrate that damping processes are present resulting in features that are closer to the relaxation form (discussed for dielectric response) rather than a sharp resonance.

This ferromagnetic contribution increases with filler fraction, although the dependence of the magnetic properties on the filler fraction is not dependent on the percolation threshold. Consequently, it is possible to maximise the magnetic properties by simply increasing the filler fraction or concentration.

In composites embodying the present invention (including those discussed in relation to the experiments FIGS. 10-18 above); the electrically conductive material exhibits no long range order over a distance of the order of the wavelength of radiation propagating in the material, and for frequencies close to the plasma frequencies (where the permittivity would be close to zero and there is a singularity), the effective wavelength of electromagnetic radiation in the material diverges, Waves travelling through a material have an effective wavelength which is governed by the permittivity of the material. As the material's permittivity drops, the effective wavelength increases. However, there is a singularity because at the plasma frequency the permittivity is zero which would give an effective wavelength of infinity.

This should not be taken to mean that amongst the conductive component there is no regular ordering of individual particles, but merely that clusters and networks are formed. In the composites, the conductive material is randomly dispersed although not necessarily uniformly dispersed. There is no form of periodicity in the dispersion of the conductive component. The amount of electrically conductive material is preferably sufficient to form a conductive network, extending over a distance of the order of the effective wavelength of radiation travelling through the material. There is therefore also no long range order of particles forming the network or within the network.

A single conductive network may be formed, which extends from one face of the material to another, preferably an opposite face, or a plurality of linked networks (i.e. linked by clusters) may be formed.

The network may be in one, two or three dimensions. This merely reflects the dimensionality of the connectivity between the individual elements forming the network. However, this does not place any form of limitation on the structure or design of the material in which the network exists. For example, it may be possible to have a three-dimensional material, which contains a two-dimensional network, other forms of material, such as sheets or hollow bodies manufactured from sheets or other materials may also contain one-dimensional, two-dimensional or three-dimensional networks.

Although only materials which are designed to exhibit a negative permittivity with a plasma frequency in the microwave regions of the electromagnetic spectrum have been described here, it will be understood by those skilled in the art that the same techniques of materials design and production can be applied to produce a composite material which exhibits a small positive permittivity, resulting in a material with a small (less than unity) positive refractive index. Such materials are of interest as if their refractive index is less than that of air, total internal reflection could be achieved easily for radiation incident from air onto such a material.

The physics underlying the effects described above is complicated and not yet fully understood. As is clear from the experiments carried out by the inventor the existing models fail to accurately predict the behaviour of composite materials having conductive material in an insulating host. The inventor was the first to appreciate how such materials would behave and how they have a plasma frequency which may be affected by the nature of the electrically conductive and non-conductive materials making up a composite material. The inventor's analysis suggests that there are a number of theoretical models which when modified, the inventor believes have the potential to fit the experimental evidence and explain the dependence of the plasma frequency on material parameters such as particle shape, size, conductivity, microstructure and concentration to aid composite design.

The candidate models identified by the inventor as having the potential, when modified, to fit the measured microwave plasma-like response include:

1) The model for the infra-red dielectric response of intrinsically conducting polymers discussed in Kohlman R, Epstein A. *Insulator-metal transition and inhomogeneous metallic state in conducting polymers*. Chapter 3 (pages 100-110 in particular) in Handbook of Conducting Polymers, $2^{nd}$ Ed., Marcel Dekker, New York, 1998;

2) The model for metallic patches joined by narrow connections discussed in Govorov A, Studenikin S, Frank W. *Low frequency plasmons in coupled electronic microstructures*. Physics of the Solid State, 40(3), p 499, 1998; and 3) The effective medium model discussed in Sarychev & Shalaev. *EM properties of metal-dielectric composites beyond the Quasi-static approximation*. Physics Reports, 335, p 275 371 2000.

A comparison of the inventor's experimental results described herein, appears to indicate that a modified version of the Sarychev and Shalaev model provides a qualitative match to the experimental data. This is an effective medium model that goes beyond the quasi-static approximation by including a skin-depth component (to determine the extent to which applied fields die away within the material)

$$(1-V)\frac{\varepsilon-\varepsilon_m}{2\varepsilon+\varepsilon_m}+V\frac{\varepsilon-\tilde{\varepsilon}_f}{2\varepsilon+\tilde{\varepsilon}_f}=0 \tag{21a}$$

with $$\tilde{\varepsilon}_f=\varepsilon_f\frac{2F(k_f a)}{1-F(k_f a)} \tag{21b}$$

$$F(x)=\frac{1}{x^2}-\frac{\cot(x)}{x} \tag{21c}$$

and $$k_f=\frac{2\pi f}{c}\sqrt{\varepsilon_f\mu_f} \tag{21d}$$

By inspection, it is deduced that this model is an extension of the symmetric Bruggeman model given earlier. McLachlan (McLachlan D, Heiss W. Chiteme C and Wu J. Physical Review B, 58(20), p 13558, 1998.) has previously modified the Bruggeman model to introduce the features of percolation theory in a more quantitative fashion. Specifically, McLachlan introduces the percolation threshold and the power law exponents $$(1-V)\frac{\varepsilon^{1/s}-\varepsilon_m^{1/s}}{\left(\frac{1-V_c}{V_c}\right)\varepsilon^{1/s}+\varepsilon_m^{1/s}}+V\frac{\varepsilon^{1/t}-\varepsilon_f^{1/t}}{\left(\frac{1-V_c}{V_c}\right)\varepsilon^{1/t}+\varepsilon_f^{1/t}}=0 \qquad (22)$$

The similarity of these models leads to the application, by the inventor, of McLachlan's phenomenological modifications to the Sarychev-Shalaev model, $$(1-V)\frac{\varepsilon^{1/s}-\varepsilon_m^{1/s}}{\left(\frac{1-V_c}{V_c}\right)\varepsilon^{1/s}+\varepsilon_m^{1/s}}+V\frac{\varepsilon^{1/t}-\tilde{\varepsilon}_f^{1/t}}{\left(\frac{1-V_c}{V_c}\right)\varepsilon^{1/t}+\tilde{\varepsilon}_f^{1/t}}=0 \qquad (23)$$

Analogous equations can be set out for the magnetic permeability.

The real benefit of the new model is that it can be used to simultaneously predict or fit both the complex permittivity and permeability of a conductor-insulator composite. The parameters in the model are:

- matrix and filler permeability and permittivity, Complex if required;
- filler concentration or fraction;
- percolation threshold;
- percolation exponents;
- filler particle size; and
- frequency of the applied electromagnetic field.

FIG. 19 illustrates an attempt to fit representative experimental data, in the form of the complex permittivity and permeability for 5 vol. % silver nano-particles (the average size 100 nm) mixed with 100 μm PTFE particles, over the frequency range 0.5 to 18 GHz using the Sarychev-Shalaev-McLachlan model. In this case, the percolation exponents were set at unity, representing the situation for the Sarychev-Shalaev model. All other parameters were set to values representative of the measured composite as shown in Table 3:

TABLE 3

Parameters for FIG. 19

| Parameter | Value |
|---|---|
| Matrix permittivity | 2.1-j0.001 |
| Matrix permeability | 1 |
| Filler conductivity (S/m) | 1E7 |
| Filler permeability | 1 |
| Percolation threshold | 0.04469, 0.04470 |
| Filler volume fraction | 0.05 |
| Percolation exponent, s | 1.0 |
| Percolation exponent, t | 1.0 |
| Filler particle radius (nm) | 50 |

It is observed that the diamagnetic effect in the magnetic permeability is not predicted, the conductivity of the composite is over estimated and no minimum is predicted, but most significantly, a plasma frequency is not predicated even with control of the percolation threshold to a tolerance of 0.001 vol. %.

If the values of the percolation exponents are set to the universal values for a three-dimensionally connected network, then it becomes possible to predict a plasma-like response. This is illustrated in FIG. 20. However, the gradient of the real permittivity at the plasma frequency remains poorly predicted, as does the composite conductivity and the magnetic permeability. The parameters used in this calculation are shown in Table 4:

TABLE 4

Parameters for FIG. 20

| Parameter | Value |
|---|---|
| Matrix permittivity | 2.1-j0.001 |
| Matrix permeability | 1 |
| Filler conductivity (S/m) | 1E7 |
| Filler permeability | 1 |
| Percolation threshold | 0.04 |
| Filler volume fraction | 0.05 |
| Percolation exponent, s | 0.73 |
| Percolation exponent, t | 1.9 |
| Filler particle radius (nm) | 50 |

A much better qualitative fit to all four parameters is obtained by re-considering the structure of the composite. In the case of the nano-silver particles mixed with 100 μm PTFE particles, concentrations above the percolation threshold resembled a close-packed arrangement of approximately 100 μm diameter pseudo-conducting particles. The pseudo-conducting particles are taken to have a PTFE core with semi-continuous or continuous silver coating created by the silver nano-particles. This is shown in the SEM (scanning electron microscope) images of FIG. 21.

Figure 21A:
Figure 21B:
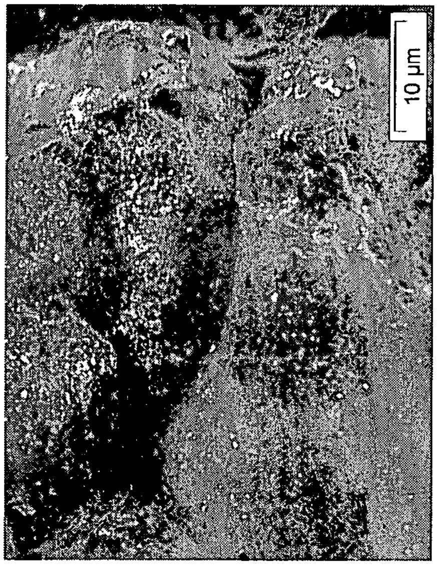

FIGS. 21*a*, 21*b*, 21*c* and 21*d* show backscattered images of compositions comprising 0.5 vol %, 1.0 vol %, 5.0 vol % and 15 vol % nano-silver particles and 100 μm PTFE particles respectively. In FIGS. 21*a* and 21*b*, it is clear that individual silver particles form some clusters on the surface of the PTFE particles, but not enough to form a conductive network. Consequently these particular samples do not conduct, or exhibit a plasma frequency.

Figure 21C:
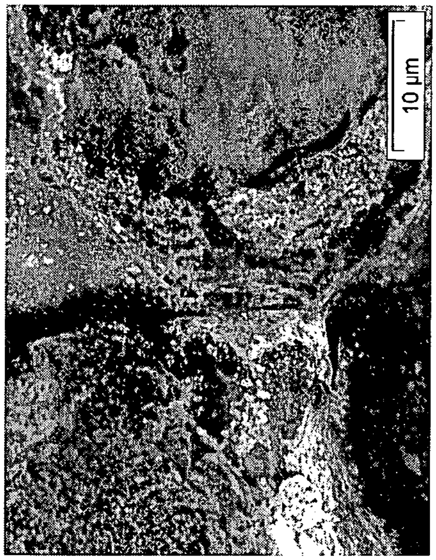
Figure 21D:
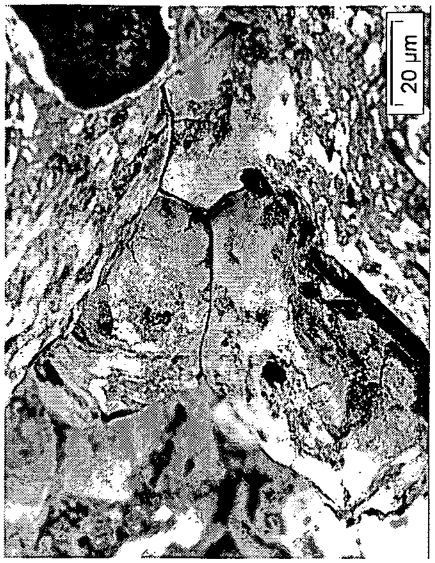

FIGS. 21*c* and 21*d* show compositions with a higher nano-silver concentration. In FIG. 21*c*, the nano-silver concentration is high enough that some clusters have begun to form networks, one of which is shown stretching from the left-hand side of the image to the right-hand side. In FIG. 21*d*, the silver concentration is high enough to form a coating of approximately three silver particles deep over each PTFE particle. Both of the samples shown in FIGS. 21*c* and 21*d* conduct, and exhibit a plasma frequency.

Figure 21E:
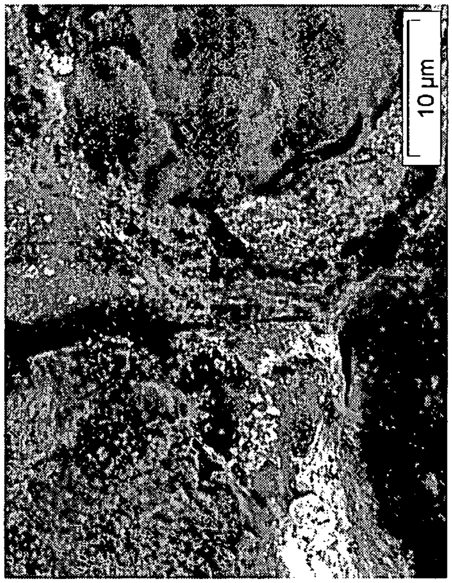
Figure 21F:
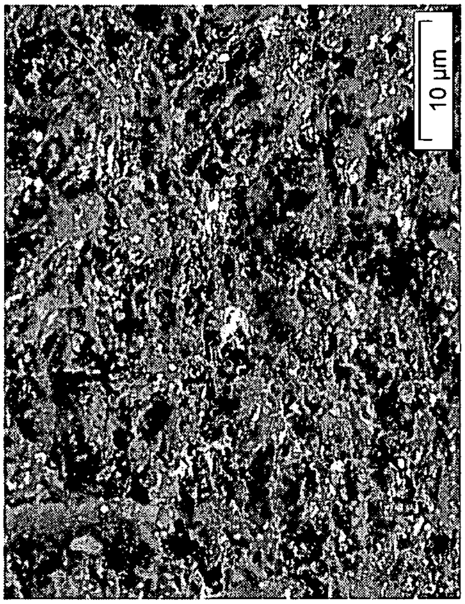

FIGS. 21*e* and 21*f* show materials with identical nano-silver concentrations (5.0 vol %) with PTFE particles of 100 μm and 1 μm size, respectively. The nano-silver distribution in FIG. 21*f* is fairly regular across the entire sample, whereas that in FIG. 21*e* clearly forms a network.

Figure 21G:
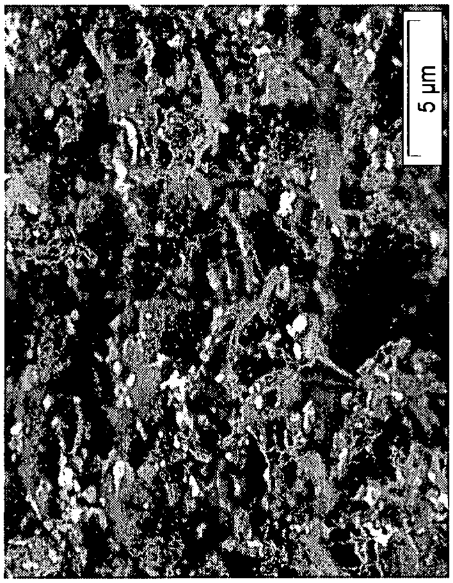
Figure 21H:
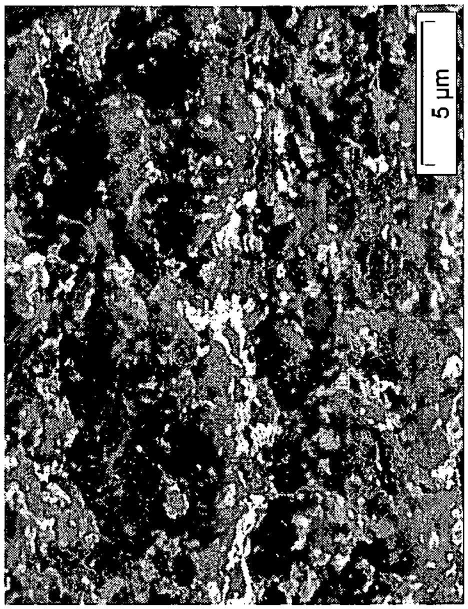
Figure 22B:
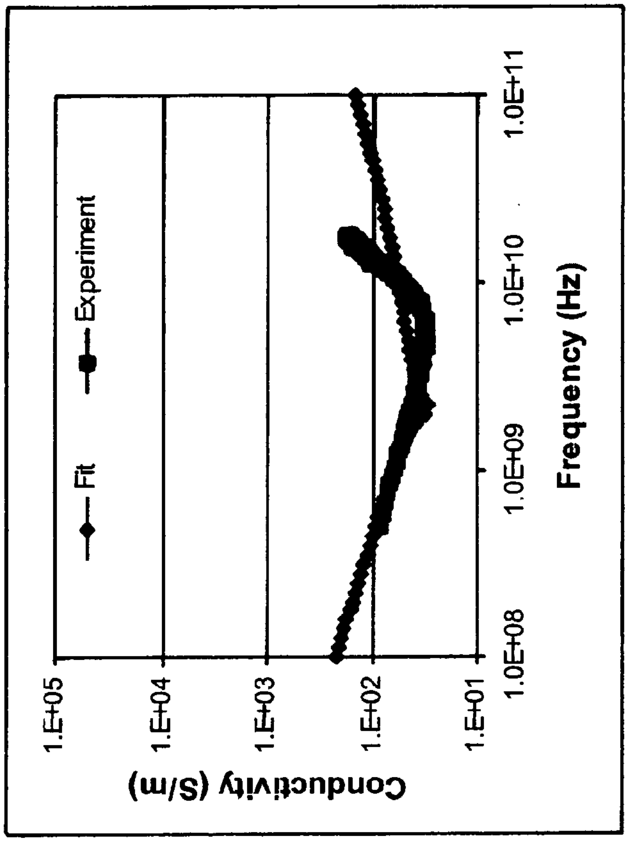
Figure 22A:
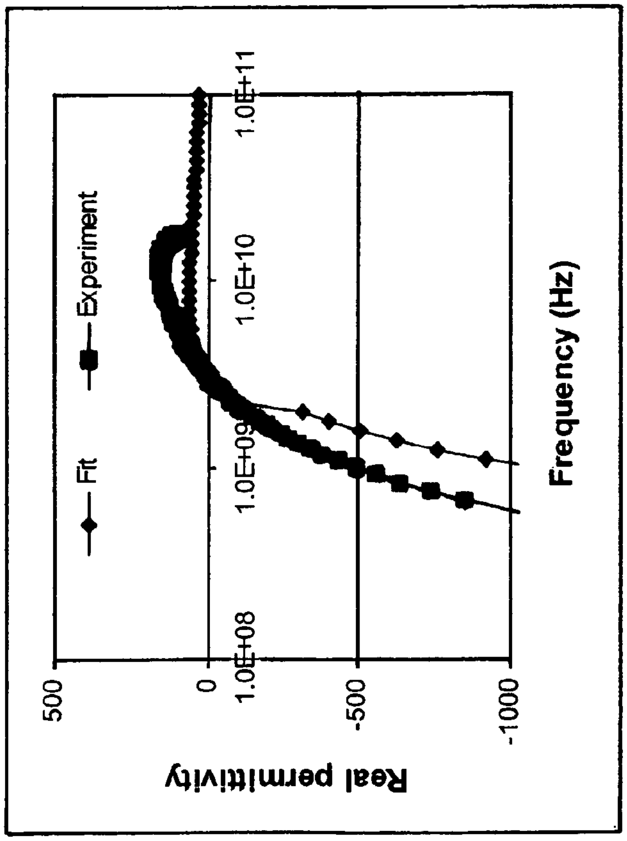
Figure 22C:
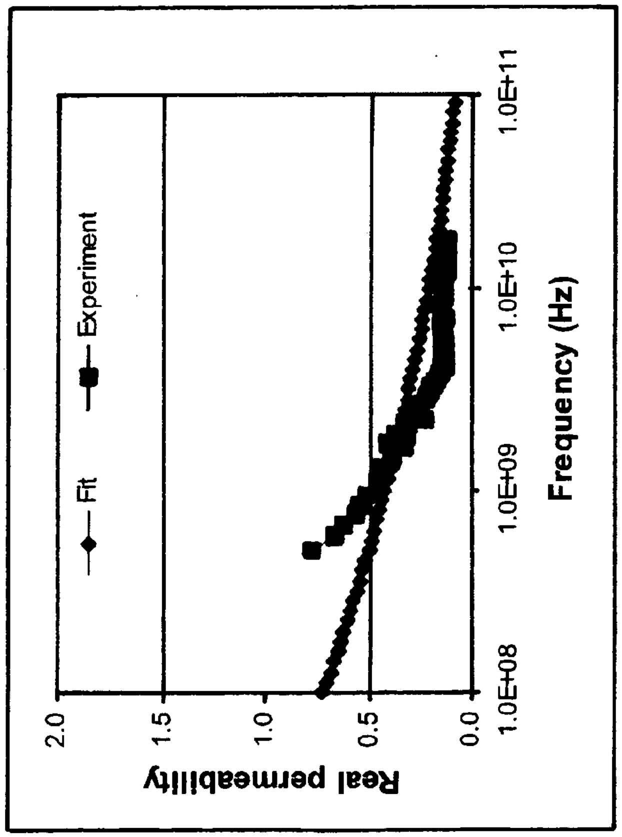
Figure 22D:
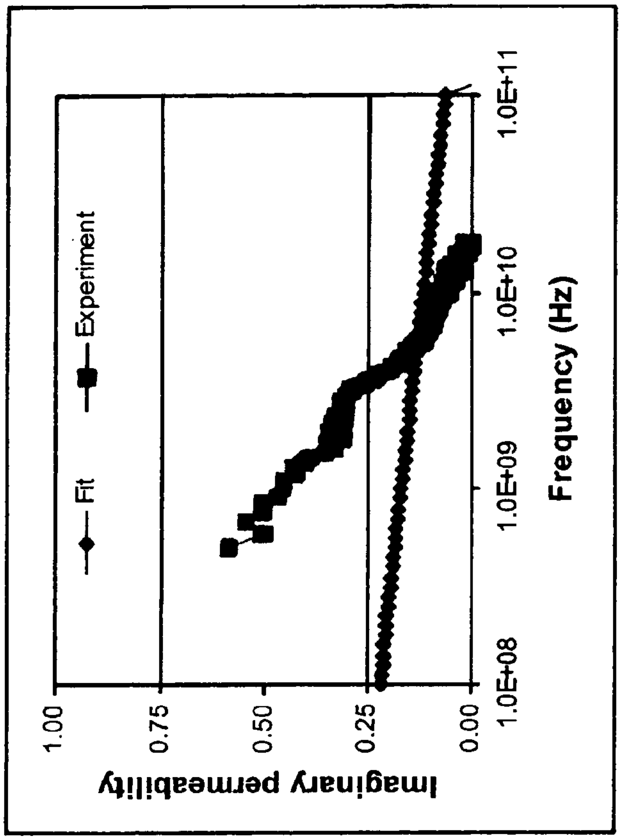

FIGS. 21g and 21*h* show backscattered images of two nominally identical compositions with 10 vol % nano-silver particles and 1 μm PTFE particles. The sample in FIG. 21*g* exhibited a plasma frequency, whereas that in FIG. 21*h*, did not, but exhibited a "conventional" positive permittivity.

It is necessary to determine how the model parameters relate to the materials tested, which is determined by the behaviour of the insulator phase, the PTFE particles. Taking a case where the PTFE particles have a nominal radius of 50 μm, the silver particles have a tendency to coat the surface of the PTFE particles. Ultimately, this leads to the creation of pseudo-conducting particles once there is a percolating network of silver particles over the PTFE particle surface. This has occurred in the samples tested because the results demonstrate a significant DC conductivity. These conductor-coated particles are also close-packed. Close-packing occurs for concentrations of the order of 60 vol %.

A second explanation is that the properties are driven by two-dimensional percolation over the sample surface because the theoretical percolation threshold for two-dimensional systems is 50 vol %. These points are emphasised by the backscatter scanning electron micrographs presented in FIGS. 21*a* to 21*d*.

It is also of interest to compare the microstructures of the composites formed using 100 μm and 1 μm PTFE, and to consider why the properties of the latter have a much lower sample to sample repeatability, as shown in FIGS. 21*e* and 21*f*. The excluded volume microstructure is much less evident for the smaller PTFE particle size. In fact, in this case, the distribution of silver particles appears much closer to a distribution that might be formed if the silver particles are allowed to occupy space in the composite on a perfectly random basis. The issue of repeatability can be explained as follows. When the conducting filler particles are able to fill space on a perfectly random basis, then a composite sample will only become conductive when there is a connected network of conducting particles across the bulk of the sample. However, when the insulating matrix particles are much larger than the filler particles, the bulk sample will conduct when there is a percolated layer of particles surrounding individual matrix particles. Simplistically, the scale of control is reduced to an individual particle surface rather than the bulk dimensions of the object. At present, the gradient of the transition from the excluded-volume dominated behaviour to the random filling behaviour, as a function of particle size ratio, is not known. The steeper this transition, the smaller the matrix particles can be without reducing repeatability. This would lead to the prospect of thinner coatings or smaller components.

Since the conducting filler distribution is critical to the phenomenon, it is also interesting to compare the microstructures for two nominally identical samples, but which give quite different dielectric response. For example, FIGS. 21*g* and 21*h* compare two samples, which are nominally 10 vol % concentrations of silver nano-particles dispersed with 1 μm PTFE particles. The sample shown in FIG. 21*g* exhibited a microwave plasma frequency, whereas that shown in FIG. 21*h* had a conventional positive dielectric response. The micrographs reveal a subtle difference in silver particle distribution. There is an indication that the silver particles are more uniformly dispersed in the sample shown in FIG. 21*g*. In the context of the model, a uniform dispersion of sufficient filler particles to form a percolation path around a matrix particle should more readily enable percolation over the bulk and a higher composite conductivity. This is consistent with the experimental conductivity data. The conductivity for high silver concentrations in the 100 μm PTFE composites is much more repeatable and at the higher end of the spread in the equivalent data for the 1 μm PTFE composites. It is the 1 μm PTFE samples with highest conductivity that exhibit the plasma response. This observation further supports the hypothesis that there is a critical conductivity that must also be surpassed to achieve the plasma response. This critical conductivity could be associated with a conducting material being classed as 'truly metallic'. Indeed, the critical conductivity deduced from the available data is close to Mott's limiting value for metals (approximately $10^4$ S/m), To further put this into context, the conductivity of bulk copper is approximately $10^8$ S/m.

Consequently, it may be relevant to re-assign different values to the conducting filler concentration, the percolation threshold and the filler particle size. The resulting fit is illustrated in FIG. 22. The parameters used in this calculation are given in Table 5 below:

TABLE 5

Parameters for FIG. 22

| Parameter | Value |
|---|---|
| Matrix permittivity | 2.1-j0.001 |
| Matrix permeability | 1 |
| Filler conductivity (S/m) | 1E7 |
| Filler permeability | 1 |
| Percolation threshold | 0.6 |
| Filler volume fraction | 0.6025 |
| Percolation exponent, s | 0.73 |
| Percolation exponent, t | 1.9 |
| Filler particle radius (nm) | 50,000 |

As can be seen from the modelling results (in FIGS. 19, 20 and 22), although a good qualitative fit is obtained, there are some discrepancies where differing sizes of PTFE filler are used. The experiments show that there is little difference in the magnitude of the diamagnetic effect for samples with 100 μm PTFE particles or 1 μm PTFE particles. In the model, diamagnetic effect is partly compensated for by adjusting particle size. Consequently, the predicted properties for small particle composites differ somewhat from those observed in experiments. However, it may be possible to overcome this by modelling the diamagnetic effect by including a macroscopic toroidal field component, or alternatively using Mie theory, although other factors such as sample geometry must be taken into account.

FIG. 22 demonstrates that a good qualitative fit can be obtained using the modified Sarychev-Shalaev-McLachlan model for the 5 vol. % silver nano-particles mixed with 100 um PTFE particles, albeit after some re-assignment of certain parameters including the filler particle size, filler fraction and percolation threshold. For such modifications to be truly permissible, then they should hold for related cases. An important example, is the 10 vol % silver nano-particles mixed with 1 um PTFE particles. Here, the adjusted filler particle radius would need to be 500 nm. This would have the effect of significantly reducing the diamagnetic effect in the microwave range.

However, comparison of FIGS. 13*f* and *g* to FIGS. 14*f* and *g* indicate that the diamagnetic effect is largely unaffected by the change in PTFE particle size. Thus, greater understanding is required before the modified Sarychev-Shalaev-McLachlan model can be used to quantitatively design materials of this type.

The inventor has also observed plasma-like frequencies at much lower frequencies, as shown in FIGS. 23*a* and 23*b*. Materials with a nano-silver concentration of 5 volt, and a PTFE particle size of 100 μm demonstrate a conductivity change at $10^4$ Hz (FIG. 23*a*), and a negative real permittivity at around $10^3$ Hz (FIG. 23*b*). These materials were prepared in the manner discussed above for Experiment 1. In each case, the samples were cooled to −60° C. and −10° C. or heated to 30° C. This gave fairly consistent results, with one sample exhibiting repeatability.

The issues of particle size, particle packing and contact areas of the particles in the composite material have been explored further by the inventors in order to understand the mechanism by which the conductivity gradient changes, and to enable the production of materials of uniform and repeatable compositions having tailored dielectric and conductive properties. The materials comprises regions of electrically conductive and non-electrically conductive materials, where the conductivity of each material is determined by the degree of connectivity between the electrically conductive regions.

FIG. 25 compares the concentration dependence of the conductivity of four compositions at 0.5 GHz:

Ag (100 nm particle size) and PTFE (1 μm particle size);

Ag (100 nm particle size) and PTFE (1 μm particle size);

Ag (100 nm particle size) and paraffin wax; and

Ag (15 μm diameter spheres) and paraffin wax.

For each composition, appropriate quantities of the different materials were measured into a container. The container was then placed in a dry argon atmosphere (less than 50 ppm air) for at least 12 hours to remove any residual moisture to reduce particle agglomeration during mixing. The container was then sealed under the argon atmosphere before placing on a shaker mixer that was then operated for approximately 60 minutes to thoroughly mix the particles. The argon atmosphere minimises any further oxidation of the particles during mixing. The resulting powder was then die-pressed at room temperature at a pressure of 260 MPa for 300 seconds to produce test samples.

The behaviour of these materials in the region of the percolation threshold may be determined by either 3D percolation only at close packing concentrations, or by 2D percolation over the surface of the insulating particle. A distinction between these two types of behaviour can be identified using the percolative power law exponents.

Although the gradients of the percolation transition for the 100 nm Ag/1 μm PTFE composites is similar to that of microsphere/wax composites, the percolation threshold of the microsphere/wax composites is higher. The gradient of the percolation transition of the 100 nm Ag/100 μm PTFE compositions is reduced, which is consistent with the relative positions of the materials on a particle size ratio scale. The gradient (on a log-log scale) for the 1 μm PTFE material is approximately 30, whereas that for the 100 μm PTFE material is approximately 7.

The microsphere/wax system exhibits a perfectly random microstructure, and the particle size ratio of the 100 nm Ag/1 μm PTFE is relatively close to unity (1:10), the microstructure is also similarly random. However, the 100 nm Ag/100 μm PTFE system has a particle size ratio of 1:1000, and exhibits the properties of an excluded volume microstructure, whose physical properties arise from the use of a small filler concentration within a composite material. In an excluded volume microstructure, the regions of electrically conductive material will be excluded from certain areas (the non-electrically conductive matrix), which means that in order for the material to exhibit an electrical conductivity, the conductive regions need to be connected somehow across the non-electrically conductive regions. By increasing the number of and/or volume of the excluded regions of the microstructure, the rate at which connections are formed for increasing concentrations of conductive material will drop, as it requires more material to connect over the excluded regions than if there were few or smaller excluded regions present. This then produces the flattened gradient observed in the experiments. It is also possible to use an electrically conductive matrix, such as a foam to produce a network around gas-filled pockets. This would also act as an excluded volume microstructure.

The power law exponents for the percolation transition can be determined by scaling analysis of the real permittivity and conductivity of the composites discussed above for filler concentrations in the region of the percolation threshold. FIGS. 26 and 27 show the scaling of real permittivity and conductivity respectively for 100 nm Ag/100 μm PTFE compositions, and FIGS. 28 and 29 the scaling of real permittivity and conductivity respectively for 100 nm Ag.1 μm PTFE compositions.

According to percolation theory, these exponents should adopt universal values that only depend on the dimensionality of the percolation process. As the percolation threshold is approached from below, the real permittivity should vary according to equation 24:

$$\in \propto |v - v_c|^{-s} \qquad (24)$$

with the exponent s taking the value of ≈0.73 for 3D systems and 1.33 for 2D systems. Similarly, as the percolation threshold is approached from above, the conductivity should vary in accordance with equation 25:

$$\sigma \propto |v - v_c|^{t} \qquad (25)$$

with the exponent t taking the value ≈1.9 for 3D systems and 1.33 for 2D systems. Table 6 below summarises the percolation threshold and exponent values obtained from this analysis, and includes the values determined for microsphere/wax composites, using the same technique, for comparison.

TABLE 6

| Composite type | $v_Q$ | s | t |
|---|---|---|---|
| Microsphere/wax | 0.18 | 0.70 | 1.97 |
| 100 nm Ag/1 μm PTFE | 0.075 | 0.12q | 1.85 |
| 100 nm Ag/100 μm PTFE | 0.0141 | 0.73 | 2.38 |

The values of the exponents most closely resemble the universal values for 3D systems, although the value of t for the 100 nm Ag/100 μm PTFE system is much larger than that of the 3D system. This is indicative of a broader percolation transition.

According to percolation theory, power-law behaviour in the frequency dependence of the permittivity and conductivity is also expected for filler concentrations near/in the transition region. The appropriate power laws are given by equations 26 and 27:

$$\in' \propto \omega^{-y} \qquad (26)$$

$$\sigma \propto \omega^{x} \qquad (27)$$

In the strictest sense, these power laws only apply at the percolation threshold, but are often applied for filler concentrations near the threshold. The values of these exponents are related to the exponents s and t within the context of a polarisation-based model. The actual relationships are given in equations 28 and 29:

$$x = \frac{t}{s+t} \qquad (28)$$

$$y = \frac{s}{s+t} \qquad (29)$$

The relationship for both real and imaginary components is the same. For 3D systems it is expected that x=0.72, y=0.28, and for 2D systems, that x=y=0.5.

FIG. 30 presents the frequency dependent conductivity for a 2 vol % 100 nm Ag/100 μm PTFE composite material over the frequency range 1 Hz to 1 MHz. For composites well below the percolation threshold, the conductivity will be dominated by the capacitance between the conducting filler particles and is therefore inversely proportional to frequency (having a gradient of −1). For composites well above the percolation threshold and at low frequencies, the conductivity becomes dominated by conduction through connected conducting particles. The conductivity therefore becomes frequency independent (having a gradient of zero). The data in FIG. 30 clearly shows an intermediate behaviour that is represented by a power law over the frequency range 1 kHz to 1 MHz (as shown by the trend line). The power-law exponent is shown to be 0.71, which is in good agreement with the expected value for a 3D system. However, this is not perfectly consistent with the non-universal value of t derived from the concentration dependence.

FIG. 31 presents the corresponding data and power-law analysis for the real and imaginary components of permittivity. The power-law exponent for the imaginary permittivity is consistent. However, the power-law component for the real permittivity is not, which may indicate that the material tested had not quite reached the percolation threshold. If the percolation threshold has been reached, the dielectric loss tangent (the ratio of the real and imaginary permittivity components) is frequency independent, as predicted by percolation theory, FIGS. 32 and 33 present an equivalent power law analysis of the frequency dependence of the conductivity and permittivity of an 8 vol % 100 nm Ag/1 μm PTFE material. This is a sample that has a filler concentration similarly related to the relevant percolation threshold, compared with the 2 vol % 100 nm Ag/100 μm PTFE sample discussed above. The data of FIG. 32 indicates that two distinct power-laws can be used to describe the trend within the measured frequency range of 1 Hz to 1 MHz. Over the frequency range 1 Hz to 1 kHz, the power-law exponent is in reasonable agreement with the expected value for a 3D system, as before. Again, the real component of the permittivity is not consistent with the predicted and expected values, The percolation behaviour therefore appears to be that of a 3D system, regardless of the particle size ratio of the conducting and non-conducting components.

The frequency dependent dielectric properties of the composite material examined may also be interpreted using the "Universal Dielectric Response Theory" of Jonscher (Jonscher A, "The universal dielectric response and its physical significance", IEEE Trans. Electrical Insulation, 27(3), p 407, 1992, Jonscher A., "Dielectric relaxation in solids", J. Phys. D: Appl. Phys., 32, p R57, 1999).

In materials in which the polarisation is dominated by slowly mobile charge carriers, such as those whose mobility is dominated by hopping, the loss peaks due to relaxation of such a polarisation process are replaced by a fractional power-law or constant phase angle response given by equation 30 and illustrated in FIG. 34:

$$\in''(\omega)/\in'(\omega)=\cot(n\pi/2) \tag{30}$$

The extreme low frequency dispersion (LFD) is due to the fact that the charges are relatively unbound and can move over large distances compared to more conventional dipoles that give rise to a dielectric response due to polarisation effects. Moreover, whilst these charges are relatively free to move, a dc conductivity, indicated by a frequency independent real permittivity is not observed. The general response shown in FIG. 34 can be compared to the experimental data in FIGS. 31 and 33. There is a clear correspondence between FIGS. 31 and 34, including the crossover of the real and imaginary traces. This comparison may provide an explanation for the inconsistency between the power-law exponents derived form the data in FIGS. 31 and 33. In both figures, there is no constant ratio between the real and imaginary components. This is indicative of the crossover region. The crossover range therefore occurs at frequencies outside of those measured.

The repeatability of the observed properties of the above composite materials was also investigated by the inventors. In particular, the repeatability of a plasma-like response (where the material acts as if it is a metal, exhibiting a plasma frequency) when the particle size ratio increases, was investigated.

FIG. 35 summarises the experimental results in terms of the measured conductivity at 0.5 GHz, with the error bars representing the spread of results from 3 nominally identical samples. Although there is no clear indication that the reproducibility varies with size ratio, there is an indication that the size ratio affects the gradient of the percolation transition. This is important for ensuring the reliability of compositions prepared within or sufficiently near the transition region.

Inter-particle contact resistance and therefore contact area are important factors in determining the overall conductivity of the composites. Dielectric measurements were taken to examine the conduction mechanism. These measurements were undertaken using a Novocontrol Alpha Dielectric Spectrometer and Novocontrol Quatro Cryosystem. Dielectric spectra over the frequency range 1-$10^7$ Hz were collected for temperatures over the range −150 to 50° C. at 10° C. intervals. Some further measurements were repeated over the temperature range −100° C. to 100° C. at 5° C. intervals.

The following samples were tested:

FIG. 36: 1 vol % 100 nm Ag in 100 μM PTFE (samples B, C):
FIG. 37: 2 vol % 100 nm Ag in 100 μm PTFE (samples A-C);
FIG. 38: 3 vol % 100 nm Ag in 100 μm PTFE (samples A-C);
FIG. 39: 5 vol % 100 nm Ag in 100 μm PTFE (samples A, D);
FIG. 40: 2 vol % 100 nm Ag in 1 μm PTFE (sample A);
FIG. 41: 8 vol % 100 nm Ag in 1 μm PTFE (sample A); and
FIG. 42; 10 vol % 100 nm Ag in 1 μm PTFE (samples B, C).

The experimental data is presented as a function of temperature for three representative frequencies of approximately 10 Hz, 1 kHz and 0.1 MHz, spanning the tested range. The data from 100 nm Ag/100 μm PTFE composites (FIGS. 37 to 39) demonstrate that the temperature dependence of the conductivity varies markedly as the concentration of the 100 nm Ag component is increased through the percolation transition. This is the same, in general, for repeat tests. In some cases, at the lowest frequencies, the real permittivity can become very noisy. This is usually for composites that are developing into conductive materials, such that the dielectric loss tangent diverges with decreasing frequency, and exceeds the operational range of the measurement equipment.

A high conductivity that is inversely proportional to temperature, for temperatures above the Debye temperature (215K for Ag), may be representative of the temperature dependence expected for a metal.

For 1 vol % 100 nm Ag/100 μm PTFE (FIG. 37), the conductivity and permittivity is observed to be frequency dependent and to increase with temperature above a particular temperature. This trend is most obvious at lower frequencies, and potentially marks the onset of the percolation transition. The temperature dependence above this transition temperature may be due to "hopping" conduction mechanisms, discussed below.

For 3 vol % 100 nm Ag/100 μm PTFE (FIG. 38), the conductivity is observed to be frequency independent, characteristic of being above the percolation threshold. The conductivity initially decreases slowly with increasing temperature, but then undergoes a further increase in negative gradient before rapidly increasing. As the data is presented on a logarithmic scale, these trends cover a small magnitude range.

For 5 vol % 100 nm Ag/100 μm PTFE (FIG. 39), the temperature dependence of the conductivity is similarly complex. Both samples tested show two turning points.

It was expected that samples near the percolation threshold could undergo a rapid thermally induced insulator-metal transition during the measurement, although this was not observed in the 1, 3 or 5 vol % samples. Therefore samples with 2 vol % 100 nm Ag in 100 μm PTFE were tested (FIG. 37).

It was observed that, in contrast to the other compositions tested, the properties of individual samples for 2 vol % 100 nm Ag varied dramatically, and were not at all consistent. For example, sample A was somewhat anomalous in that the conductivity was frequency independent, as if above the percolation threshold. Furthermore, the conductivity exhibited a maximum before rapidly decreasing at higher temperatures. This may be due to the percolation network being broken as the temperature increases in the higher temperature range due to the expansion of the matrix PTFE particles.

The conductivity of sample B exhibited comparable frequency and temperature dependence to that of the 1 vol % 100 nm Ag samples, and so also potentially provides evidence for hopping conductivity. However, a maximum conductivity is also found at an elevated temperature.

The conductivity of sample C exhibited several discontinuities, indicative of the sample undergoing repeated insulator/metal transitions during the measurements, although these inconsistencies were not observed on the repeat tests.

A possible explanation for the changes in the direction of the conductivity gradient is that the percolating networks of silver particles are disrupted or reinforced as the PTFE matrix particles expand. Negative gradients would be consistent with disruption of the network, and positive gradients with reinforcement of the network. Conventionally, for particles dispersed in a continuum matrix, with a particle size ratio, $r_{filler}/r_{matrix}\rightarrow\infty$, it would be expected that the network would be disrupted as the matrix phase expands. However, in the opposite limit, $r_{filler}/r_{matrix}\rightarrow 0$, for excluded volume systems, it may be possible for both behaviours to exist. For filler particles dispersed over the surface of a matrix particle, the filler particles may tend to be separated as the particle expands and the surface area increases. However, this action might also tend to force filler particles distributed over the surface of one matrix particle to come into greater contact with another matrix particle on the surface of an adjoining matrix particle. This may reform the network or change the contact resistance. For the more highly loaded composites, in which the matrix particles are densely covered, the latter effect may dominate. Such a reinforcing mechanism would be completely absent in the silver coated microsphere paraffin wax composites, and should be less apparent in the 1 μm PTFE composites.

100 nm Ag/1 μm PTFE composites were also tested to enable a comparison that would reveal any differences that could potentially be associated with the difference in silver particle contact between the two systems. Representative experimental data is shown in FIGS. 17-19. The experimental data for the 1 μm PTFE composites is broadly consistent with that for the 100 μm PTFE composites.

The data for the 2 vol % 100 nM Ag/1 μm PTFE (FIG. 40) is indicative of being further below the percolation threshold than that for 2 vol % 100 nm Ag/100 μm PTFE (FIG. 14) due to the absence of a temperature above which the conductivity and permittivity are seen to increase.

The data for 8 vol % 100 nm AG/1 μm PTFE composites (FIG. 41) is perhaps more closely comparable to that for the 1 vol % 100 nm Ag/100 μm PTFE composites (FIG. 36) as a temperature above which the conductivity and permittivity increases is obvious. The conductivity is also close to a maximum at the highest temperature tested, a feature that was observed in the 2 vol % 100 nm Ag/100 μm PTFE samples (FIG. 37). It is of some concern that the turning points observed in the temperature dependence closely match the phase transition temperatures for water (freezing and boiling points), but no step discontinuities are observed. The samples were dry blended under an inert atmosphere before moulding and testing.

The data from 10 vol % 100 nm A/1 μm PTFE composites (FIG. 19) is similar to the 5 vol % 100 nm Ag/100 μm PTFE composites (FIG. 16). Interestingly a broad peak is observed in the conductivity for sample C for this composition.

The various 100 nm Ag-based composites tested therefore show a difference in conductivity to the Ag-coated 15 μm spheres and paraffin wax composition tested in FIG. 2. The temperature dependence of the conductivity for the composites identified above as being driven by a hopping mechanism were analysed in the context of the Austin-Mott Activated Polaron Hopping (APR) and Variable-Range-Hopping (VRH) models. The temperature dependence for each model is given by equations (31) and (32):

$$\sigma \propto (\omega, T) \propto \omega^s e^{\left(-\frac{W(1-s)}{k_b T}\right)} \quad (APH) \tag{31}$$

$$\sigma \propto (\omega, T) \propto \omega^s T^R \quad (VRH) \tag{32}$$

The data from a selected portion of the temperature range, from FIGS. 36, 37 and 41 is re-plotted in FIGS. 43-45, respectively, as ln(conductivity) against the reciprocal of temperature, and ln(temperature) to determine the activation energy W and the temperature exponent n as defined in equations 31 and 32 (Menon R, Yoon C, Moses D and Heeger A, Chapter 12 "Metal-insulator transition in doped conducting polymers" in Handbook of Conducting Polymers, $2^{nd}$ Edition, Ed. Skotheim T et al, Marcel Dekker, New York 1998). The values obtained at 10 Hz are summarised in Table 7.

TABLE 7

| Composite | $-W(1-s)/k_B$ | n |
|---|---|---|
| 1 vol % 100 nm Ag/100 μm PTFE | −2200 | 6.9 |
| 2 vol % 100 nm Ag/100 μm PTFE | −1283 | 4.4 |
| 8 vol % 100 nm Ag/1 μm PTFE | −3395 | 10.9 |

The activation energy and temperature exponent appear to decrease with increasing filler concentration, which is consistent with a decreasing inter-particle separation and hence a reduced barrier to hopping. Depending on the value of s (defined in equation 24 above), the values obtained are in reasonable agreement with values reported for intrinsically conducting polymers. The activation energy and temperature exponent are large for composites comprising 1 μm PTFE particles, suggesting that the large particle size ratio in the 100 μm PFTE composites promotes tunnelling, allowing the hopping conduction mechanism to occur more easily. Low frequency dispersion is also observed, which causes difficulties with the extraction of dc data to determined the dimensionality of the hopping mechanism.

The gradient of the percolation transition can therefore be altered by choosing filler and matrix particles with a large size ratio. By altering the gradient, it is possible to reliably produce composite materials that have a particular conductivity range. As the gradient of the transition is relatively flat, the conductivity will not be influenced, or influenced to a small extent, by compositional variations resulting from the production process used to make the materials, for example, weighing errors. The reliable temperature dependence of the measured conductivity of the samples is also useful in situations where non-ambient temperatures need to be measured. Such tailored composite materials are therefore of use in a wide variety of applications, such as sensors for measuring temperature, pressure or concentration of absorbed chemicals. The external stimulus could also be electric field or current (which may cause heating).

For example, as the degree of connectivity of between the electrically conductive regions is increased when an external stimulus is applied to the composite material. Such materials could then be used as sensors, actuators or switches, if the stimulus is applied dynamically. Alternatively in a passive form, the material could realise a conductivity that enables antistatic, electrostatic discharge, electromagnetic shielding products.

Although the materials discussed above have comprised silver or silver-based conductive components, other suitable materials, could be used. For example, the electrically conductive material could be one of metal, metal alloy, conductive metal oxide, intrinsically conductive polymer, ionic conductive material, conductive ceramic material or a mixture including one or more of any of these. Alternatively, an oxidation resistant metal, a metallic alloy, a conducting ceramic or a mixture including one or more of any of these could be used. The non-electrically conductive material could be PTFE (polytetrafluoroethylene), paraffin wax, a thermosetting material, a thermoplastic material, a polymer, air, an insulating ceramic material, glass or a mixture including one or more of any of these.

The theories developed by Maxwell-Garnett and Bruggeman and discussed above with reference to FIGS. 5 to 8 can generally be considered as concerning the forming of three-dimensionally connected networks. The composite production described above can also result in three dimensional materials. However it is only necessary for an incident electromagnetic wave to have an electric field component in a direction of connectivity for the effect to be observed. Hence, anisotropic composites with connectivity in two dimensions or even one dimension could suffice. Composites with two-dimensional or one-dimensional connectivity in the plane perpendicular to the plane of incidence would be particularly useful. In this context, printing, etching and lithographic techniques, such as photolithography could be employed to produce two-dimensional connectivity rather than the three dimensional connectivity which the methods described would produce. Printed layers could then be laminated to form a bulk composite.

FIG. 46 is a schematic graph of conductivity in relation to conductive filler concentration for a composite material comprising conductive particles in an insulating or non-conductive filler. The graph illustrates that the conductivity of the samples falls into 3 distinct regions, marked A, B and C. In region A, the filler concentration level is low, and the material does not conduct any electrical current. There are no connected pathways of conducting elements in the composite.

In region B, an insulator-conductor transition occurs. This transition is prompted by the formation of the first network of conducting elements within the material. For dc use, this network must span the entire material. For ac use, the network need only span a region of the material. The steepness of the gradient in region B is determined by the difference in conductivity between the constituent materials, the concentration of the conducting elements at which the first network forms and the concentration of the conductivity elements at which the overall conductivity becomes limited by the contact resistance between adjacent conductive elements.

The gradient of the insulator/conductor transition (region B) can be influenced by the degree of randomness in the distribution of the conducting elements and the nature of electrical charge transport across the contact interface. For example, the gradient can be influenced if the electrical charge transport is dominated by charge hopping or tunnelling rather than essentially free-electron movement.

In the transition region B, the conductivity continues to increase rapidly as additional parallel paths of conducting elements are created in the principal network thought the successive addition of conducting elements. This is the percolation region.

Eventually, the gradient reduces to a plateau or saturation region C in which the further addition of conducting elements does not significantly increase the conductivity of the composite. In region C, the filler concentration is high enough for the composite to conduct electricity at a level similar to that at the conductivity elements. Typically, in this region the composite is useful as an electrical conductor.

A composite material is produced by printing or placing a pattern of conductive elements onto an insulating film substrate. The conducting elements could be formed from any conductive material, including metals, conducting metal oxides, graphitic material, fullerenes, organic conductors or ionic conductors. The insulating film substrate could be formed from any insulating material including natural or synthetic papers, cloth, fabrics or thin polymer films.

The pattern of conductive elements or particles may be printed or placed using any pattern transfer mechanism or method whereby a thin layer of the conducting material can be placed in a controlled manner on a surface to form a user defined pattern. The possible methods involve inkjet printing, screen printing, block-foil patterning or autocatalytic deposition such as described in WO 02/099162 and WO 02/099163, or physical or chemical disposition methods. In the case of printing methods, conducting particles would be dispersed in a low viscosity binder to enable deposition on the substrate. Alternatively, conducting material could be removed from an initially complete conducting film to produce a similar pattern of conducting material. The possible removing methods include etching or hole punching.

The size of the conducting elements making up the pattern is of secondary importance and would be chosen to be smaller than the area of the substrate or area over which the composite is to be used, whichever is the smaller. Typically, the element size would be less than one tenth of this size limit, and preferably less than one hundredth.

A pre-determined pattern representing a selected concentration of conductive material is stored as part of a library of pre-determined patterns each representing selected concentrations of conductive materials. These pre-determined patterns may be determined either empirically or theoretically. A combination of both theory and experience in which a basic pattern is generated theoretically before being empirically checked is a possible way of generating pre-determined patterns.

Figure 1:
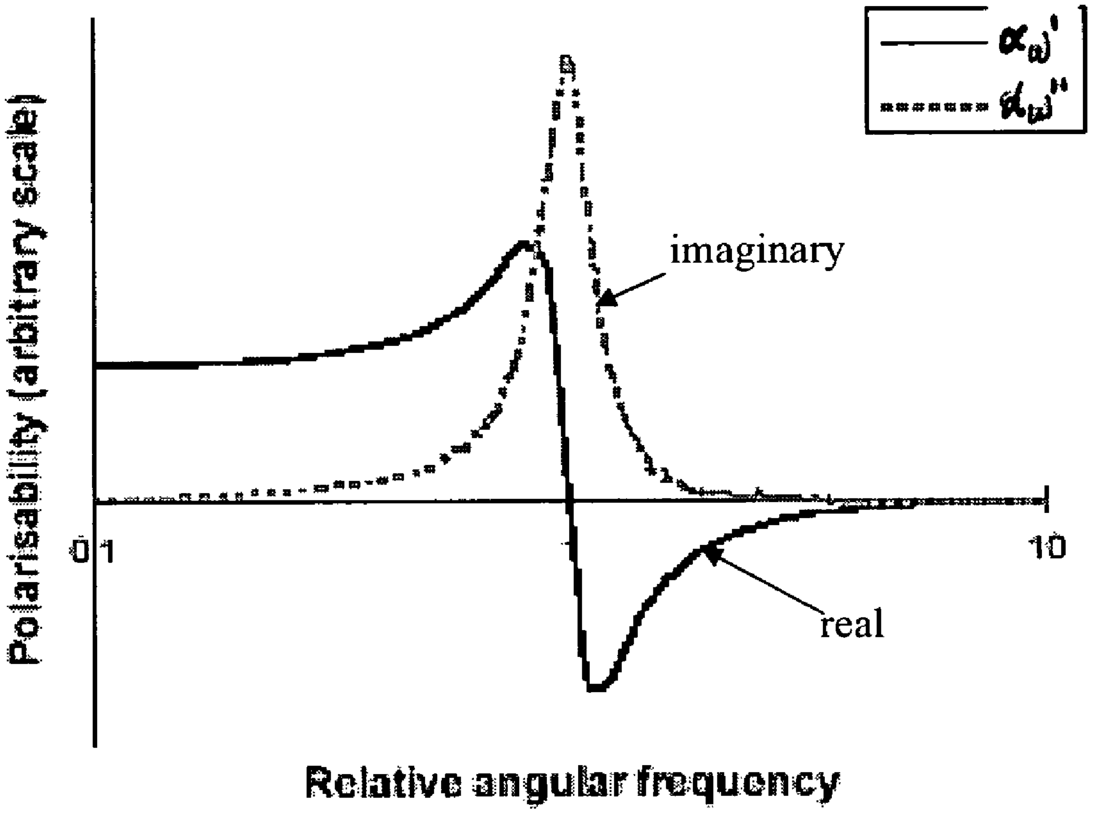
FIG. 1 illustrates the high-frequency permittivity of a typical dielectric material centred on a resonance frequency.

The pre-determined patterns are chosen or selected so as have particular properties in particular circumstances. For example, the library of patterns may include patterns which when used to print or place an ink comprising elements of a particular conductor (e.g. copper) of a particular size and shape (e.g. discs of diameter 1.6 mm—see FIG. 2*a*) on a particular substrate (e.g. synthetic paper) have a conductivity falling within a particular small range ΔS (see FIG. 1).

There are likely even with the method of the present invention to be statistical variations from one sample to the next but they will be significantly smaller than the variations in the properties of the materials made by the known mixing methods. In other words the standard deviation of the conductivity of sample composite materials of a particular conductor concentration produced by the method of this application will be significantly smaller than the standard deviation of the same apparent composite material produced by the known methods. This means that the behaviour of different samples will be closer and therefore materials can be made with more confidence that properties will be repeatable.

FIGS. 47*a* to 47*c* illustrate a number of pre-determined patterns made up of a 100×100 array including discs 1 of circular material, corresponding to, respectively, 20%, 50% and 70% loadings of conductive elements.

FIG. 48 illustrates a pre-determined pattern made up of crossed dipoles 2 and corresponding to a loading concentration of 50%. The aspect ratio of the crosses could be used, for example, to control the percolation threshold of a composite.

FIGS. 49 and 50 illustrate the three stage autocatalytic deposition methods described in WO 02/099162 and WO 02/099163 to which reference should be made. The contents of these two publications are herein incorporated by way of reference and as illustrations of how the preferred embodiments of invention might be implemented or created.

Turning to FIG. 49, an ink jet printing system 3 coats a substrate 4 with an ink formulation containing a deposition promoting material in a user determined pattern 5. The treated substrate 4, 5 is then immersed in an autocatalytic deposition solution 6 to produce a user determined metalised pattern 7.

Ink jet printers operate using a range of solvents normally in the viscosity range 1 to 50 centipoise.

Turning to FIG. 50, a screen printing system 8 coats a substrate 4, with an ink formulation containing a deposition promoting material in a user determined pattern 5 (like numerals being used to denote like features between FIGS. 4 and 5). The treated substrate 4,5 is once again immersed in an autocatalytic deposition solution 6 to produce a user determined metalised pattern 7.

A range of ink formulations are possible. Criteria suitable for printing may include the following:

1) They contain materials that are able to pass through the chosen printing mechanism (for example, either an Epson 850 inkjet system or a Dek screen printer);
2) They contain liquids with the correct properties for the printing process, for example suitable viscosity, boiling point, vapour pressure and surface wetting;
3) Where suitable they contain binders and fillers affecting either the viscosity or physical printing properties of the printed ink.

The patterns of conductive material may also be transferred onto a non-conductive substrate using a straightforward printing technique such as that described by Messrs Schwartz and Ludwena in "An experimental method for studying two-dimensional percolation". [Am. J. Phys 72(3), March 2004 © 2004 American Association of Physics Teachers] Messrs Schwartz and Ludwena describe an experimental technique for analysing a range of two-dimensional problems. The method is based on the printing of computer generated patterns using conducting ink. The metal-insulator transition is measured from the print out of the conductive patterns, and the conductivity critical component and the percolation threshold are calculated from these measurements.

Three-dimensional composite materials may be made by placing a second layer of insulating material over the material of FIG. 4*c* or 5*c* and then repeating the printing process. The process may be repeated as many times as are necessary to achieve the desired material thickness or properties. Such a material will, essentially, be three dimensional in terms of its physical shape but as the insulating layers are continuous it will only be two-dimensional in so far as its electrical properties are concerned. Materials being three-dimensional insofar as their electrical properties are concerned may be created by connecting the metallised pattern of adjacent coated substrate layers 4, 5. The connection could be done using conductive vias through the insulating material separating adjacent metallised or conductive patterns.

The present invention allows for increased confidence in the manufacturing of composites having particular properties. This has a number of clear advantages including the reduction of scrap.

Embodiments of the invention can, as discussed above, be used to engineer composites having, inter alia, desirable electrical, magnetic, thermal and/or physical properties. Possible applications of composites including active materials (e.g. photo sensitive, piezoelectric, chemical sensitive, thermally sensitive) include sensors, actuators or switches. Composites embodying the invention could also be used as reference materials (for e.g. absorbing) in metrology in support of national and/or international traceability claims. The ability to produce something having a known and pre-determined property or behaviour could also be used in support of security and anti-counterfeiting measures.

For example, WO02/099163 and WO02/009162 (both assigned to QinetiQ Limited) disclose methods of autocatalytic coating and patterning respectively. This is a form of electroless plating in which metals, for example, cobalt, nickel, gold, silver or copper are deposited onto a substrate via a chemical reduction process. Non-metallic surfaces may be coated following suitable sensitisation of the substrate. Pre-determined areas of the substrate may be prepared for coating, allowing various patterns to be formed. Such patterns are printed onto the substrate using pattern transfer mechanisms such as printing using autocatalytic inks. This would enable a number of random or non-periodic patterns to be printed on single sheets, formed into a composite material by laminating, and which would then exhibit a plasma frequency, similar to those described below for 3-dimensional composite materials. Suitable substrate materials include insulating sheet materials, such as paper, card, polymer film or cloth.

The composite materials of the embodiments of the invention may be used in various applications. One important use would be to combine the composite material with another material which has a magnetic permeability of less than 0, to produce a material with a refractive index of less than 0. Using the composite material to produce a material with a refractive index between 0 and 1 (less than air) would also be of use, since this would allow the formation of components exhibiting total internal reflection.

The composite material is also suitable for filtering applications, including those which require a tuneable filter. Such filter behaviour may be coupled with various DC frequency applications. This may be used to produce transparent or absorbing electrodes, capacitors or inductors. Transparent electrodes would be of particular use in microwave chemistry applications.

The fact that composite materials of the type embodying the invention can demonstrate D.C. conductivity comparable with conventional metals whilst remaining microwave transparent (behaving like a normal dielectric) is of potential usefulness. These potential useful properties can be engineered into materials using the processing described. The advantageous behaviour arises from the percolating networks of conducting particle being arranged in a suitable geometry. Consequently if this geometry can be altered by physical, thermal or electrical deformation then these properties can be tuned or switched on and off depending on the desired application. Possible applications of the composite materials therefore include tunable high pass filters, commercial microwaveable food packaging, mechanically, thermally or electrically switchable microwave filters for use in radomes or other applications requiring microwave spectrum selectively (e.g. telecommunications). Details of how to make products or devices for acting on or processing electro-magnetic waves are well known to those skilled in the art and easily found in relevant textbooks such as "The Electrical Engineering Handbook", (Editor-in-Chief, Richard C. Dorf; Publisher CRC Press Inc of Boca Raton, Fla.).

Examples of possible products which might use the composite material include:

a) a written directional coupler lens—a negative permittivity in concert with a negative permeability would lead to a negative refractive index material, Such a 'left handed' material would possess unique refraction properties allowing, for example, a flat lens that would allow perfect image projection with no aberrations due to geometrical shape as in a conventional lens. Such effects are, of course, highly dispersive limiting the device to monochromatic operation.

b) filter—simple variation of the conductor/insulator morphology within the composite can raise or lower the plasma frequency of the material by several orders of magnitude. Therefore the cut-off frequency where radiation can propagate through the medium (where the permittivity crosses from negative to positive across the plasma frequency) can be varied thus allowing easy fabrication of a tuneable high pass filter device.

c) transparent electrode—in electrically addressable devices such as frequency agile sensors, the ability to apply an electric field across such a device without any wavelength feature related artefacts or attenuation occurring is very desirable. Thus, the high conductivity conventional dielectric behaviour (positive permittivity) above the plasma frequency allows the application of ~kHz driving electric field across a metal-like conductor whilst allowing transmission of ~GHz microwave radiation through a conventional dielectric.

d) absorbing electrode—as above, optimisation of the plasma frequency allows fine control over the sign and magnitude of the complex permittivity of the composite device to provide easily customizable dielectric properties.

e) capicitor or inductor—as above, straightforward permittivity/impedance/admittance manipulation can realise such devices.

f) waveguide—the low permittivity behaviour frequency regime behaviour of these composite materials above the plasma frequency allows microwave propagation through a slab of such material with total internal reflection occurring off the composite/air interface exploiting the positive, sub-unity value of permittivity close to but just above the plasma frequency. Such behaviour is highly dispersive but this is not a problem in monochromatic telecommunications frequency applications.

g) sensor—the transition from insulating to conducting behaviour via the percolating region of interest in this patent can be tuned to be very sharp or a much gentler process. By careful choice of insulator conductor concentration and processing conditions, a composite can be achieved where the width of the percolating region is very sensitive to electrical, mechanical or thermal perturbation. Thus, relatively small changes in driving field, force or temperature can induce relatively large changes in plasma frequency and related dielectric properties. Hence, a high Q-factor sensor can be fabricated.

h) remote interrogation sensor package—as above, a switchable filter device could be incorporated into a potential quantum cryptography application.

i) radome—typically, a radome needs to have durable physical properties to house the microwave device within. In addition to this, radar absorbing material (RAM) is included—often as a backing applique. If the electrical properties (complex permittivity and admittance) of the composite used in the structural part of the radome could also be used in the RAM, then substantial weight and complexity savings could be achieved.

j) switch or shield—as above, tuning of the width of the insulator to conductor transition could be exploited to make the device sensitive to electrical, mechanical or thermal perturbations thus realising a switchable device.

k) fuse—as above, manipulation of the insulator/conductor transition would enable a thermal or electrical (or mechanical) solid state switch.

l) anechoic chamber—as above, precise tuning of the electrical properties (permittivity, admittance) of a material allows stringent absorption and reflection design criteria to be met cheaply and easily.

The composite material may also be used as a sensor, possibly as a remote interrogation sensor, where the plasma frequency is monitored by interrogation by microwaves, in order to determine the state of the sensor.

As mentioned above, uses include materials for use in the food industry, for example, to aid heating or to provide packaging for microwaveable foods.

Various other modifications are possible and will occur to those skilled in the art without departing from the scope of the invention which is defined by the appended claims.

The invention claimed is:

1. A composite material comprising a proportion of an electrically non-conductive material and a proportion of a randomly distributed electrically conductive material, and wherein:

a) the electrically non-conductive and conductive materials are both particulate;

b) the electrically non-conductive material is a polymer;

c) the electrically conductive material is a metal, metal alloy, conductive metal oxide, a conductive ceramic material or a mixture of two or more of these;

d) the electrically non-conductive material has an average particle size which is at least ten times that of the electrically conductive material and defines an excluded volume microstructure for the composite material, the excluded volume microstructure comprising regions which exclude the electrically conductive material and other regions which contain the electrically conductive material;

e) the electrically conductive material is sufficiently well dispersed in the composite material and its proportion is appropriate to establish at least one electrically conducting network as a coating over the surfaces of particles of the electrically non-conductive material, the network providing for the composite material to be electrically conducting and to exhibit a plasma-like response and a plasma frequency which is below conventional bulk metals' plasma frequencies, the plasma frequency being associated with a change in the composite material's real permittivity from positive to negative;

f) the composite material has a conductivity greater than 10 S/m; and g) the composite material is incorporated in a product, device or apparatus selected from the group consisting of products, devices and apparatuses for modifying the propagation characteristics of electromagnetic radiation incident upon it, a lens, a filter, a transparent electrode, an absorbing electrode, a capacitor, an inductor, a waveguide, a sensor, a remote interrogation sensor package, an active electromagnetic shutter, a radome, a switch, a shield, fuse, an anechoic chamber or combinations thereof.

2. A composite material according to claim 1 wherein the electrically conductive material exhibits no long range order.

3. A composite material according to claim 2 wherein the electrically conductive material exhibits no long range order over a region having a dimension in the range 3 mm to 3 m.

4. A composite material according to claim 3 wherein the region's dimension is substantially 3 cm.

5. A composite material according to claim 1 wherein the electrically conductive material exhibits no long range order over a region having a dimension of the order of a wavelength in the material corresponding to the plasma frequency.

6. A composite material according to claim 1 wherein the at least one electrically conductive network extends between opposite sides of the composite material.

7. A composite material according to claim 1 wherein the plasma frequency is a microwave frequency.

8. A composite material according to claim 1 wherein the plasma frequency is in the ranges $10^3$ to $10^{15}$ Hz.

9. A composite material according to claim 8, wherein the plasma frequency is in the range of $10^8$ to $10^{15}$ Hz.

10. A composite material according to claim 8, wherein the plasma frequency is in the range of $10^8$ to $10^{12}$ Hz.

11. A composite material according to claim 1 wherein the electrically non-conductive and conductive materials have respective average particle sizes in a ratio which is greater than or equal to 100 or greater than or equal to 1000.

12. A composite material according to claim 11 wherein the electrically conductive material comprises one of an oxidation resistant metal, a metallic alloy, an electrically conductive coating on electrically non-conductive particles and a conducting ceramic, and the average particle size of the electrically conducting material is in the range 1 nm to 1 μm.

13. A composite material according to claim 11 wherein the electrically conductive material comprises gold or silver particles with average particle size not greater than 1 μm and the electrically non-conductive material comprises particles with average particle size not greater than 100 μm.

14. A composite material according to claim 1 wherein the electrically non-conductive material is polytetrafluoroethylene (PTFE).

15. A composite material according to claim 1 wherein the electrically non-conductive material is PTFE with an average particle size of substantially 100 μm, and the electrically conductive material is gold or silver with an average particle size of substantially 100 nm.

16. A composite material according to claim 1 wherein the electrically conductive material comprises either one of, or alternatively a mixture of at least two, of an oxidation resistant metal or an electrically conductive coating on electrically non-conducting particles.

17. A composite material according to claim 1 having an effective conductivity exceeding at least one of 30 S/m and 100 S/m.

18. A composite material according to claim 1 which is switchable between a radiation propagating state and a radiation attenuating state.

19. A composite material according to claim 1 having a degree of electrical connectivity between regions of electrically conductive particles determining electrical properties, and including means for applying a stimulus to the composite material to change the degree of connectivity.

20. A composite material according to claim 19 wherein the stimulus is pressure, temperature, chemical absorption, electric field or electric current.

21. A composite material according to claim 19 which is switchable between a radiation propagating state and a radiation attenuating state in response to the stimulus.

22. A composite material according to any one of claims 1-5, 6-8, 11, 12, 13, 14-17, 18, 19-21 or 9-10 providing one of a series of composite materials with differing concentrations of electrically conductive and non-conductive materials, and wherein for the series a graph of conductivity against electrically conductive material concentration on logarithmic axes has a slope which is less than 100 for an insulator to metal transition.

* * * * *